United States Patent
Kimura

(10) Patent No.: US 7,576,886 B2
(45) Date of Patent: Aug. 18, 2009

(54) IMAGE PROCESSING APPARATUS, IMAGE FORMING APPARATUS, PRINTER DRIVER, IMAGE PROCESSING METHOD AND COMPUTER-READABLE STORAGE MEDIUM

(75) Inventor: Takashi Kimura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 536 days.

(21) Appl. No.: 10/515,667

(22) PCT Filed: Jun. 12, 2003

(86) PCT No.: PCT/JP03/07487

§ 371 (c)(1),
(2), (4) Date: Nov. 23, 2004

(87) PCT Pub. No.: WO04/000563

PCT Pub. Date: Dec. 31, 2003

(65) Prior Publication Data

US 2005/0200905 A1    Sep. 15, 2005

(30) Foreign Application Priority Data

Jun. 19, 2002  (JP) .............................. 2002-177876

(51) Int. Cl.
*G06F 15/00* (2006.01)
*G06K 1/00* (2006.01)
*H04N 1/60* (2006.01)
*G06K 15/02* (2006.01)

(52) U.S. Cl. ........................................ 358/1.9; 358/1.2

(58) Field of Classification Search .................. 358/1.9, 358/3.06, 3.07, 3.13–3.19, 3.2, 3.22, 1.2; 382/270

See application file for complete search history.

(56) References Cited

U.S. PATENT DOCUMENTS

| | | | | |
|---|---|---|---|---|
| 5,029,108 A | * | 7/1991 | Lung | 358/1.9 |
| 5,548,690 A | * | 8/1996 | Shimada | 358/1.13 |
| 5,746,818 A | * | 5/1998 | Yatake | 106/31.86 |
| 7,199,905 B2 | * | 4/2007 | Sharma | 358/3.04 |
| 2002/0159650 A1 | | 10/2002 | Hiroshige et al. | |

FOREIGN PATENT DOCUMENTS

| | | |
|---|---|---|
| EP | 1054350 A1 | 11/2000 |
| EP | 1213928 A2 | 6/2002 |
| JP | 8-11350 | 1/1996 |
| JP | 9-331439 | 12/1997 |
| JP | 11-5298 | 1/1999 |
| JP | 11-252367 | 9/1999 |
| JP | 2002-97389 | 4/2002 |

OTHER PUBLICATIONS

Oct. 2, 2007 European Search Report in connection with corresponding European patent application No. EP 03 73 6182.
Mar. 3, 2009 Japanese official action in connection with a counterpart Japanese patent application No. 2002-177876.

* cited by examiner

*Primary Examiner*—Douglas Q Tran
(74) *Attorney, Agent, or Firm*—Cooper & Dunham, LLP

(57) ABSTRACT

An image forming apparatus forms an image by a plurality of dots, by forming a periphery of a stepped transition portion of a contour portion of at least a character and/or graphics of the image by dots having a smaller size than dots forming portions other than the stepped transition portion, and determining a method of forming the dots having the smaller size depending on an inclination of the contour portion.

17 Claims, 31 Drawing Sheets

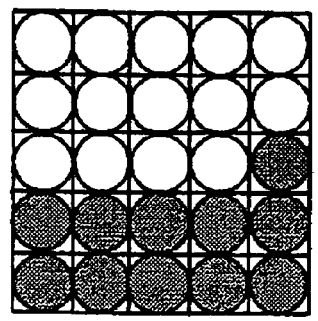
FIG.23A
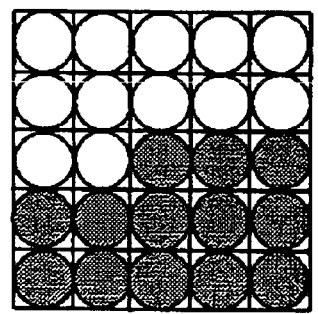
FIG.23B
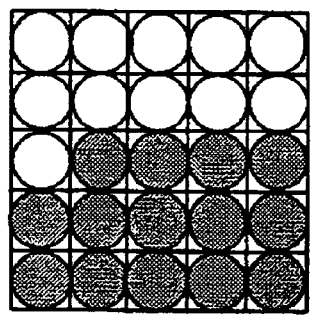
FIG.23C
FIG.24
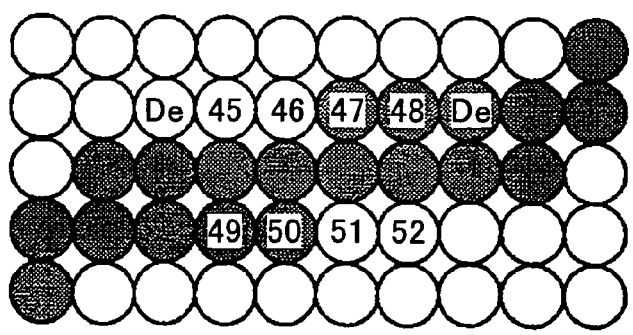

IMAGE PROCESSING APPARATUS, IMAGE FORMING APPARATUS, PRINTER DRIVER, IMAGE PROCESSING METHOD AND COMPUTER-READABLE STORAGE MEDIUM

TECHNICAL FIELD

The present invention generally relates to image processing apparatuses, image forming apparatuses, printer drivers and image processing methods, and more particularly to an image processing apparatus, an image forming apparatus, a printer driver and an image processing method which are suited for improving a picture quality at a low resolution. The present invention also relates to a computer-readable storage medium which stores a computer program for causing a computer to carry out an image processing suited for improving the picture quality at a low resolution.

BACKGROUND ART

An ink-jet printer is used in various kinds of image forming apparatuses (or image recording apparatuses) such as printers, facsimile machines and copying machines. The ink-jet printer can record at a high speed, and does not require a special fixing process with respect to the so-called plain paper. In addition, noise generated by the ink-jet printer during the recording is negligibly small. For this reason, the ink-jet printer is popularly employed for office use.

In the ink-jet printer, a pressure generating means of an ink-jet head is formed by a heating resistor which generates air bubbles in the case of the thermal ink-jet, a piezoelectric element in the case of the piezoelectric ink-jet, and an electrostatic element in the case of the electrostatic ink-jet. The dot size is controlled by controlling an amplitude, a pulse width, a number of pulses and the like of a driving voltage which is applied to electrodes of such pressure generating means. Hence, the pressure generating means applies pressure to an ink chamber of the ink-jet head based on image information to eject ink drops from a nozzle of the ink-jet head, and the ejected ink drops are adhered onto a recording medium such as paper and film so as to form an image of the image information on the recording medium.

The ink-jet printer can be categorized into a serial type and a line type depending on the head structure.

The serial type ink-jet printer forms the image while scanning the recording medium in a main scanning direction by the ink-jet head, that is, in a direction taken along a width of the recording medium (hereinafter simply referred to as a width direction). After one or a plurality of scans in the main scanning direction ends, the recording medium is transported to form a next recording line.

On the other hand, the line type ink-jet printer uses an ink-jet head having nozzles arranged along approximately the entire width of the recording medium. Hence, no scan is made in the width direction of the recording medium, and the recording is made while transporting the recording medium.

The line type ink-jet printer has an advantage in that the recording speed is high, because one fine in the width direction of the recording medium is formed simultaneously. However, the size of the ink-jet printer as a whole becomes large because the ink-jet head of the line type ink-jet printer is large. Furthermore, in order to carry out the recording at a high resolution, the nozzles must be arranged at a high density, thereby increasing the production cost of the ink-jet head.

The serial type ink-jet printer has an advantage in that the ink-jet head is relatively small, and the cost of the ink-jet printer as a whole can be suppressed, because the production cost of the ink-jet head of the serial type ink-jet printer is relatively low. For this reason, the serial type ink-jet printer is popularly used in various applications.

However, particularly when the ink-jet printer records the image on plain paper, picture quality deteriorations peculiar to the ink-jet recording, such as color reproducibility, durability, light resistance, ink drying characteristic (fixing characteristic), feathering, color bleeding and duplex recording characteristic of the image, become conspicuous. Moreover, when an attempt is made to carry out a high-speed recording with respect to the plain paper, it is extremely difficult to carry out the recording while satisfying all of these characteristics which affect the picture quality.

Next, a description will be given of the problems peculiar to the ink-jet printer when recording the image on the plain paper.

Normally, the ink used for the ink-jet recording (printing) includes water as a main component, and is generally added with a coloring agent, and a wetting agent such as glycerol for the purpose of preventing clogging of the nozzles. The coloring agent includes a dye and a pigment, and conventionally, a dye-based ink is used for a color portion in most cases because of the superior color generation and stability.

However, the ruggedized characteristic, such as the light resistance and water resistance of the image, obtained by use of the dye-based ink is poorer than that obtained by use of an ink which uses the pigment as the coloring agent. With respect to the water resistance in particular, it is possible to realize an improvement to a certain extent by use of recording paper which is made exclusively for the ink-jet recording and includes an ink absorbing layer. But a satisfactory water resistance cannot be obtained when the plain paper is used.

In order to solve the problems cased by the use of the dye-based ink for the recording with respect to the plain paper, a pigment-based ink using an organic pigment, carbon black or the like as the coloring agent is used for the recording with respect to the plain paper. Unlike the dye, the pigment has no solubility to water. Hence, the pigment is normally mixed with a dispersing agent and subjected to a dispersion process to form a water ink in which the pigment is stably dispersed in water.

The light resistance and the water resistance can be improved by use of the pigment-based ink described above. However, it is difficult to simultaneously improve the other characteristics which affect the picture quality. It is difficult to obtain a high image tone, a sufficient color generation, a high color reproducibility and the like, particularly when carrying out a high-speed recording with respect to the plain paper. As a result, it is difficult to simultaneously obtain satisfactory ink drying characteristic (fixing characteristic), feathering, color bleeding and duplex recording characteristic of the image.

Recording methods have been proposed in Japanese Laid-Open Patent Applications No.6-171072 and No.2000-355159 in order to solve the problems introduced when carrying out the recording on the plain paper using the pigment-based ink described above.

According to the recording method proposed in the Japanese Laid-Open Patent Application No.6-171072, the ink includes a pigment, a polymer dispersing agent and a resin emulsion. By adjusting a solid adhering amount per unit area on the recording paper during a 100% duty recording to an appropriate range, it is possible to reduce the printing inconsistency caused by pigment agglutination peculiar to the pigment0based ink. As a result, the feathering is eliminated, and a picture quality having a high recording tone can be obtained.

On the other hand, according to the Japanese Laid-Open Patent Application No.2000-355159, the ink composition includes a pigment and a penetrant, where the pigment has a dispersion group at the pigment surface and is surface-treated so as to be independently dispersible into a water solvent. By adjusting an ejecting amount of the ink composition per unit area of the recording paper, it is possible to suppress the generation of irregular feathering in the recorded image, and to quickly dry the ink composition on the recording paper. As a result, a high recording tone can be secured, and a satisfactory picture quality can be obtained.

Next, a description will be given of the recording speed (printing speed). In the case of the serial type ink-jet printer, the recording speed is determined by a resolution of the image, nozzle density, driving frequency at which the dots are formed, sub scanning speed and the like.

The nozzle density is limited by the processing accuracy of the nozzle, ink chamber, flow passage, actuator and the like. Particularly in the case of the ink-jet head which uses the piezoelectric element as the pressure generating means, it is necessary to carry out a mechanical processing such as dicing or, to form a PZT thin film by printing, in order to divide and form channels corresponding to the nozzles. For this reason, the nozzle density becomes low compared to the thermal ink-jet head which is formed by a semiconductor process. Presently, the upper limit of the nozzle density of the ink-jet head using the piezoelectric element is approximately 360 dpi.

In addition, in order to improve the recording speed, it is desirable to record a recording region in one main scan. For example, when forming an image having a resolution of 300 dpi in the sub scanning direction using a head having a nozzle density of 300 dpi, the image can be formed in one scan in a moving direction (main scanning direction) of the head. But when forming an image having a resolution of 600 dpi in the sub scanning direction using the same head, the image must be formed by a so-called interlacing in which two scans are made in the main scanning direction and one scan is made in the sub scanning direction (paper transport direction). Naturally, the method which forms the image in one scan in the main scanning direction by a non-interlacing has a higher recording speed that the method which forms the image by the interlacing. Moreover, as methods of forming one line in the main scanning direction, there is a single-path recording (printing) method which forms one line by one main scan, and a multi-path recording (printing) method which forms one line by a plurality of main scans. Of course, the recording speed of the single-path recording method is higher than that of the multi-path recording method.

However, particularly in the case of the piezoelectric ink-jet printer using the piezoelectric element, the nozzle density itself is low, and for this reason, the resolution of the image inevitably becomes low when the single-path interlacing is employed to improve the recording speed.

When the resolution of the image is low, the picture quality can be improved by representing each pixel in multi-levels. The multi-level representation method may vary the size of each dot, form each pixel by forming a plurality of small dots or, varying the density of the ink itself.

The multi-level representation method is effective in the case of images such as photographs, but are virtually ineffective in the case of graphics and characters. In the case of graphics and characters, the dot size needs to be large so as to be able to fill the texture. For this reason, the tone of the graphics and characters becomes low when the dot size used is small. Accordingly, problems peculiar to the low resolution occur in the case of a bi-level image such as graphics and characters, and particularly in the case of the characters, the quality of the characters becomes poor and the characters become difficult to read.

Next, a more detailed description will be given of the relationship of the problems peculiar to the low resolution and the ink properties. The image recorded by the ink-jet printer is represented by dots which are arranged in a matrix arrangement in the main scanning direction of the head and in a transport direction (sub scanning direction) of the recording medium which is perpendicular to the main scanning direction.

When the dot image of the characters is recorded, the quality of the characters greater differ depending on the resolution of the image which is recorded. For example, when the character having the same size is recorded at 300 dpi and at 600 dpi, the number of dots forming the character for the 600 dpi becomes approximately four times that for the 300 dpi. Hence, a more detailed representation can be made at 600 dpi, and the quality of the character is naturally better at 600 dpi than at 300 dpi. Particularly at an oblique line portion of the character, the number of dots increases or decreases in steps depending of the resolution, and a jaggy portion becomes more conspicuous at 300 dpi than at 600 dpi.

Accordingly, the jaggy portion which is not conspicuous when the ink used introduces feathering, becomes conspicuous when the ink used introduces no feathering or only introduces slight feathering. The jaging portion becomes particularly conspicuous at the time of the low-resolution recording and deteriorates the quality of the characters.

For example, a Japanese Patent No.2886192 proposes a method of reducing the jaggy portion to improve the quality of the output image. According to this proposed method, a bit pattern of a sampling window within a bit-map image of the character is compared with a predetermined bit pattern, and a center pixel within the sampling window is corrected to a small dot if the compared bit patterns match.

A similar method is proposed in a Japanese Patent No.3029533. According to this proposed method, a contour portion of the image is discriminated from black dot data, and the size of recording dots other than edge dots and black dots is reduced.

Of the above described recording methods proposed in the Japanese Laid-Open Patent Applications No.6-171072 and No.2000-355159 in order to solve the problems introduced when carrying out the recording on the plain paper using the pigment-based ink, the recording method proposed in the Japanese Laid-Open Patent Application No.6-171072 can improve the recording tone and reduce the feathering, because a contact angle of the ink used is 70 or greater and extremely high with respect to the sized recording paper such as plain paper.

However, when recording at 100% duty with respect to the recording paper, the solid adhering amount per unit area needs to be on the order of approximately several tens of $ng/m^2$, and problems are introduced from the point of view of the ink fixing characteristic (drying characteristic). Particularly in a case where a high-speed recording is carried out by stacking a plurality of recording paper, the ink transfer between the successive recording paper causes ink smear on the recording paper. Thus, the recording method proposed in the Japanese Laid-Open Patent Application No.6-171072 is not suited for the high-speed recording.

In addition, depending on the kind of recording paper, the large contact angle of the ink generates a white line of the paper texture at the solidly-recorded portion, the character portion and the like when the recording is carried out at 100% duty. Furthermore, at the boundary portion of the colors, the color bleeding is easily generated in the ink drop state between the adjacent recorded dots due to the large contact angle of the ink.

On the other hand, the recording method proposed in the Japanese Laid-Open Patent Application No.2000-355159 uses the penetrant, and the picture quality is improved from the point of view of the ink drying characteristic (fixing characteristic). Hence, even when a high-speed recording is carried out by stacking a plurality of recording paper, the ink transfer between the successive recording paper does not occur and no ink smear is formed on the recording paper. Thus, the recording method proposed in the Japanese Laid-Open Patent Application No.2000-355159 is suited for the high-speed recording.

However, since the penetrant is used in the ink composition, a feathering phenomenon which is similar to that generated when using the dye-based ink is generated when the recording is made on plain paper. Particularly when the recording is made on the plain paper, the ink penetrates the plain paper also in a direction along a depth (thickness) of the plain paper. As a result, the penetrating ink becomes visible on the other side of the plain paper, thereby making the recording unsuited for application to the duplex recording.

Therefore, the recording methods proposed in the Japanese Laid-Open Patent Applications No.6-171072 and No.2000-355159 cannot realize a sufficiently satisfactory picture quality when carrying out the high-speed recording with respect to the plain paper using the pigment-based ink.

On the other hand, the methods proposed in the Japanese Patents No.2886192 and No.3029533 for correcting the jaggy portion cannot be applied as they are to the ink-jet printer for the purposes of improving the picture quality when recording the image having the low resolution using the ink which generates little feathering.

In other words, the above described methods for correcting the jaggy portion employ toners having a grain diameter of 10 μm or less, as in the case of LED printers and laser printers. Hence, the dots recorded on the plain paper virtually does not spread, and the above described methods for correcting the jaggy portion are effective only with respect to image forming apparatuses in which the dots having the specified small size are obtainable. In addition, the above described methods for correcting the jaggy portion can be employed in the laser printers because the dots having the specified size can be formed at optimum positions by finely varying the positions (timings) and lengths of the laser emissions.

But in the case of the ink-jet printer, the spreading of the ink dot is large compared to that of the toner dot in the laser printer, and the time required to form the dots is large compared to the LED printers and the laser printers. Consequently, it is difficult to vary the dot size among a large number of dot sizes by varying the number, length and the like of driving pulses during the driving period, and it is only possible to vary the dot size among several sizes at the most. Furthermore, the dot can only be formed at an approximately predetermined position within one pixel due to similar reasons, and it is difficult to freely vary the position of the dot within one pixel as is possible in the case of the LED printers and laser printers.

Therefore, the methods proposed in the Japanese Patents No.2886192 and No.3029533 for correcting the jaggy portion cannot be applied as they are to the ink-jet printer for the purposes of improving the picture quality.

Moreover, there is a conventional smoothing technique called anti-aliasing. However, the anti-aliasing varies the dots in an extremely large number of gradation levels at the contour portion. For this reason, a highly accurate smoothing can be realized by the anti-aliasing, but the required processes are extremely complex and time-consuming. Consequently, the anti-aliasing is unsuited for application to the ink-jet printer which is required to produce a high throughput.

In addition, when the recording is made by varying the dot size in the ink-jet printer, there is a problem in that the dot position on the recording paper becomes different depending on the dot size. The ink-jet printer applies pressure to the ink within the ink chamber by the pressure generating means, and the ink is ejected from the nozzle by the pressure applied to the ink within the ink chamber. The pressure generating means is formed by the heating resistor which generates the air bubbles in the case of the thermal ink-jet printer, and is formed by the piezoelectric element (electromechanical conversion element) which deforms the ink chamber i n the case of the piezoelectric ink-jet printer.

Generally, the energy supplied to the pressure generating means is varied in order to vary the dot diameter in such ink-jet printers. More particularly, the magnitude of the driving voltage applied to the pressure generating means is varied or, the pulse width or the number of pulses of the driving pulses applied to the pressure generating means is varied.

The method of varying the driving voltage requires a number of signal lines corresponding to a plurality of driving voltages, and a number of switching means, corresponding to the plurality of driving voltages, for switching the plurality of driving voltages with respect to each channel. As a result, a driving element (driver IC) becomes large. On the other hand, the method of varying the pulse width or the number of pulses of the driving pulses can vary the pulse width or the number of pulses by controlling a switching timing of a switching means, and only a single switching means is required with respect to each channel. Hence, particularly in the case of the piezoelectric ink-jet printer, the pulse width modulation method or the pulse number modulation method is employed.

However, when forming ink drops having different amounts of ink, that is, when forming different dot diameters, according to the pulse width modulation method or the pulse number modulation method, the length of the driving pulses become different. As a result, even though the timings at which the meniscus is formed in response to the driving pulse is the same for the ink drops having the different amounts of ink, the timings at which the ink drops are ejected in response to the ceasing of the driving pulses become different. Consequently, the timings at-which the ink drops having the different amounts of ink reach the recording paper become different, and the dot position (ink drop hitting positions) on the recording paper become different depending on the dot size. Therefore, even when an attempt is made to improve the picture quality by correcting the contour portion by the small dots, the small dots are not formed at the desired positions on the recording paper, and there is a possibility of deteriorating the picture quality rather than improving the picture quality.

SUMMARY

In an aspect of this disclosure, an image processing apparatus, an image forming apparatus, a printer driver, an image processing method, and a computer-readable storage medium are provided which can obtain a satisfactory picture quality for a low-resolution recording and/or a high-speed recording.

In another aspect of this disclosure, an image forming apparatus for forming an image by a plurality of dots is provided, comprising forming means for forming a periphery of a stepped transition portion of a contour portion of at least a character and/or graphics of the image by dots having a smaller size than dots forming portions other than the stepped transition portion; and determining means for determining a method of forming the dots having the smaller size depending on an inclination of the contour portion. According to such an image forming apparatus, it is possible to improve the picture quality particularly at a low resolution, and to reduce the data transfer time between the image forming apparatus and a host unit which is connected thereto.

In another aspect of this disclosure, an image processing apparatus for forming an image data which is used to form a corresponding image by a plurality of dots is provided, comprising converting means for converting a periphery of a stepped transition portion of a contour portion of at least a character and/or graphics of the image into dots having a smaller size than dots forming portions other than the stepped transition portion; and determining means for determining a method of converting the dots having the smaller size depending on an inclination of the contour portion. According to such an image forming apparatus, it is possible to improve the picture quality particularly at a low resolution.

In another aspect of this disclosure, a printer driver for creating an image data to be supplied to an image forming apparatus which forms a corresponding image by a plurality of dots is provided, comprising converting means for converting a periphery of a stepped transition portion of a contour portion of at least a character and/or graphics of the image into dots having a smaller size than dots forming portions other than the stepped transition portion; and determining means for determining a method of converting the dots having the smaller size depending on an inclination of the contour portion. According to such a printer driver, it is possible to improve the picture quality particularly at a low resolution.

In another aspect of this disclosure, an image processing method for forming an image data which is used to form a corresponding image by a plurality of dots is provided, comprising converting a periphery of a stepped transition portion of a contour portion of at least a character and/or graphics of the image into dots having a smaller size than dots forming portions other than the stepped transition portion; and determining a method of converting the dots having the smaller size depending .on an inclination of the contour portion. According to such an image processing method, it is possible to improve the picture quality particularly at a low resolution.

In another aspect of this disclosure, a computer-readable storage medium is provide which stores a program for causing a computer to form an image data which is used to form a corresponding image by a plurality of dots, where the program comprises a converting procedure which causes the computer to convert a periphery of a stepped transition portion of a contour portion of at least a character and/or graphics of the image into dots having a smaller size than dots forming portions other than the stepped transition portion; and a determining procedure which causes the computer to determine a method of converting the dots having the smaller size depending on an inclination of the contour portion. According to such a computer-readable storage medium, it is possible to improve the picture quality particularly at a low resolution.

Other aspects, advantages and further features of the present invention will be apparent from the following detailed description when read in conjunction with the accompanying drawings.

BRIEF DESCRIPTION OF THE DRAWINGS

FIGS. 23A through 23C are diagrams showing different reference patterns used by the pattern matching process;

FIG. 24 is a diagram for explaining a dot data conversion of the pattern matching process;

BEST MODE FOR CARRYING OUT THE INVENTION

A description will be given of embodiments of an image processing apparatus, an image forming apparatus, a printer driver (to be implemented in a computer) and an image processing method according to the present invention, which can obtain a satisfactory picture quality at a low resolution, by referring to FIGS. 1 through 39.

Figure 1:
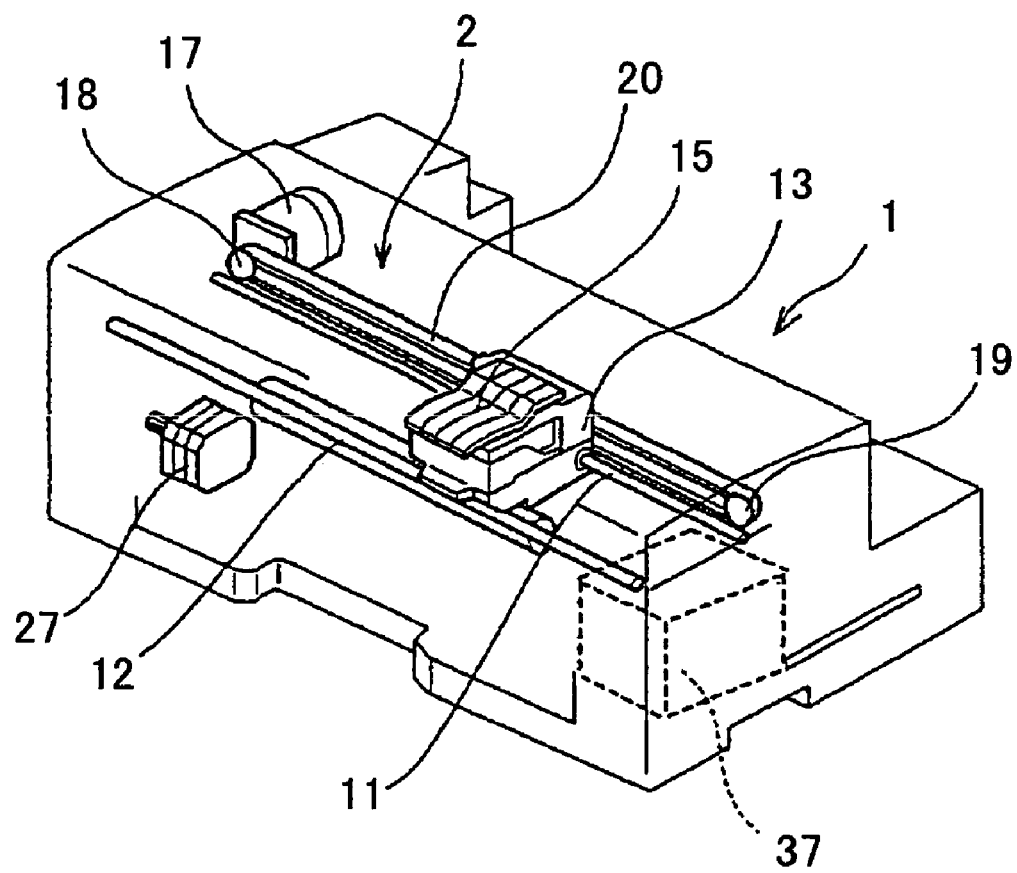
FIG. 1 is a perspective view showing a structure of an embodiment of the image forming apparatus according to the present invention.
Figure 2:
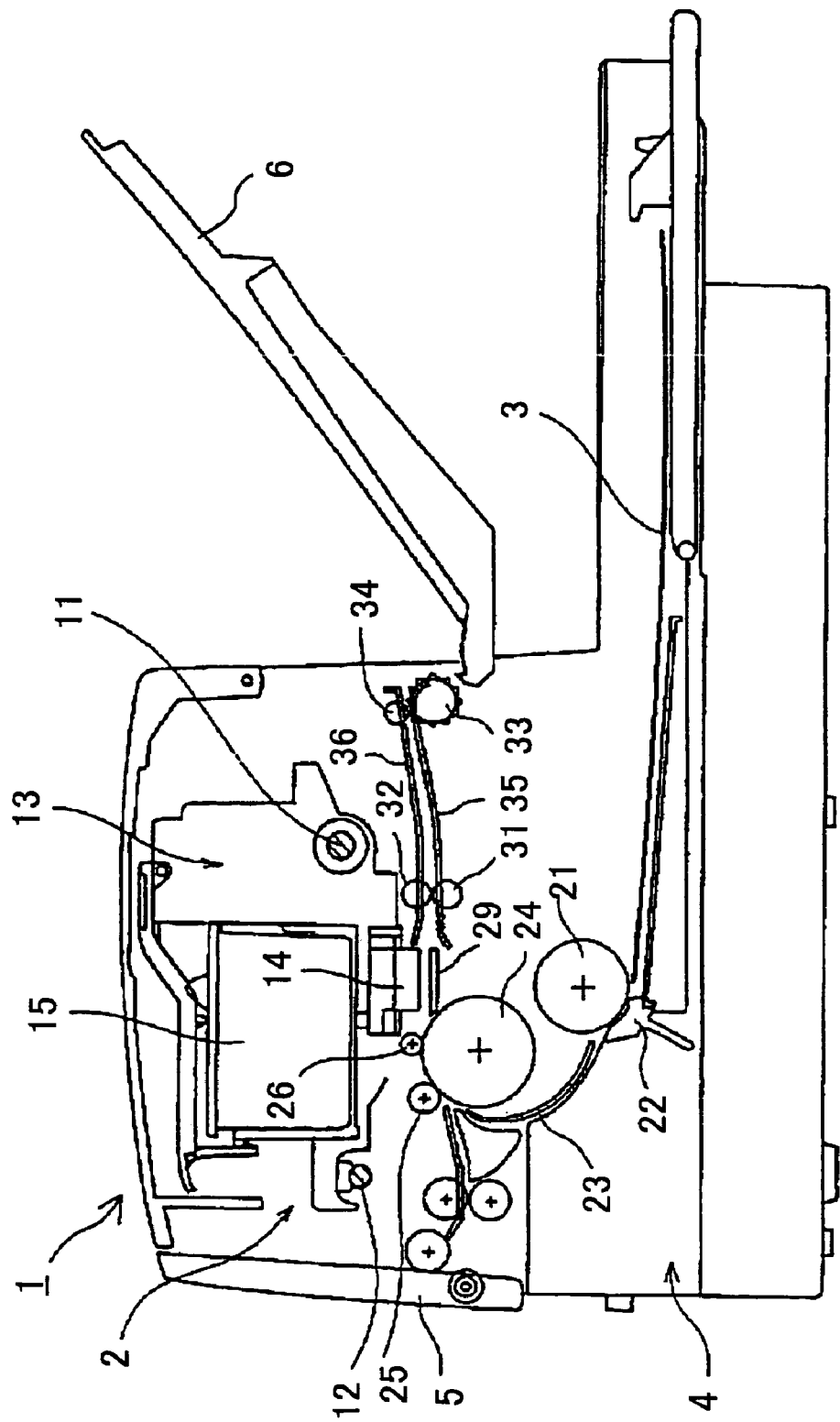
FIG. 2 is a side view showing the structure of the embodiment of the image forming apparatus.

FIG. 1 is a perspective view showing a structure of an embodiment of the image forming apparatus according to the present invention, and FIG. 2 is a side view showing the structure of this embodiment of the image forming apparatus. For the sake of convenience, FIGS. 1 and 2 show important internal parts of the image forming apparatus although actually not visible in the perspective and side views. In this embodiment of the image forming apparatus, the present invention is applied to an ink-jet printer.

In the ink-jet printer shown in FIGS. 1 and 2, a printing mechanism 2 is provided within a main printer body 1. The printing mechanism 2 includes a carriage 13 which is movable in a main scanning direction, recording heads 14 mounted on the carriage 13, and ink cartridges 15 for supplying inks to the recording heads 14. Paper 3 is supplied from a paper supply cassette 4 or a manual paper feed tray 5, and the printing mechanism 2 records an image on the paper 3. The paper 3 recorded with the image is ejected to a paper eject tray 6 which is located on a rear side of the main printer body 1.

In the printing mechanism 2, the carriage 13 is slidably supported by a main guide rod 11 and a sub guide rod 12 so as to be movable in the main scanning direction (in a direction perpendicular to the paper in FIG. 2). The main and sub guide rods 11 and 12 are provided between right and left side plates of the main printer body 1. The recording heads 14 are made up of ink-jet heads for respectively ejecting yellow (Y), cyan (C), magenta (M) and black (Bk) inks in a downward direction. The ink cartridges (ink tanks) 15 for supplying the yellow (Y), cyan (C), magenta (M) and black (Bk) inks to the corresponding ink-jet heads is detachably mounted on top of the carriage 13.

Each ink cartridge 15 has an upper opening which opens to the atmosphere, a lower opening for supplying the ink to the corresponding ink-jet head, and a porous material which is provided inside to hold the ink. The ink within the ink cartridge 15 is maintained to a slightly negative pressure by the capillary force of the porous material. The ink is supplied to the ink cartridge 15 to the corresponding ink-jet head.

The rear side (downstream side along the paper transport direction) of the carriage 13 is slidably supported by the main guide rod 11, and the front side (upstream side along the paper transport direction) of the carriage 13 is slidably supported by the sub guide rod 12. In order to move the carriage 13 in the main scanning direction, a timing belt 20 is between a driving pulley 18 which is driven by a motor 17 and a following pulley 19, and this timing belt 20 is fixed to the carriage 13. Hence, the carriage 13 makes a reciprocal movement as the motor 17 is rotated in the forward and reverse directions.

The recording heads 14 are made up of the ink-jet heads which eject the yellow (Y), cyan (C), magenta (M) and black (Bk) inks in this embodiment. However, it is possible to use a single recording head which ejects the yellow (Y), cyan (C), magenta (M) and black (Bk) inks. As will be described later, it is possible to use for the recording head 14 a piezoelectric type ink-jet head which includes a vibration plate forming at least a portion of a wall of an ink passage, and a piezoelectric element which deforms this vibration plate to apply pressure on the ink.

Of course, the structure of the recording head 14 is not limited to the above. For example, it is possible to use an electrostatic type ink-jet head having a vibration plate forming at least a portion of the wall of the ink passage, and an electrode confronting the vibration plate, where the vibration plate is deformed by electrostatic force to apply pressure on the ink. In addition, it is possible to use a thermal type ink-jet head which generates air bubbles by heating the ink within the ink passage using a heating resistor, so as to apply pressure on the ink by the air bubbles.

On the other hand, in order to transport the paper 3 which is set in the paper supply cassette 4 under the recording head 14, the following mechanisms are provided. That is, a paper supply roller 21 and a friction pad 22 are provided to separate and supply each paper 3 from the paper supply cassette 4 towards a paper guide member 23. A transport roller 24 turns over the side of the paper 3. A transport roller 25 pushes against the peripheral surface of the transport roller 24. A tip end roller 26 restricts a feed angle of the paper 3 from the transport roller 24. The transport roller 24 is driven by a motor 27 via a gear mechanism.

A paper guide member 29 guides the paper 3 which is fed from the transport roller 24 in correspondence with the moving range of the carriage 13 in the main scanning direction, under the recording heads 14. A transport roller 31 which is driven to feed the paper 3 in the paper eject direction, is provided at a position confronting a roller 32; on the downstream side of the paper guide member 29 along the paper transport direction. Further, a paper eject roller and a roller 34 are provided to eject the paper 3 onto the paper eject tray 6, and guide members 35 and 36 are arranged to form a paper eject path.

At the time of the recording, the recording heads 14 are driven in response to an image signal while moving the carriage 13, so as to eject the inks onto the stationary paper 3 and record 1 line. The next line is recorded after transporting the paper 3 by a predetermined amount in the paper transport direction. The recording operation is ended and the paper 3 is ejected in response to a recording end signal or a signal which indicates that a rear end of the paper 3 has reached the recording region of the recording heads 14.

A recovery unit 37 is arranged at a position on the right side in the moving direction of the carriage 13, outside the recording region. The recovery unit 7 includes a cap means, a suction means and a cleaning means, for recovering the recording heads 14 from a state where the ink-ejection is deteriorated or unsatisfactory. The carriage 13 is moved to the position of the recovery unit 37 during a recording wait state, so that the recording heads 14 are capped by the capping means to prevent the ink ejection nozzles of the recording heads 14 drying and clogging- In addition, when a purge operation is carried out with respect to the ink which is not related to the recording during the recording or the like, the suction means sucks the ink from the ink ejection nozzle of the corresponding recording head 14 and cleans the ink ejection nozzles by the cleaning means, so that the ink viscosity is maintained the same at each of the ink ejection nozzles to maintain a stable ink-jet performance.

When the ink-jet deteriorates, for example, the suction means sucks the ink, air bubbles and the like from the ink-jet nozzles in a state where the ink-jet nozzles are sealed by the capping means. As a result, the cleaning means can remove the ink, dust particles and the like adhered in the vicinity of the ink-jet nozzles, to positively recover the ink-jet performance of the recording heads 14. The inks recovered by the recovery unit 37 are drained to an ink drain tank (not shown) located at the lower portion of the main printer body 1, and is absorbed by an ink absorbing material provided within the ink drain tank.

Figure 3:
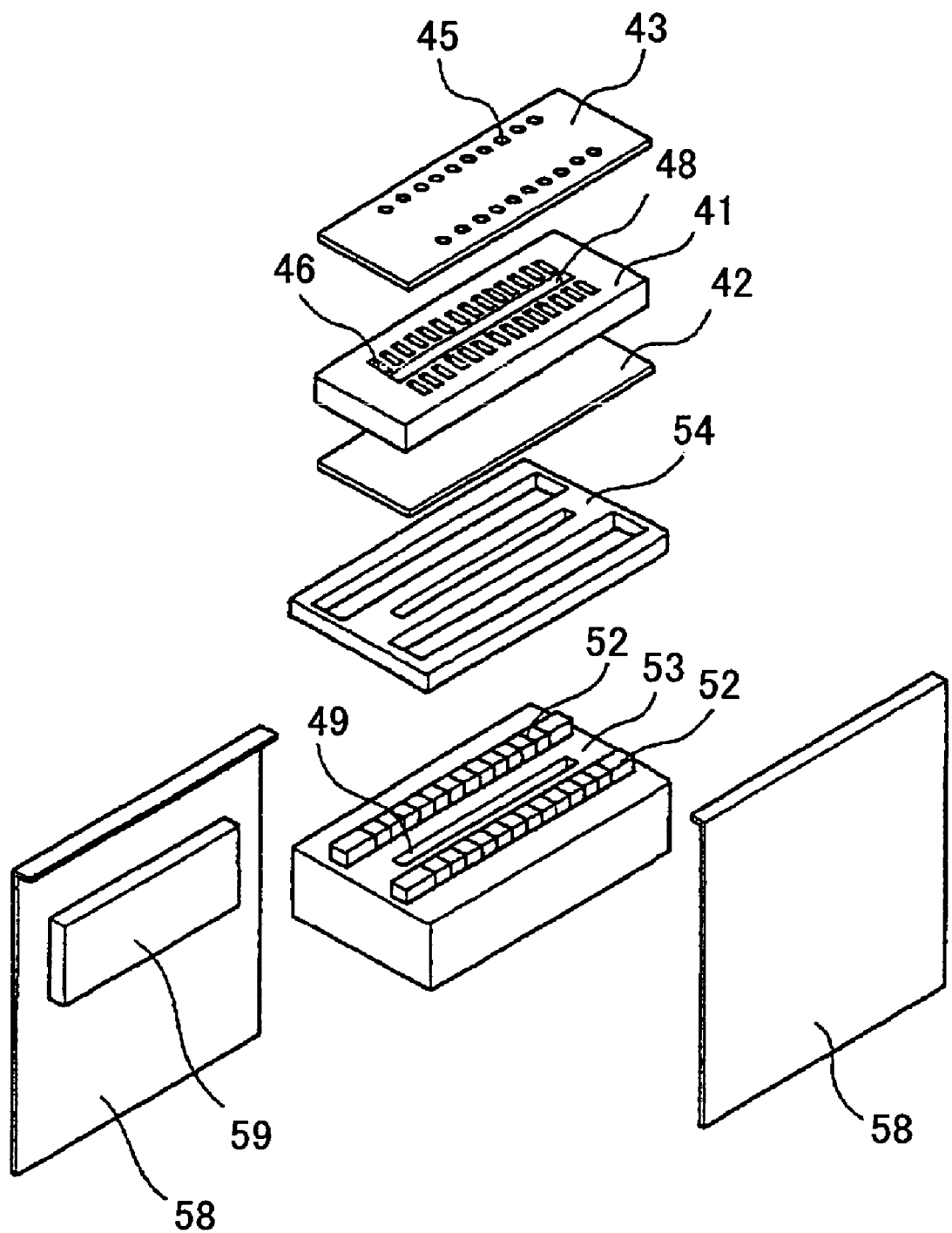
FIG. 3 is a disassembled perspective view of a recording head.
Figure 4:
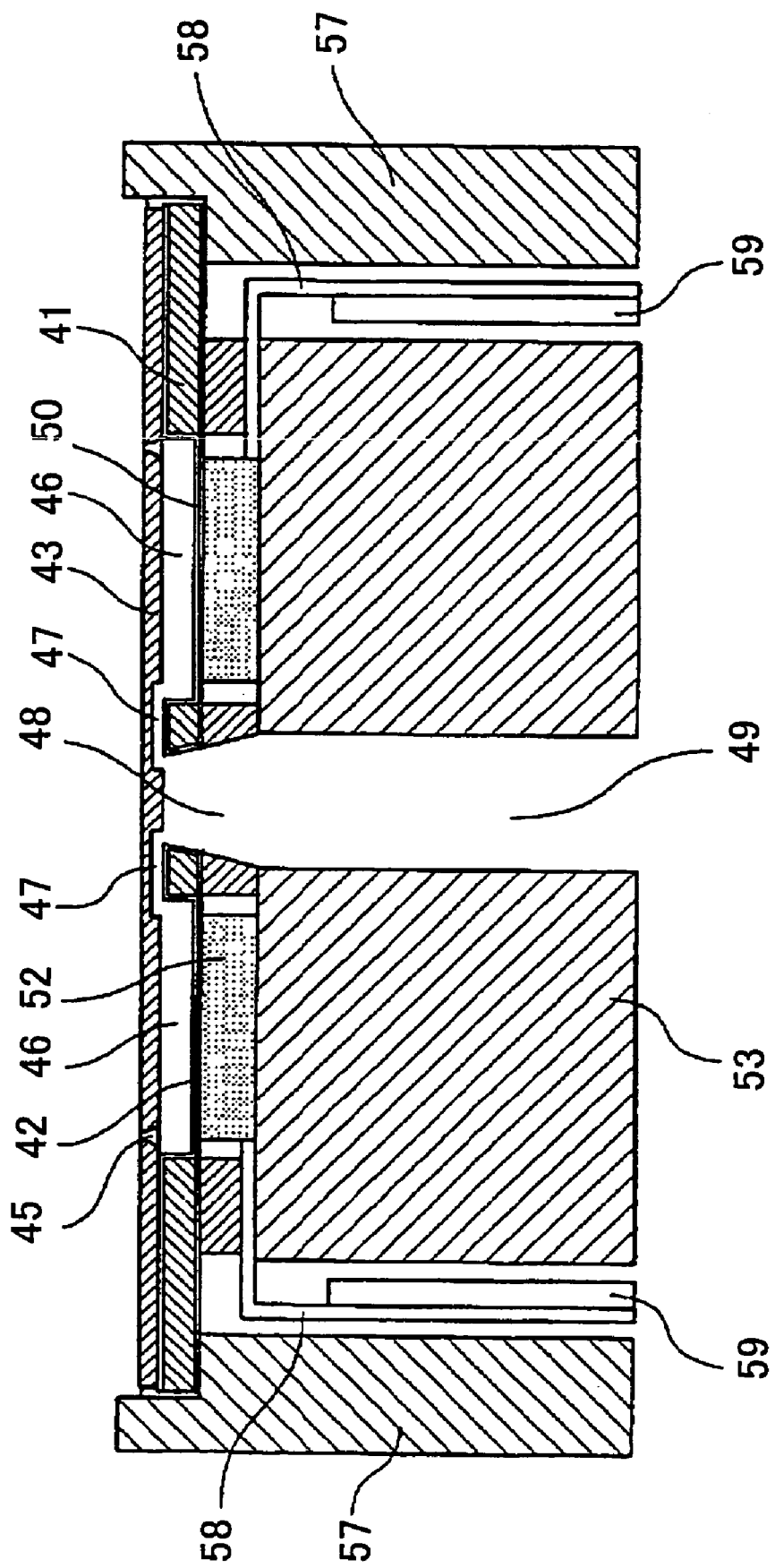
FIG. 4 is a cross sectional view of the recording head along a longitudinal direction of an ink chamber.
Figure 5:
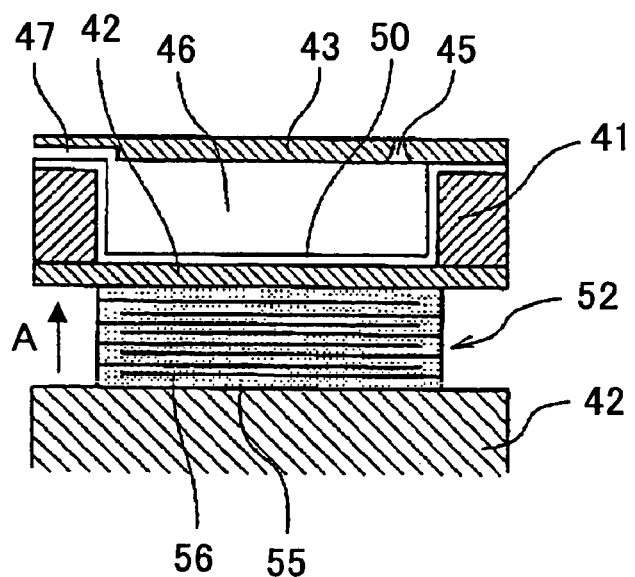
FIG. 5 is an enlarged view showing an important part of FIG. 4.
Figure 6:
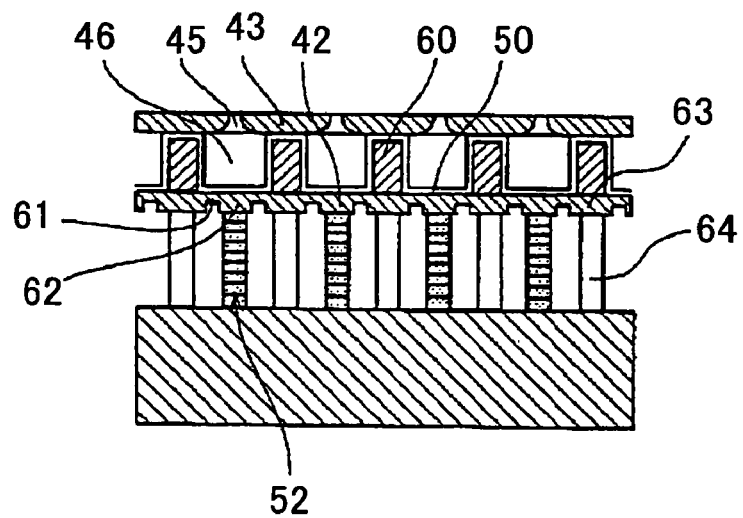
FIG. 6 is a cross sectional view of the recording head along a shorter side of the ink chamber.
Figure 7:
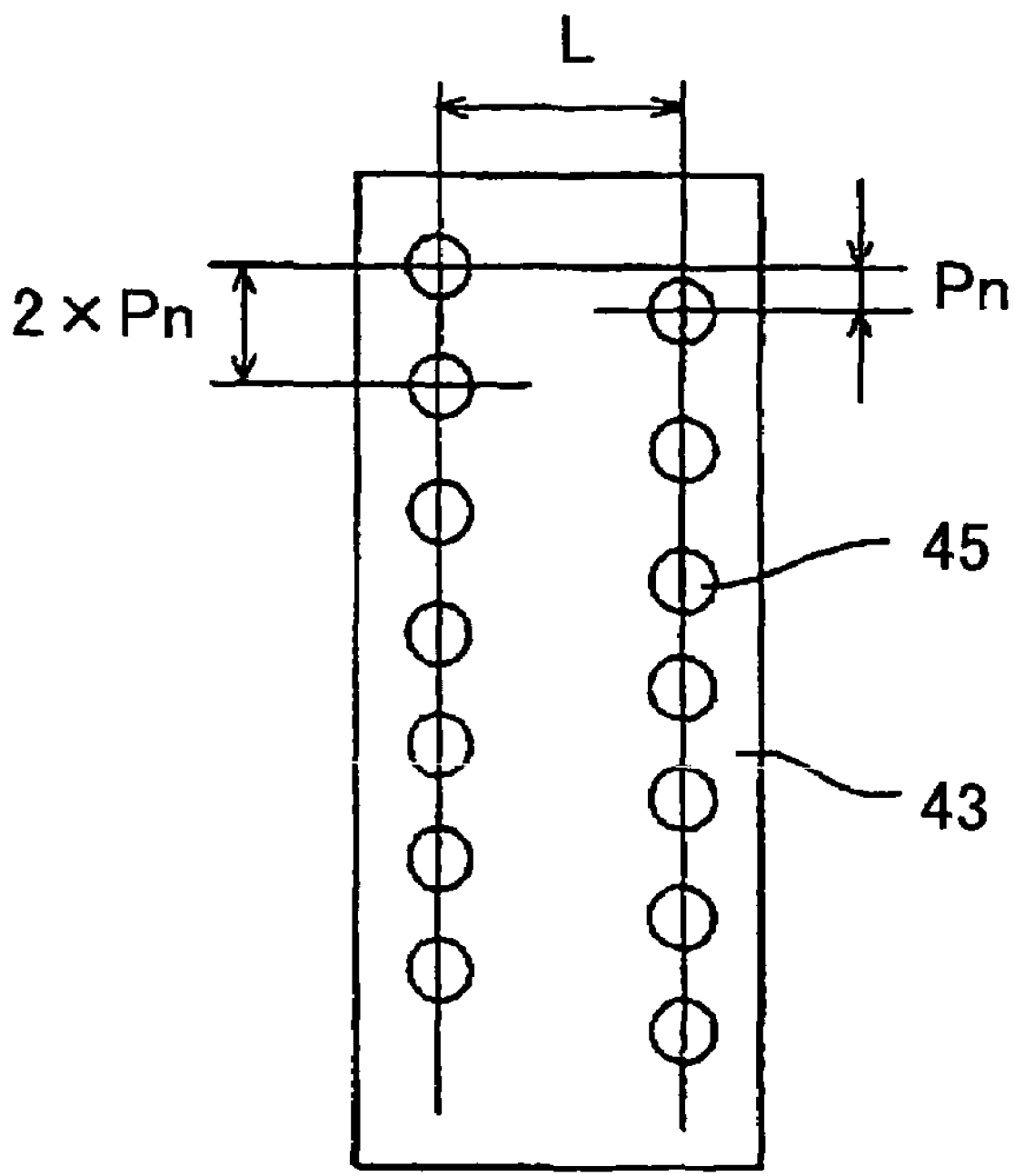
FIG. 7 is a plan view showing a nozzle plate of the recording head.

Next, a description will be given of the recording head 14 of the ink-jet printer, by referring to FIGS. 3 through 7. FIG. 3 is a disassembled perspective view of the recording head. FIG. 4 is a cross sectional view of the recording head along a longitudinal direction of an ink chamber, and FIG. 5 is an enlarged view showing an important part of FIG. 4 FIG. 6 is a cross sectional view of the recording head along a shorter side of the ink chamber. Further, FIG. 7 is a plan view showing a nozzle plate of the recording head.

The recording head 14, that is, the ink-jet head, includes a flow passage forming substrate (flow passage forming member) 41 made of a single crystal silicon substrate, a vibration plate 42 bonded to a lower surface of the flow passage forming substrate 41, and a nozzle plate 43 bonded to an upper surface of the flow passage forming substrate 41. Ink-jet nozzles 45 for ejecting the ink are formed in the nozzle plate 43. The ink-jet nozzles 45 communicate to pressure chambers 46 which form ink flow passages. A common ink chamber 48 supplies the ink to the ink chambers 46 via an ink supply passage 47 which functions as a flow passage resistance portion. A ink resistant thin film 50 made of an organic resin is formed on each wall of the pressure chambers 46, the ink supply passage 47 and the common ink chamber 48 which contact the ink on the flow passage forming substrate 41.

A stacked type piezoelectric element 52 is provided in correspondence with each pressure chamber 46 on the outer surface side (surface side opposite to the common ink chamber 48). In addition, the piezoelectric element 52 is fixed on a base substrate 53. A spacer member 54 is provided around the rows of piezoelectric elements 52.

As shown in FIG. 5, the piezoelectric element 52 has a stacked structure alternately having a piezoelectric material 55 and an internal electrode 56. The corresponding pressure chamber 46 is made to expand and contract due to contraction and expansion of the piezoelectric element 52 having a piezoelectric constant of d33. When a driving signal is applied to the piezoelectric element 52 and a charging is carried out, an expansion takes place in a direction indicated by an arrow A in FIG. 5. On the other hand, when the charge which is charged in the piezoelectric element 52 is discharged, a contraction takes place in a direction opposite to the direction indicated by the arrow A. The base substrate 53 and the spacer member 54 have penetrating holes which form an ink supply opening 49 for supplying the ink from the outside to the common ink chamber 48.

A head frame 57 is formed from an epoxy resin of polyphenylene sulfite by ejection molding. The outer peripheral portion of the flow passage forming substrate 41 and the lower outer edge portion of the vibration plate 42 are bonded to the head frame 57. The head frame 57 and the base substrate 53 are fixed to each other at a portion (not shown) by use of an adhesive agent, for example. A flexible printed circuit (FPC) cable 58 for supplying a driving signal is connected to the piezoelectric elements 52 by soldering, anisotropic conductor film (ACF) or wiring-bonding. A driving circuit (driver IC) 59 for selectively applying the driving signal (driving waveform) to each piezoelectric element 52 is connected to the FPC cable 58.

A (110) crystal face of the single crystal silicon forming the flow passage forming substrate 51 may be subjected to an anisotropic etching using an alkaline etchant such as a potassium hydroxide (KOH) solution, so as to form the penetrating holes which become the pressure chambers 56, a groove portion which becomes the ink supply passage 57, and the penetrating hole which becomes the common ink chamber 58.

As shown in FIG. 6, the vibration plate 42 is made of a metal, such as nickel, by electro-forming. The vibration plate 42 has thin portions 61 corresponding to each pressure chamber 46 so as to facilitate deformation of the vibration plate 42, thick portions 62 which are bonded to the piezoelectric elements 52, and thick portions 63 corresponding to partitioning walls between the pressure chambers 46. The flat surface side of the vibration plate 42 is bonded to the flow passage forming substrate 41 by an adhesive agent, and the thick portions 62 and 63 of the vibration plate 42 are bonded to the head frame 57 by an adhesive agent. Column portions 64 are provided between the base substrate 53 and the corresponding thick portions 63 of the vibration plate 42. The column portions 64 have the same structure as the piezoelectric elements 52.

The nozzle plate 43 includes the ink-jet nozzles 45 having a diameter of approximately 10 μm to 30 μm, at positions corresponding to the pressure chambers 46. The nozzle plate 43 is bonded to the flow passage forming substrate 41 by an adhesive agent. The plurality of ink-jet nozzles 45 form a plurality of dot forming means. As shown in FIG. 7, the rows of nozzles 45 (nozzle rows) are arranged perpendicularly to the main scanning direction. In each row of nozzles 45, a pitch between the nozzles 45 is 2×Pn. A distance between the two rows of nozzles 45 is L. In addition, one row of nozzles 45 and the adjacent row of nozzles 45 are mutually shifted by a pitch Pn along the sub scanning direction, so that the nozzles 45 are arranged in a zigzag manner. Accordingly, an image having a pitch Pn can be formed by one main scan and sub scan.

The nozzle plate 43 may be made of a metal such as stainless steel and nickel, a combination of a metal and a resin film made of a polyimide resin, for example, silicon, or a combination thereof. In addition, in order to secure an ink repellant characteristic at the nozzle surface (ink ejecting surface of the nozzle plate 43 having the nozzles 45 through which the ink is ejected), an ink repellant layer is formed on the nozzle surface by a known method such as plating and ink repellant coating.

In the ink-jet head having the structure described above, the piezoelectric elements 52 are selectively applied with a driving pulse voltage of approximately 20 V to 50 V, so that each selected piezoelectric element which is applied with the driving pulse voltage is displaced in the direction in which the layers of the piezoelectric element 52 are stacked. As a result, each selected piezoelectric element 52 deforms the corresponding vibration plate 42 towards the nozzle 45, thereby causing a change in the volume of the corresponding pressure chamber 46. A pressure is thus applied to the ink within the pressure chamber 46, and an ink drop is ejected from the nozzle 45.

The ejection of the ink drop from the nozzle 45 causes the ink pressure within the pressure chamber 46 to fall, and a slight negative pressure is generated within the pressure chamber 46 due to inertia of the ink flow. In this state, when the driving pulse voltage applied to the piezoelectric element 52 is turned OFF, the corresponding vibration plate 42 returns to its original position and the corresponding pressure chamber 46 returns to its original shape (volume), thereby further generating a negative pressure within the pressure chamber 46. In this state, the ink is supplied from the ink supply opening 49 and is supplied into the pressure chamber 46 via the ink supply passage 47 which forms the flow passage resistance portion. Hence, after the vibration of the ink meniscus surface at the nozzle 45 decays and stabilizes, the driving pulse voltage is applied to the piezoelectric element 52 for the next ink ejection.

Figure 8:
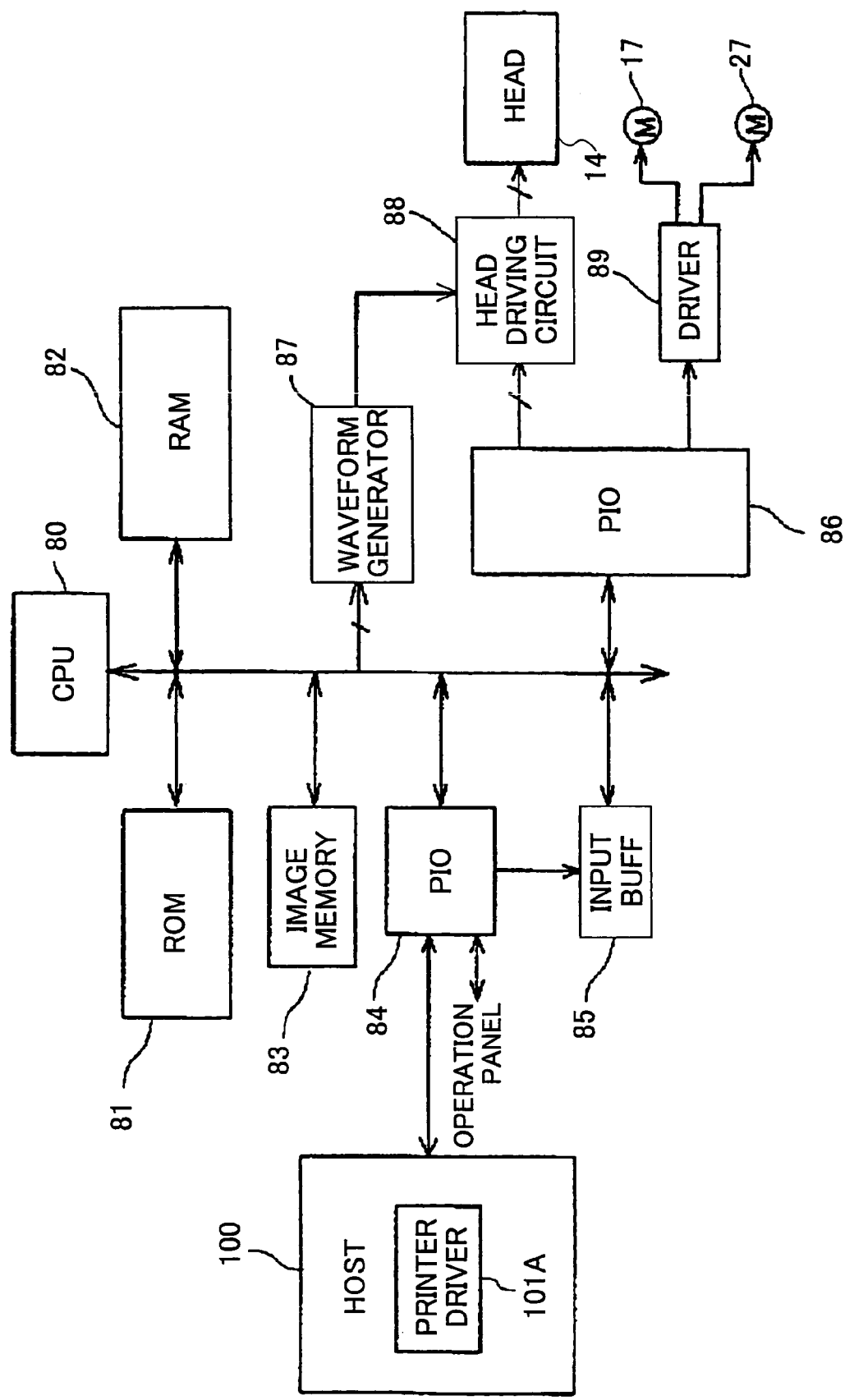
FIG. 8 is a system block diagram generally showing a controller of the ink-jet printer.

Next, a description will be given of a controller of the ink-jet printer, by referring to FIG. 8. FIG. 8 is a system block diagram generally showing a controller of the ink-jet printer.

The controller shown in FIG. 8 includes a microcomputer (CPU) 80 which generally controls the entire ink-jet printer, a ROM 81 which stores predetermined fixed information, a RAM 82 which is used as a work area, an image memory (raster data memory) 83 which stores image data (dot data or dot pattern data) transferred from a host unit 100, a parallel input and output (PIO) port 84, an input buffer 85, a parallel input an output (PIO) port 86, a waveform generating circuit 87, a head driving circuit 88 and a driver 89.

Various information and data such as the image data transferred from a printer driver 100A of the host unit 100, and detection signals from various sensors are input to the PIO port 84. In addition, predetermined information is output with respect to the host unit 100 and an operation panel (not shown) via the PIO port 84.

The waveform generating circuit 87 generates a driving waveform to be applied to the piezoelectric elements 52 of the recording heads 14. As will be described later, the desired driving waveform can be generated by a simple structure by using a digital-to-analog (D/A) converter which subjects a driving waveform data output from the CPU 80 to a digital-to-analog (D/A) conversion.

The head driving circuit 88 applies the driving waveform from the waveform generating circuit 87 to the piezoelectric elements 52 of the selected channels of the recording heads 14, based on various data and signals received via the PIO port 86. Further, the driver 89 drives and controls the motors 17 and 27 based on driving data received via the PIO port 86, so as to move the carriage 13 in the main scanning direction and rotate the transport roller 24 to transport the paper 3 by a predetermined amount.

Figure 9:
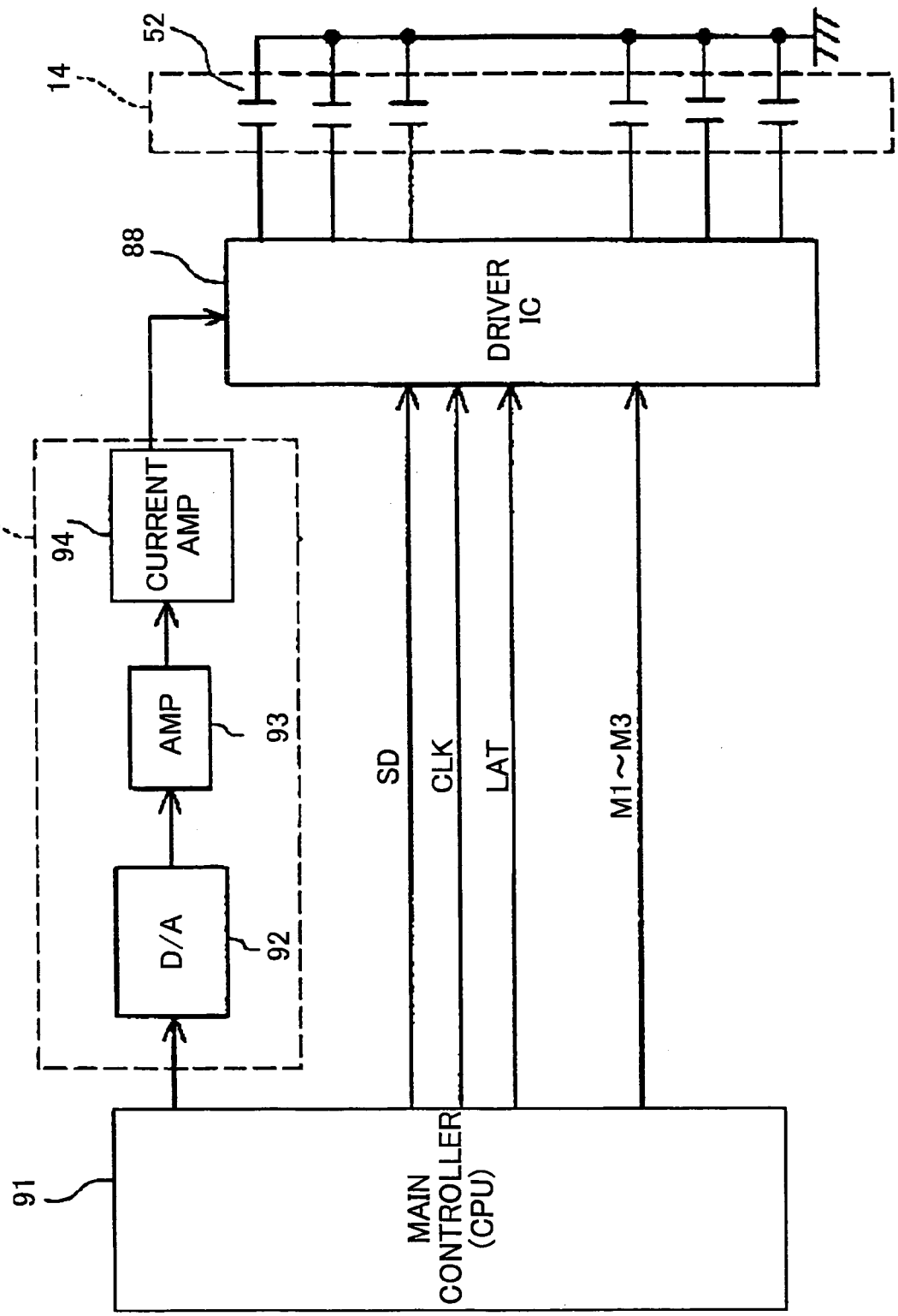
FIG. 9 is a system block diagram showing a driving and control section of the controller.
Figure 10:
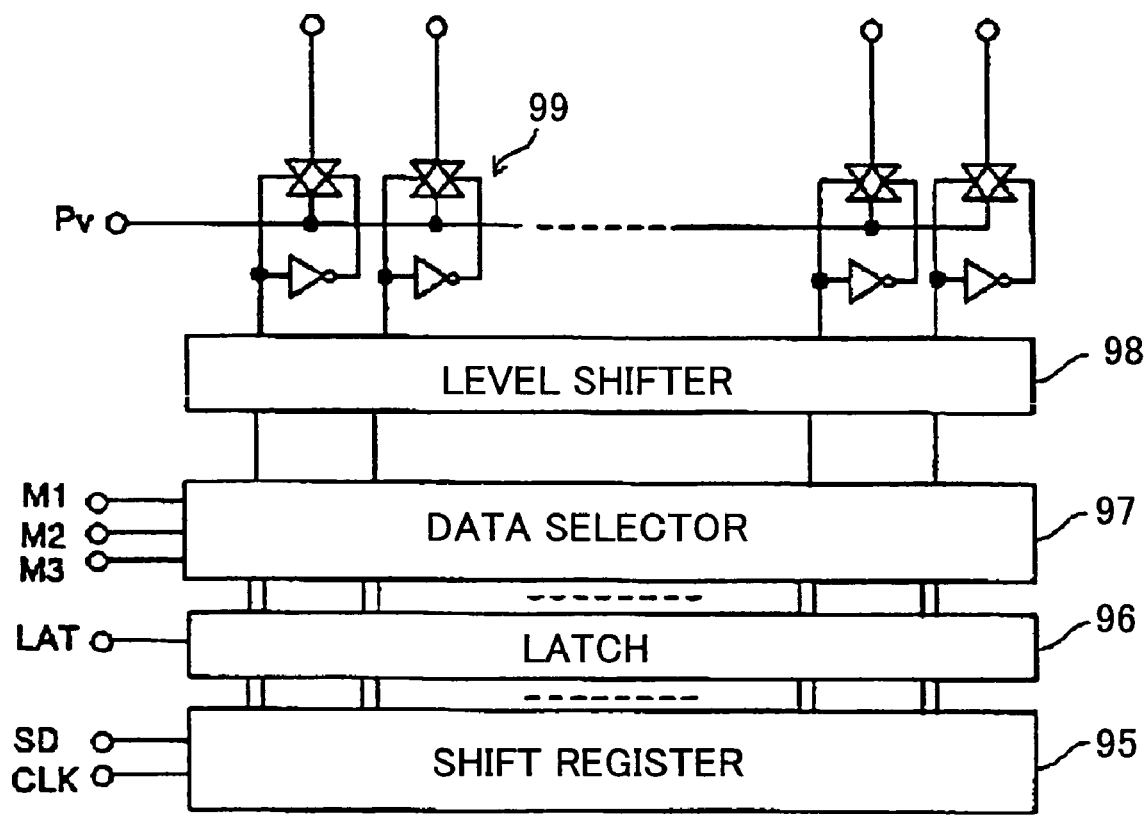
FIG. 10 is a system block diagram showing a head driving circuit.
Figure 11:
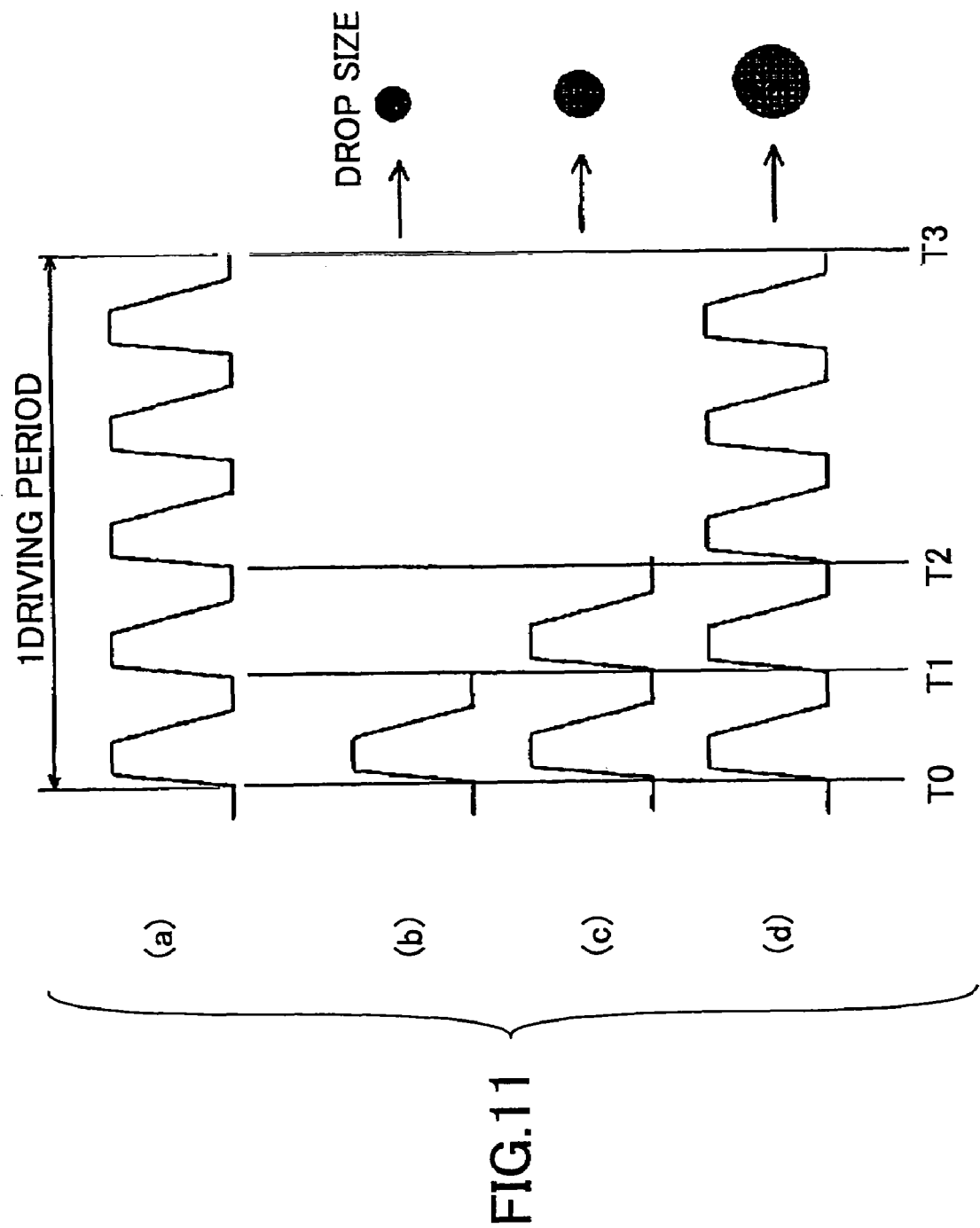
FIG. 11 is a timing diagram for explaining the operation of the driving and control section

A description will be given of a driving and control section of the controller related to the driving and control of the recording heads 14 will now be described with reference to FIGS. 9 through 11. FIG. 9 is a system block diagram showing the driving and control section of the controller, and FIG. 10 is a system block diagram showing the head driving circuit 88. FIG. 11 is a timing diagram for explaining the operation of the driving and control section.

In FIG. 9, a main controller (CPU) 91 processes front data (dot data) which is received from the host unit 100 as print data, and carries out a vertical-to-horizontal conversion depending on the layout of the recording heads 14. In addition, the main controller 91 generates a 2-bit driving data SD which is required to control the ink drop to a large drop, medium drop and small drop (and no drop or no printing) in correspondence with three-valued (ternary) data, and supplies the 2-bit driving data SD to the head driving circuit (driver IC) 88. The main controller 91 also supplies to the -head driving circuit 88 a clock-signal CLK, a latch signal LAT, and driving waveform selection signals M1 through M3 for selecting the driving waveform in correspondence with the dot size (size of ink drop) to be formed. Furthermore, the main controller 91 reads driving waveform data stored in the ROM 81, and supplies the driving waveform data to the driving waveform generating circuit 87.

The driving waveform generating circuit 87 includes a D/A converter 92 for converting the driving waveform data received from the main controller 91 into an analog signal, an amplifier 93 for amplifying the output analog signal of the D/A converter 92 to the actual driving voltage, and a current amplifier 94 for amplifying an output of the amplifier 93 to a sufficiently high current capable of driving the recording heads 14. For example, the current amplifier 94 outputs a driving waveform Pv including a plurality of driving pulses within one driving period as shown in FIG. 11(*a*). The driving waveform Pv is supplied to the head driving circuit 88.

As shown in FIG. 10, the head driving circuit 88 includes a shift register 95 for inputting the driving data SD in response to the clock signal CLK from the main controller 91, a latch circuit 96 for latching the value of the shift register 95 in response to the latch signal LAT from the main controller 91, a data selector 97 for selecting one of the driving waveform selection signals (logic signals) Ml through M3 from the main controller 91 depending on a 1-bit driving data which is latched by the latch circuit 96, a level shifter 98 for shifting an output (logic signal) of the data selector 97 to a driving voltage level, and transmission gates 99 having ON and OFF states thereof controlled by an output of the level shifter 98. The transmission gates 99 receive the driving waveform Pv from the driving waveform generating circuit 87, and is connected to the piezoelectric elements 52 of the corresponding nozzles of the recording heads 14.

Accordingly, in the head driving circuit 88, the data selector selects one of the driving waveform selection signals Ml through M3 depending on the driving data SD, and shifts the selected driving waveform selection signal (logic signal) to the driving voltage level by the level shifter 98. The driving voltage level output from the level shifter 98 is applied to the gates of the transmission gates 99.

As a result, the transmission gates 99 are switched depending on the duration of the selected one of the driving waveform selection signals Ml through M3, and the driving pulses forming the driving waveform Pv are applied to each channel connected to the transmission gate 99 which is ON.

For example, in a case where the driving waveform Pv includes the plurality of driving pulses as shown in FIG. 11(*a*), each transmission gate 99 which becomes ON only from a time T0 to a time T1 outputs one driving pulse as shown in FIG. 11(*b*). Hence, when the driving pulse shown in FIG. 11(*b*) is applied to the piezoelectric element 52, a small ink drop is ejected from the corresponding nozzle. Similarly, each transmission gate 99 which becomes ON only from the time T0 to a time T2 outputs two driving pulses as shown in FIG. 11(*c*). Thus, when the driving pulse shown in FIG. 11(*c*) is applied to the piezoelectric element 52, a medium ink drop is ejected from the corresponding nozzle. Further, each transmission gate 99 which becomes ON from the time T0 to a time T3 outputs five driving pulses as shown in FIG. 11(*d*). Accordingly, when the driving pulse shown in FIG. 11(*d*) is applied to the piezoelectric element 52, a large ink drop is ejected from the corresponding nozzle.

Therefore, by generating the driving waveform including a plurality of driving pulses and selecting the number of driving pulses to be applied to the piezoelectric element 52, it is possible to generate the necessary driving waveforms for ejecting the small ink drop, medium ink drop and large ink drop from one driving waveform. Consequently, only one circuit is required to generate the driving waveform and only one signal line is required to supply this driving waveform. For this reason, it is possible to reduce the size of the circuit board and transmission lines and also reduce the cost thereof.

Figure 12:
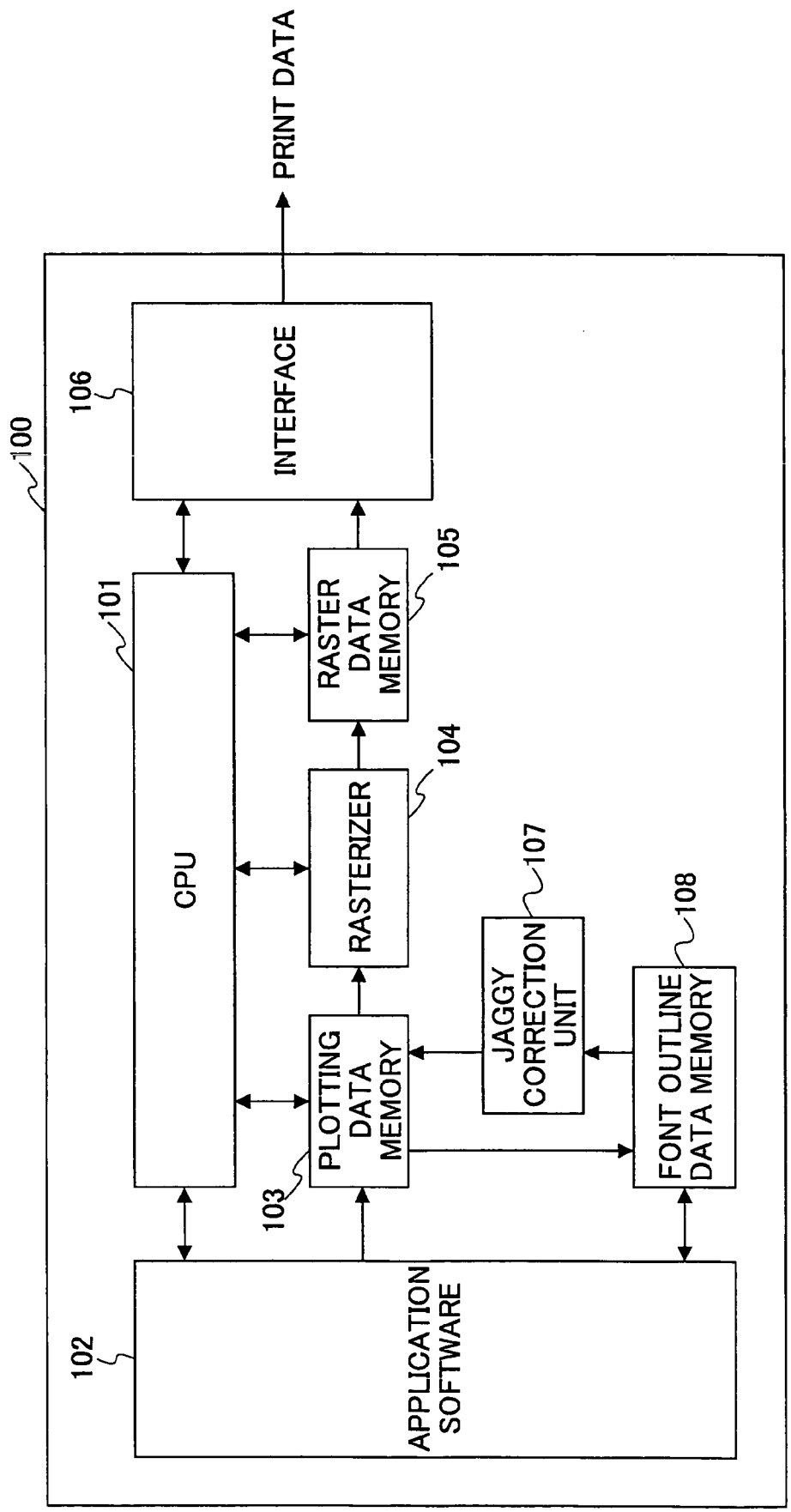
FIG. 12 is a system block diagram showing an embodiment of an image processing apparatus according to the present invention.

Next, a description will be given of an embodiment of the image processing apparatus according to the present invention, by referring to FIG. 12. FIG. 12 is a system block diagram showing the embodiment of the image processing apparatus. This embodiment of the image processing apparatus is formed by the host unit 100 which transfers the image data and the like to the ink-jet printer, and includes a printer driver 101A, that is, an embodiment of the printer driver according to the present invention. The host unit 100 and the printer driver 101A use an embodiment of the image processing method according to the present invention.

In the case of the embodiment of the image forming apparatus, that is, the ink-jet printer described above, the dot pattern of the image or characters to be actually recorded is received together with a print (record) instruction or command from the host unit 100, and no means is provided within the image forming apparatus to generate the dot pattern to be recorded. Hence, the dot pattern data is generated by the printer driver 101A and transferred from the host unit 100 (the embodiment of the image processing apparatus) to the image forming apparatus (ink-jet printer).

The host unit 100 shown in FIG. 12 includes a CPU (main control unit) 101, at least one application software 102, a plotting data memory 103, a rasterizer 104, a raster data memory 105, an interface 106, a jaggy correction unit 107, and a font outline data memory 108. Recording data (print data) is output from the interface 106 and supplied to the controller of the ink-jet printer shown in FIG. 8.

A print instruction which instructs recording of image or characters, received from an operating system (OS) or the application software 102 to be executed by the CPU 101, is temporarily stored in the plotting data memory 103. For example, the print instruction includes information related to the position, thickness, shape and the like of the lines to be recorded, and the font, size and position of the characters to be recorded. The print instruction is written in a predetermined print language.

The print instruction stored in the plotting data memory 103 is interpreted by the rasterizer 104. In the case of the print instruction to record a line, for example, the line is converted into a recording dot pattern depending on the specified position, thickness and the like. In addition, in the case of the print instruction to record characters, corresponding character contour information is read from the font outline data memory 108 and converted into a recording dot pattern depending on the specified position, size and the like. The recording pattern data obtained by the above described conversion is stored in the raster data memory 105.

The CPU 101 of the host unit 100 regards the conventional orthogonal lattice as the basic recording position, and rasterizes the data to be recorded into the recording dot pattern. The recording dot pattern (dot data) stored in the raster data memory 105 is transferred to the ink-jet printer via the interface 106. The jaggy correction unit 107 converts the dot data during the generation of the dot data.

Next, a description will be given of the ink used by the ink-jet printer. The ink drop which is ejected from the head in the ink-jet printer is formed by the printing (recording) ink which may be made up of the following constituent elements (c1)-(c10).

(c1) Pigment (Self-Dispersing Pigment), 6 wt. % or greater;
(c2) First Wetting Agent;
(c3) Second Wetting Agent;
(c4) Soluble Organic Solvent;
(c5) Anion or Nonion Based Surface Active Agent;
(c6) Polyole or Glycol Ether, Carbon Number 8 or Greater;
(c7) Emulsion;
(c8) Preservative;
(c9) pH Adjusting Agent; and
(c10) Pure Water.

In other words, the pigment (c1) is used as the coloring agent for the recording, and the solvent (c4) is used as an essential component to decompose and disperse the pigment (c1). In addition, the first and second wetting agents (c2) and (c3), the surface active agent (c5), the emulsion (c7), the preservative (c8) and the pH adjusting agent (c9) are added as additives. The first and second wetting agents (c2) and (c3) are mixed in order to effectively utilize the characteristics of each of the first and second wetting agents (c2) and (c3), and to facilitate viscosity adjustment.

A more detailed description will now be given of each of the constituent elements (c1)-(c10) of the ink.

The pigment (c1) is not limited to a particular kind, and may be formed by an inorganic pigment or an organic pigment. The inorganic pigment may be selected from titanium oxide, iron oxide and carbon black. The carbon black may be produced by known methods such as the contact method, the furnace method and the thermal method. On the other hand, the organic pigment may be selected from azo pigments, polycyclic pigments, chelating pigments, nitro pigments, nitroso pigments, and aniline pigments such as aniline black. The azo pigments may include azo lakes, insoluble azo pigments, condensation azo pigments, and chelating azo pigments. The polycyclic pigments may include phtalocyanine pigments, perylene pigments, perinone pigments, anthraquinone pigments, quinacridon pigments, dioxazine pigments, thioindigo pigments, isoindrinone pigments, and quinophtharone pigments. The chelating pigments may include basic chelating pigments and acid chelating pigments.

Of the above described pigments, the ink used in this embodiment preferably has a good affinity with water. The grain diameter of the pigment is preferably in a range of 0.05 μm to 10 μm, and more preferably 1 μm or less, and most preferably 0.16 μm or less. The amount of pigment within the ink, as the coloring agent, is preferably in a range of 6 wt. % to 20 wt. %, and more preferably in a range of 8 wt. % to 12 wt. %.

Particular examples of the pigments within the ink used in this embodiment are as follows.

The black pigment may be selected from carbon blacks (C. I. pigment black 7) such as furnace black, lampblack, acetylene black and channel black, metals such as copper, iron (C. I. pigment black 11) and titanium oxide, and organic pigments such as aniline black (C. I. pigment black 1).

Color pigments may be selected from C. I. pigment yellows 1 (fast yellow G), 3, 12 (diazo yellow AAA), 13, 14, 17, 24, 34, 35, 37, 42 (yellow iron oxide), 53, 55, 81, 83 (diazo yellow HR), 95, 97, 98, 100, 101, 104, 108, 109, 110, 117, 120, 138 and 153, C. I. pigment oranges 5, 13, 16, 17, 36, 43 and 51, C. I. pigment reds 1, 2, 3, 5, 17, 22 (brilliant fast scarlet), 23, 31, 38, 48:2 (permanent red 2B (Ba)), 48:2 (permanent red 2B (Ca)), 48:3 (permanent red 2B (Sr)), 48:4 (permanent red 2B (Mn)), 49:1, 52:2, 53:1, 57:1 (brilliant carmine 6B), 60:1, 63:1, 63:2, 54:1, 81 (rhodamine 6G lake), 83, 88, 101 (rouge), 104, 105, 106, 108 (cadmium red), 112, 114, 122 (quinacridon magenta), 123, 146, 149, 166, 168, 170, 172, 177, 178, 179, 185, 190, 193, 209 and 219, C. I. pigment violets 1 (rhodamine lake), 3, 5:1, 16, 19, 23 and 38, C. I. pigment blues 1, 2, 15 (phtalocyanine blue R), 15:1, 15:2, 15:3 (phtalocyanine blue E), 16, 17:1, 56, 60 and 63, and C. I. pigment greens 1, 4, 7, 8, 10, 17, 18 and 36.

Of course, other pigments may be used, such as graft pigments having the surface of the pigment (for example, carbon) processed by a resin or the like so as to be dispersible in water, and processed pigments having the surface of the pigment (for example, carbon) added with a functional group such as sulfone group and carboxyl group so as to be dispersible in water.

The pigment may also be encapsulated within microcapsules so as to be dispersible in water.

The black ink used in this embodiment preferably includes, as the pigment, a pigment dispersant which is obtained by dispersing the pigment within a water medium by a dispersing agent. The dispersing agent is preferably a known dispersant which is used to adjust a known pigment dispersant.

The dispersant may be selected from polyacrylic acid, polymethacrylate, acrylic acid-acrylonitrile copolymer, vinyl acetate-acrylic (acid) ester copolymer, acrylic acid-acrylic (acid) alkylester copolymer, styrene-acrylic acid copolymer, styrene-methacrylic acid copolymer, styrene-acrylic acid-acrylic (acid) alkylester copolymer, styrene-methacrylic acid-acrylic (acid) alkylester copolymer, styrene-α-methyl styrene-acrylic acid copolymer-acrylic (acid) alkylester copolymer, styrene-maleic acid copolymer, vinyl naphthalene-maleic acid copolymer, vinyl acetate-ethylene copolymer, vinyl acetate-fatty acid vinyl ethylene copopymer, vinyl acetate-maleic acid ester copolymer, vinyl acetate-crotonic acid copolymer, and vinyl acetate-acrylic acid copolymer.

In the ink used in this embodiment, the weight average molecular weight of these copolymers is preferably in a range of 3,000 to 50,000, and more preferably in a range of 5,000 to 30,000, and most preferably in a range of 7,000 to 15,000. The amount of the dispersing agent may be added within an appropriate range such that the pigment is stably dispersed and other desirable effects are not lost. The dispersing agent is preferably in a range of 1:0.06 to 1:3, and more preferably in a range of 1:0.125 to 1:3.

The pigment used as the coloring agent amounts to 6 wt. % to 20 wt. % with respect to the total wt. % of the ink, and the grain diameter is in a range of 0.05 μm to 0.16 μm. In addition, the pigment is dispersed within water by the dispersing agent, and the dispersing agent used is a macromolecular dispersing agent having a molecular weight in a range of 5,000 to 100,000. The picture quality is improved when the soluble organic solvent includes at least one kind of pyrrolidone derivative, and particularly 2-pyrrolidone.

With regard to the first and second wetting agents (c2) and (c3) and the soluble organic solvent (c4), water is included within the ink as a liquid medium in the case of the ink used in this embodiment. For example, the following soluble organic solvents may be used for the purposes of making the ink have desired properties, preventing drying of the ink, and improving the dissolution. A plurality of such soluble organic solvents may be mixed.

The first and second wetting agents (c2) and (c3) and the soluble organic solvent (c4) may be selected from polyhydric alcohols such as ethylene glycol, diethylene glycol, triethylne glycol, propylene glycol, dipropylene glycol, tripropylene glycol, tetraethylene glycol, hexylene glycol, polyethylene glycol, polypropylne glycol, 1,5-pentanediol, 1,6-hexanediol, glycerol, 1,2,6-haxanetriol, 1,2,4-butanetriol, 1,2,3-butanetriol, and petriol.

The first and second wetting agents (c2) and (c3) and the soluble organic solvent (c4) may also be selected from polyhydric alcohol alkylethers such as ethylene glycol monoethyl ether, ethylene glycol monobutyl ether, diethylene glycol monomethyl ether, diethylene-glycol monoethyl ether, diethylene glycol monobutyl ether, tetraethylene glycol monomethyl ether, and propylene glycol monoethyl ether.

The first and second wetting agents (c2) and (c3) and the soluble organic solvent (c4) may also be selected from polyhydric alcohol aryl ethers such as ethylene glycol monophenyl ether, and ethylene glycol monobenzyl ether.

The first and second wetting agents (c2) and (c3) and the soluble organic solvent (c4) may also be selected from nitrogen-containing heterocyclic compounds such as 2-pyrrolidone, N-methyl-2-pyrrolidone, N-hydroxyethyl-2-pyrrolidone, 1,3-dimethylimidazolidinone, ε-caprolactam, and γ-butyrolactone.

The first and second wetting agents (c2) and (c3) and the soluble organic solvent (c4) may also be selected from amides such as formamide, N-methyl formamide, and N,N-dimethyl formamide.

The first and second wetting agents (c2) and (c3) and the soluble organic solvent (c4) may also be selected from amines such as monoethanol amine, diethanol amine, reiethanol amine, monoethyl mine, diethyl amine and triethyl amine.

The first and second wetting agents (c2) and (c3) and the soluble organic solvent (c4) may also be selected from sulfur-containing compounds such as dimethyl sulfoxide, sulfolane, and thiodiethanol, propylene carbonate, and ethylne carbonate.

Of the above described organic solvents, diethylene glycol, thiodiethanol, polyethylene glycol 200-600, trienthylene glycol, glycerol, 1,2,6-hexanetriol, 1,2,4-butanetriol, petriol, 1,5-pentanediol, 2-pyrrolidone, and N-methyl-2-pyrrolidon are particularly preferable since these solvents have the effect of obtaining satisfactory dissolution and preventing deterioration of the ink ejection characteristic.

Other preferable wetting agents include sugar. Sugars may include polysaccharides such as monosaccharide, disaccharide, and oligosaccharide (including trisaccharide and tetrasaccharide), and preferably glucose, mannose, fructose, ribose, xylose, arabinose, galactose, maltose, cellobiose, lactose, sucrose, trehalose, and maltotriose. The polysaccharides are used to refer to sugars in a broad sense, and may include naturally existing materials such as α-cyclodextrine and cellulose.

In addition, derivatives of these sugars may include reducing sugar (for example, sugar alcohol (general formula $HOCH_2(CHH)_nCH_2OH$ (where n is an integer from 2 to 5) of the above described sugars, sugar oxide (for example, aldonic acid and uronic acid), amino acid, and thio acid. Sugar alcohol is particularly preferable, and may include maltitol and sorbit.

The sugar content within the in composition is preferably in a range of 0.1 wt. % to 40 wt. %, and more preferably in a range of 0.5 wt. % to 30 wt. %.

The surface active agent (c5) is not limited to a particular kind. For example, anionic surface active agent may be selected from polyoxyethylene alkylether acetate salt, dodecylbenzenesulfonic acid salt, lauryl acid salt, and polyoxyethylene alkylether sulfate salt.

For example, nonionic surface active agent may be selected from polyoxyethylene alkylether, polyoxyethylene alkylester, polyoxyethylene sorbitane fatty-acid ester, polyoxyethylene alkylfenyl ether, polyoxyethylene alkylamine, and polyoxyethylene alkylamide. The above described surface active agents may be used independently or, a mixture of two or more surface active agents may be used.

The surface tension of the ink used in this embodiment corresponds to an index indicating the permeability of the ink with respect to the recording paper. This surface tension indicates a dynamic surface tension within a short time of one second or less from the time when the ink surface is formed, and is different from a static surface tension which is measured in saturation time. A known method of measuring the dynamic surface tension-within one second or less may be employed, including a method proposed in a Japanese Laid-Open Patent Application No.63-31237. In this embodiment, a Wilhelmy type suspended plate surface tension measuring equipment is employed to measure the dynamic surface tension. The surface tension is preferably 40 mJ/m$^2$ or less, and more preferably 35 mJ/m$^2$ or less, so as to obtain satisfactory fixing characteristic and drying characteristic.

With regard to the polyole or glycol ether (c6) with carbon number 8 or greater, a partially soluble polyole and/or glycol ether having a solubility in a range of 0.1 wt. % to 4.5 wt. % within water at a temperature of 25° C. is/are added to the ink at a proportion of 0.1 wt. % to 10.0 wt. % with respect to the total weight of the ink. As a result, the wetting characteristic of the ink with respect to the heating element is improved, and it was confirmed by the present inventor that ink ejection stability and frequency stability are achieved even when the amount of polyol and/or glycol ether added is small. For example, the solubility was 4.2% at 20° C. for 2-ethyl-1,3-hexanediol, and the solubility was 2.0% at 25° C. for 2,2,4-trimethyl-1,3-pentanediol.

The penetrant having the solubility in the range of 0.1 wt. % to 4.5 wt. % within water at 25° C. has an advantage in that the permeability is extremely high although the solubility is low. Hence, it is possible to produce an ink having an extremely high permeability by combining the penetrant having the solubility in the range of 0.1 wt. % to 4.5 wt. % within water at 25° C. with other solvents and/or other surface active agents.

It is preferable that the ink used in this embodiment is added with the emulsion (c7), such as resin emulsion. The resin emulsion refers to an emulsion having water in the continuous phase and a resin components in the disperse phase. The resin component in the disperse phase may be selected from acrylic resin, vinyl acetate resin, styrene-butadiene resin, vinyl chloride resin, acrylic-styrene resin, butadiene resin, and styrene resin.

Preferably, the resin component in the ink which is used in this embodiment is a copolymer having both a hydrophilic part and a hydrophobic part. In addition, although the grain diameter of the resin component is not limited as long as the emulsion is formed, the grain diameter is preferably approximately 150 nm or less, and more preferably in a range of 5 nm to 100 nm.

The resin emulsion may be obtained by mixing the resin grains into water, in some cases together with a surface active agent. For example, acrylic resin or styrene-acrylic resin emulsion may be obtained by mixing (meta) acrylic (acid) ester and/or styrene to water, in some cases together with a surface active agent. The mixture ratio of the resin component and the surface active agent is preferably in a range of approximately 10:1 to-approximately 5:1. If the surface active agent used does not amount to this range, the emulsion is difficult to obtain. On the other hand, it is undesirable for the surface active agent used to exceed this range, because there is a tendency for the water resistance and the permeability of the ink to deteriorate in such a case.

The ratio of the resin which is used as the disperse phase component of the emulsion and the water is preferably in a range of 60 wt. % to 400 wt. % with respect to 100 wt. % resin, and more preferably in a range of 100 wt. % to 200 wt. % with respect to 100 wt. % resin.

Existing resin emulsions include styrene-acrylic resin emulsions called Microgel E-1002 and Microgel E-5002 (both product names) manufactured by Nippon Paint Co., Ltd., acrylic resin emulsion called BonCoat 4001 (product name) manufactured by Dai Nippon Ink Chemical Industry Limited, styrene-acrylic resin emulsion called BonCoat 5454 (product name) manufactured by Dai Nippon Ink Chemical Industry Limited, styrene-acrylic resin emulsion called SAE-1014 (product name) manufactured by Nippon Zeon Company Limited, and acrylic resin emulsion called Saibinol SK-200 (product name) manufactured by Saiden Chemical Company Limited.

The ink used in this embodiment preferably includes the resin emulsion having the resin component in a range of 0.1 wt. % to 40 wt. % of the ink, and more preferably in a range of 1 wt. % to 25 wt. % of the ink.

The resin emulsion has viscosity-increasing and aggregating characteristics, and has the effects of suppressing the penetration of the coloring component and promoting the fixing of the coloring component on the recording medium such as paper. In addition, depending on the kind of resin emulsion, a coating is formed on the recording medium, so as to improve the resistance of the recorded image against friction.

The ink used in this embodiment may use a known preservative (c8), a known pH adjusting agent, and pure water (c10), in addition to the coloring agent (c1), solvent (c4) and surface active agent (c5) described above.

For example, the preservative (or anti-mold agent) (c8) may be selected from sodium dehydroacetate, sodium sorbate, 2-pyridinethiol-1-sodium oxide, sodium benzoate, and sodium pentachlorophenol.

An arbitrary material may be used for the pH adjusting agent, as long as it is possible to adjust the pH to seven or greater without introducing undesirable effects on the ink. For example, the pH adjusting agent may be selected from amines such as diethanol amine and triethanol amin, hydroxides of alkaline metal elements such as lithium hydroxide, sodium hydroxide and potassium hydroxide, ammonium hydroxide, quaternary ammonium hydroxide, quaternary phosphonium hydroxide, and carbonates such as lithium carbonate, sodium carbonate and potassium carbonate.

For example, a chelating reagent may be selected from ethylenediamine sodium tetroacetate, nitro sodium triacetate, hydroxyethyl ethylenediamine sodium triacetate, eiethylene triamine sodium pentoacetate, and uramil sodium diacetate.

For example, the corrosion inhibiter may be selected from acid sulfite, sodium thiosulfate, thiodiglycolic acid ammonium nitrite, diisopropyl ammonium nitrite, pentaerythritol tetranitrate, and dicyclohexyl ammonium nitrite.

By forming the ink to include at least the pigment (c1), the soluble organic solvent (c4), the polyole or glycol ether (c6) with carbon number 8 or greater, and the pure water (c10), it is possible to obtain the following advantageous effects (E1)-(E6) even when the recording is made on plain paper.

(E1) Good color tone (sufficient color generation and color reproducibility);

(E2) High image tone;

(E3) Sharp picture quality free of feathering phenomenon and color bleeding phenomenon in the characters and image;

(E4) Image having little ink penetrating phenomenon to the other side of the recording medium and applicable to duplex recording;

(E5) High ink drying characteristic (fixing characteristic) suited for high-speed recording; and (E6) High ruggedized characteristic such as light resistance and water resistance of the image.

Therefore, it is possible to greatly improve the image tone, color generation, color reproducibility, feathering, color bleeding, duplex recording characteristic, fixing characteristic and the like, to thereby realize a high picture quality.

Next, a description will be given of the jaggy correction carried out in this embodiment of the image processing apparatus, the printer driver and the image processing method. The jaggy correction converts a periphery of a stepped transition part of dots forming a contour portion of characters and/or graphics of an image or image data into dots having a smaller size than the dots forming portions other than the periphery of the stepped transition portion or into dot data having a small size.

Figure 13:
FIG. 13 is a diagram showing an output character which is recorded as a result of an image processing when the image processing includes no jaggy correction.
Figure 14:
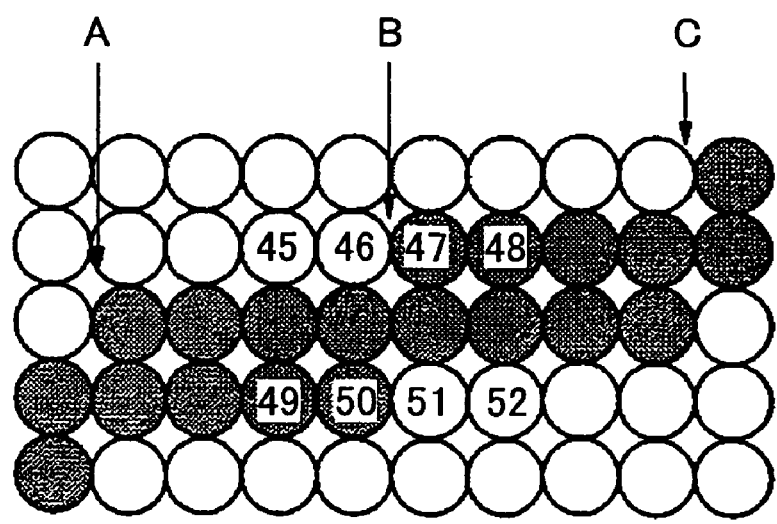
FIG. 14 is a diagram showing a dot arrangement at an oblique line portion of the output character shown in FIG. 13.

First, for comparison purposes, a description will be given of a case where no jaggy correction is made, by referring to FIGS. 13 and 14. FIG. 13 is a diagram showing an output character which is recorded as a result of an image processing when the image processing includes no jaggy correction. FIG. 13 shows a Japanese hiragana character "で". FIG. 14 is a diagram showing a dot arrangement at an oblique line portion of the output character.

According to the image processing including no jaggy correction, the quality of the recorded character is poor as may be seen from FIG. 13 since the jaggy portion is generated at the oblique line portion. As shown in FIG. 14, the dots are arranged in a stepped manner at the oblique line portion, thereby forming transition points A, B and C. As a result, a step difference amounting to at least one dot is generated at the transition points A, B and C, to thereby deteriorate the quality of the recorded character. In FIG. 14, reference numerals "45" to "52" indicate arbitrary dot (or pixel) positions.

Figure 15A:
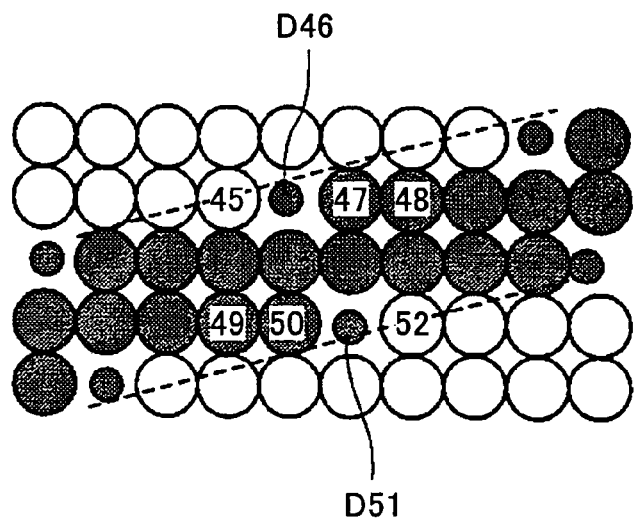
FIGS. 15A and 15B are diagrams for explaining the first embodiment of the jaggy correction of an oblique line having an inclination of ¼ for first and second cases.
Figure 15B:
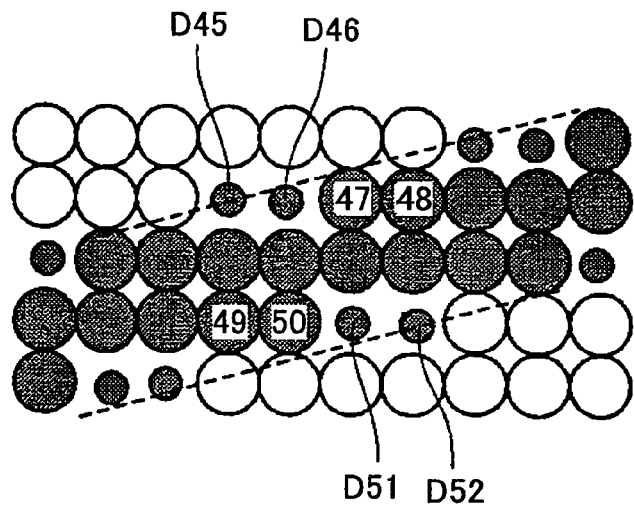
Figure 16:
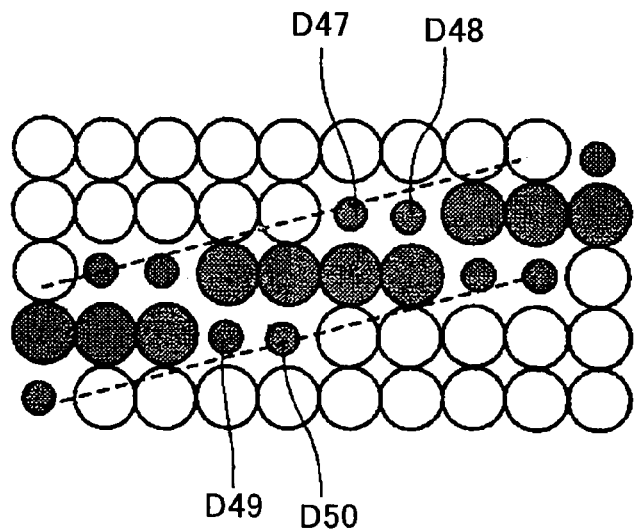
FIG. 16 is a diagram for explaining the first embodiment of the jaggy correction of the oblique line having the inclination of ¼ for a third case.
Figure 17A:
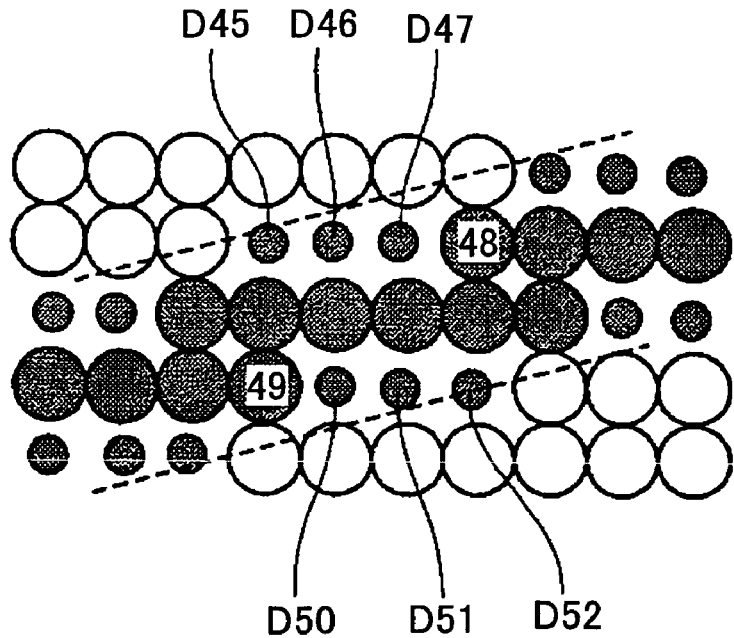
FIGS. 17A and 17B are diagrams for explaining the first embodiment of the jaggy correction of the oblique line having the inclination of ¼ for fourth and fifth cases.
Figure 17B:
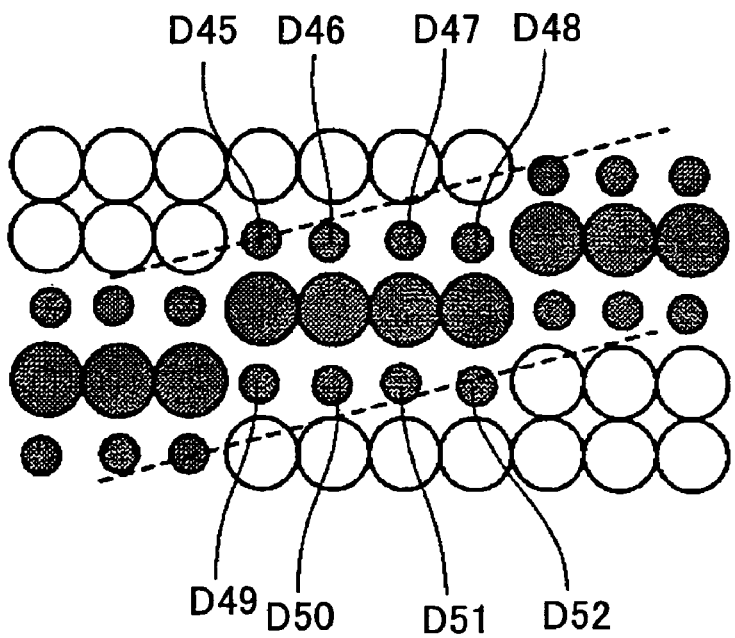
Figure 18A:
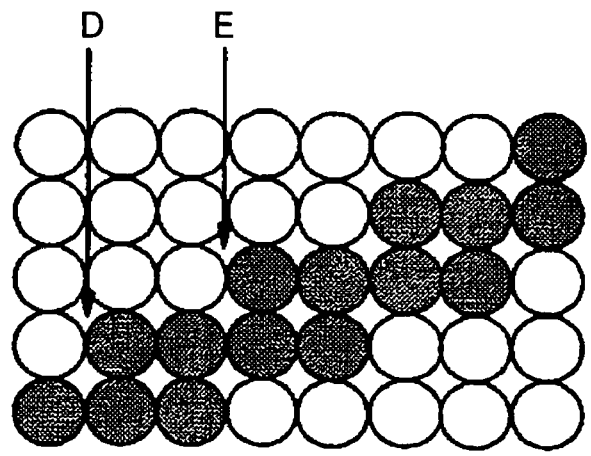
FIGS. 18A through 18C are diagrams for explaining the first embodiment of the jaggy correction of an oblique line having an inclination of ½.
Figure 18B:
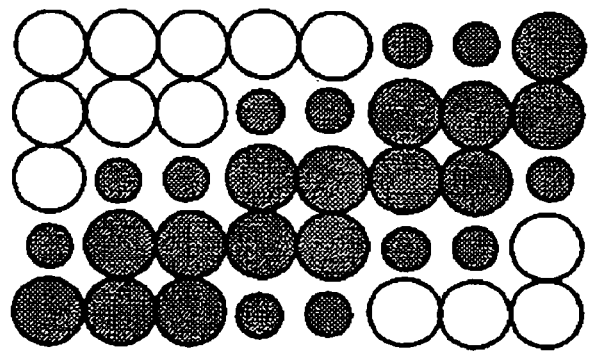
Figure 18C:
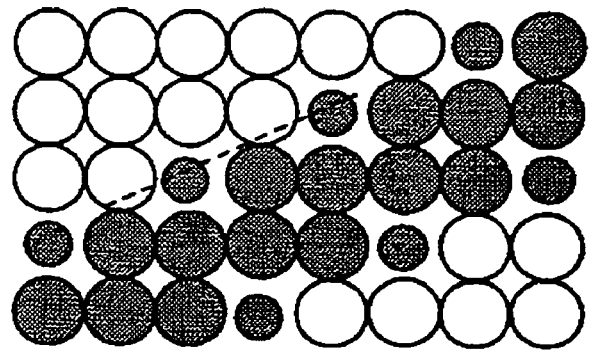
Figure 19A:
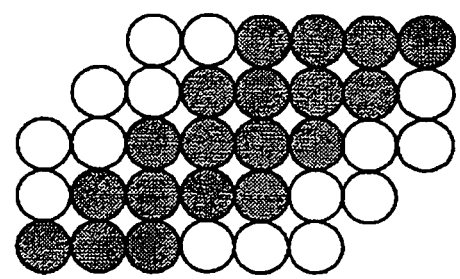
FIGS. 19A and 19B are diagrams for explaining the first embodiment of the jaggy correction of an oblique line having an inclination of ⅓.
Figure 19B:
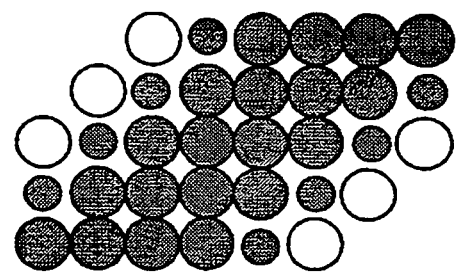

Next, a description will be given of a first embodiment of the jaggy correction employed in this embodiment, by referring to FIGS. 15A through 19B. FIGS. 15A and 15B are diagrams for explaining the first embodiment of the jaggy correction of an oblique line having an inclination of ¼ for first and second cases. FIG. 16 is a diagram for explaining the first embodiment of the jaggy correction of the oblique line having the inclination of ¼ for a third case. FIGS. 17A and 17B are diagrams for explaining the first embodiment of the jaggy correction of the oblique line having the inclination of ¼ for fourth and fifth cases. FIGS. 18A through 18C are diagrams for explaining the first embodiment of the jaggy correction of an oblique line having an inclination of ½. FIGS. 19A and 19B are diagrams for explaining the first embodiment of the jaggy correction of an oblique line having an inclination of ⅟₁.

FIGS. 15A through 17B show cases where the number of dots forming the straight line between the two stepped transition portions is four, that is, the inclination is ¼. FIGS. 15A through 17B show the dot arrangement at the oblique line portion so as to explain the different jaggy corrections.

In FIGS. 15A and 15B, small ink drops (small dots) are added to blank portions at the transition point. That is, the periphery of the stepped transition portion of the dots forming the contour portion of the character and/or graphics are formed by dots having a smaller size than the dots forming portions other than the periphery of the stepped transition portion.

In FIG. 16, image dots are replaced by small ink drops (small dots), so that the periphery of the stepped transition portion of the dots forming the contour portion of the character and/or graphics are formed by dots having a smaller size than the dots forming portions other than the periphery of the stepped transition portion.

In FIGS. 17A and 17B small ink drops (small dots) are added to blank portions at the transition point, and image dots are replaced by small ink drops (small dots). That is, the periphery of the stepped transition portion of the dots forming the contour portion of the character and/or graphics are formed by dots having a smaller size than the dots forming portions other than the periphery of the stepped transition portion.

In FIGS. 15A through 17B, D45 through D52 indicate the dot (or pixel) position, and "D" is omitted for the sake of convenience when the dot position is indicated within the dot. The same designations will be used in the subsequent drawings.

In other words, in the first case shown in FIG. 15A, the originally blank dot positions D46 and D51 at the periphery of the transition point (stepped transition portion) are added with a small dot having a smaller size that the large dots forming the portions other than the periphery of the stepped transition portion. Hence, the blank dot data at the dot positions D46 and D52 are converted into small dot data. As a result, the small dots (small ink drops) are recorded at the originally blank dot positions D46 and D51 at the periphery of the stepped transition portion.

In the second case shown in FIG. 15B, the small dots are recorded at the originally blank dot positions D45, D46, D51 and D52 at the periphery of the stepped transition portion.

In the third case shown in FIG. 16, the image dots D47, D48, D49 and D50 at the periphery of the stepped transition portion are converted into small dots which are smaller than the large dots forming the portions other than the stepped transition portion. Hence, the large dot data at the dot positions D47, D48, D49 and D50 are converted into small dot data. As a result, the small dots (small ink drops) are recorded at the originally large image dot positions D47, D48, D49 and D50 at the periphery of the stepped transition portion.

In the fourth case shown in FIG. 17A, the originally blank dot positions D45, D46, D51 and D52 at the periphery of the stepped transition portion are added with a small dot having a smaller size that the large dots forming the portions other than the periphery of the stepped transition portion, and further, the image dots D47 and D50 at the periphery of the stepped transition portion are converted into small dots which are smaller than the large dots forming the portions other than the stepped transition portion. Thus, the small dots are recorded at the two blank portions (D45 and D46, and D51 and D52) and one image portion (D47 and D50).

In the fifth case shown in FIG. 17B, the same conversion is made as in the fourth case shown in FIG. 17A, and in addition, up to two dots forming the stepped transition portion are converted into small dots. FIG. 17B shows a case where the two image dots D48 and D49 are converted into small dots.

Therefore, according to the first through fifth cases described above, the step difference at the transition point (stepped transition portion) is reduced by recording the small dots, and a relatively smooth oblique line portion can be recorded solely by the dot arrangement itself. In addition, in the case of the ink-jet recording, the ink spreads when the ejected ink hits the recording medium. Moreover, when the ink used has the dye as the main component, even when the jaggy correction is made by the dot arrangement described above, the contour smoothness may deteriorate when the ink-jet recording is made on plain paper due to the feathering. However, the feathering can be suppressed by use of the ink which is described above and used in this embodiment. In other words, the effects of reducing the jaggy portion by the jaggy correction which is made by the dot arrangement described above can be maintained even when the ink-jet recording is made on plain paper, because the ink used in this embodiment effectively suppresses the feathering.

The ink used in this embodiment reduces the feathering, but the bleeding does occur slightly. But this slight bleeding smoothens the contour portion by smoothly connecting the adjacent dots, to make the jaggy portion even less conspicuous. Consequently, owing to the phenomenon peculiar to the ink-jet recording and the phenomenon peculiar to the ink used in this embodiment, it is possible to record a smooth oblique line portion in which the jaggy portion is virtually inconspicuous.

The inclination is ¼ for the cases shown in FIGS. 15A through 17B. However, the jaggy correction may be made similarly with respect to other inclinations, including ⅓, ⅕ or less, and even with respect to oblique line portions which are mirror images of the above or rotated by 90°, 180°, 270° or the like.

Next, a description will be given of a case where the number of dots forming the straight line between two stepped transition portions is two, that is, the oblique line has an inclination of ½.

FIGS. 18A through 18C are diagrams for explaining the first embodiment of the jaggy correction of the oblique line having the inclination of ½. When the number of dots forming the straight line between two stepped transition points D and E is two (that is, the inclination of the oblique line is ½) as shown in FIG. 18A and two small dots are added to the blank portions at the stepped transition points D and E, the picture quality of the image at the stepped transition points D and E cannot be improved as shown in FIG. 18B because the small dots are added at the same positions as the image dots forming the oblique line, that is, the small dots are added to the adjacent transition points.

Hence, a range in which the small dots are added is limited to one pixel before the transition point, that is, the number of dots is set to one less than the number of dots forming the straight line between the two stepped transition portions, as shown in FIG. 18C. As a result, it is possible to obtain an oblique line with the improved jaggy even when the inclination of the oblique line is ½.

Next, a description will be given of a case where the number of dots forming the straight line between two stepped transition portions is one, that is, the oblique line has an inclination of ⅟₁.

FIGS. 19A and 19B are diagrams for explaining the first embodiment of the jaggy correction of the oblique line having the inclination of ⅟₁. When the number of dots forming the straight line between two stepped transition points is one (that is, the inclination of the oblique line is ⅟₁) as shown in FIG. 19A and small dots are added to the blank portions at the stepped transition points as shown in FIG. 19B, the small dots form the same oblique line which is formed by the image dots to thereby increase the width of the line.

Hence, no small dots are added in the case of the oblique line having the inclination of ⅟₁, because the stepped transition points are continuous from the beginning. In other words, when the inclination of the oblique line is ⅟₁, the jaggy is inconspicuous, and the stepped transition portions have a tendency of being relieved due to the spreading of the ink and the slight bleeding of the ink used for the ink-jet recording. Therefore, the number of dots forming the straight line between two stepped transition portions minus one is set equal to zero. As a result, it is possible to prevent the undesirable effects of the jaggy correction carried out with respect to the oblique line having the inclination of ⅟₁.

By selecting the jaggy correction method depending on the inclination of the oblique line portion, it is possible to always realize an optimum jaggy correction which will not make the lines or characters fat or make the jaggy more conspicuous by the addition of the small dots even in the case of the oblique lines having the inclinations such as ⅟₁, ½ and ⅔.

In other words, the dots in the periphery of the stepped transition portion are converted into dots having a smaller size than the dots forming the portions other than the stepped transition portion, and the jaggy correction method is changed depending on the inclination of the contour portion (inclination of the stepped transition portion). That is, a method for converting the dot data into dot data of smaller dots or, a method for forming the smaller dots, is set differently depending on the inclination of the stepped transition portion, so that an optimum jaggy correction is carried out depending on the inclination and the picture quality of the image is improved.

Next, a description will be given of the method of forming dots in the periphery of the stepped transition portion and having a smaller size than the dots in the portions other than the stepped transition portion, that is, the method of converting the data into dot data of dots having the smaller size. In the following description, the term "small dot" in the periphery of the stepped transition portion is used to mean that the size of the dot is smaller than the size of the dots at the portions other than the stepped transition portion. Hence, the "small dot" is not limited to a dot formed by a small ink drop.

Figure 20:
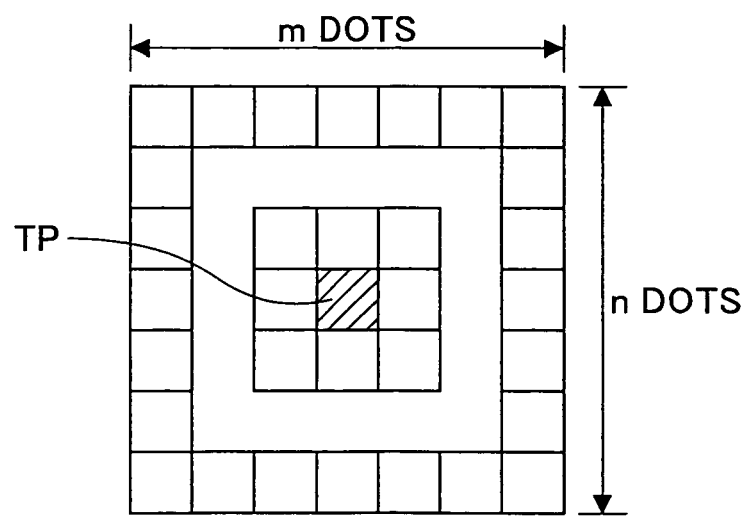
FIG. 20 is a diagram showing a window which is used for a pattern matching of a dot data conversion process.
Figure 21:
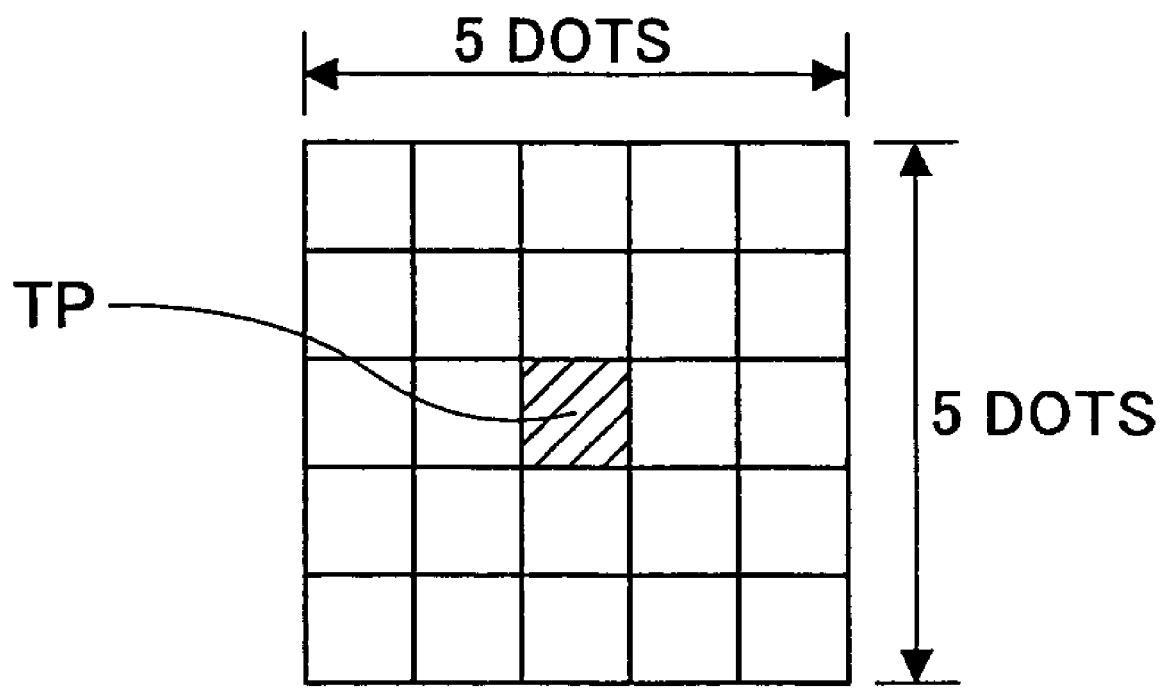
FIG. 21 is a diagram for explaining a-window size used for the dot data conversion process.

A pattern matching can be used as an effective method of adding the small dots or replacing the dots by the small dots. FIG. 20 is a diagram showing a window which is used for the pattern matching of a dot data conversion process. FIG. 20 shows a m×n window having m pixels arranged horizontally and n pixels arranged vertically. In the following description, it is assumed for the sake of convenience that the window size is m×n=5×5, that is, m=5 and n=5 as shown in FIG. 21. FIG. 21 is a diagram for explaining a window size used for the dot data conversion process.

The font data is developed into the bit-map data by the printer driver 101A. The bit-map data indicates the dots forming the font. The bit-map data, indicating the font data, is subjected to the pattern matching in units of the window described above, for each bit.

Figure 22:
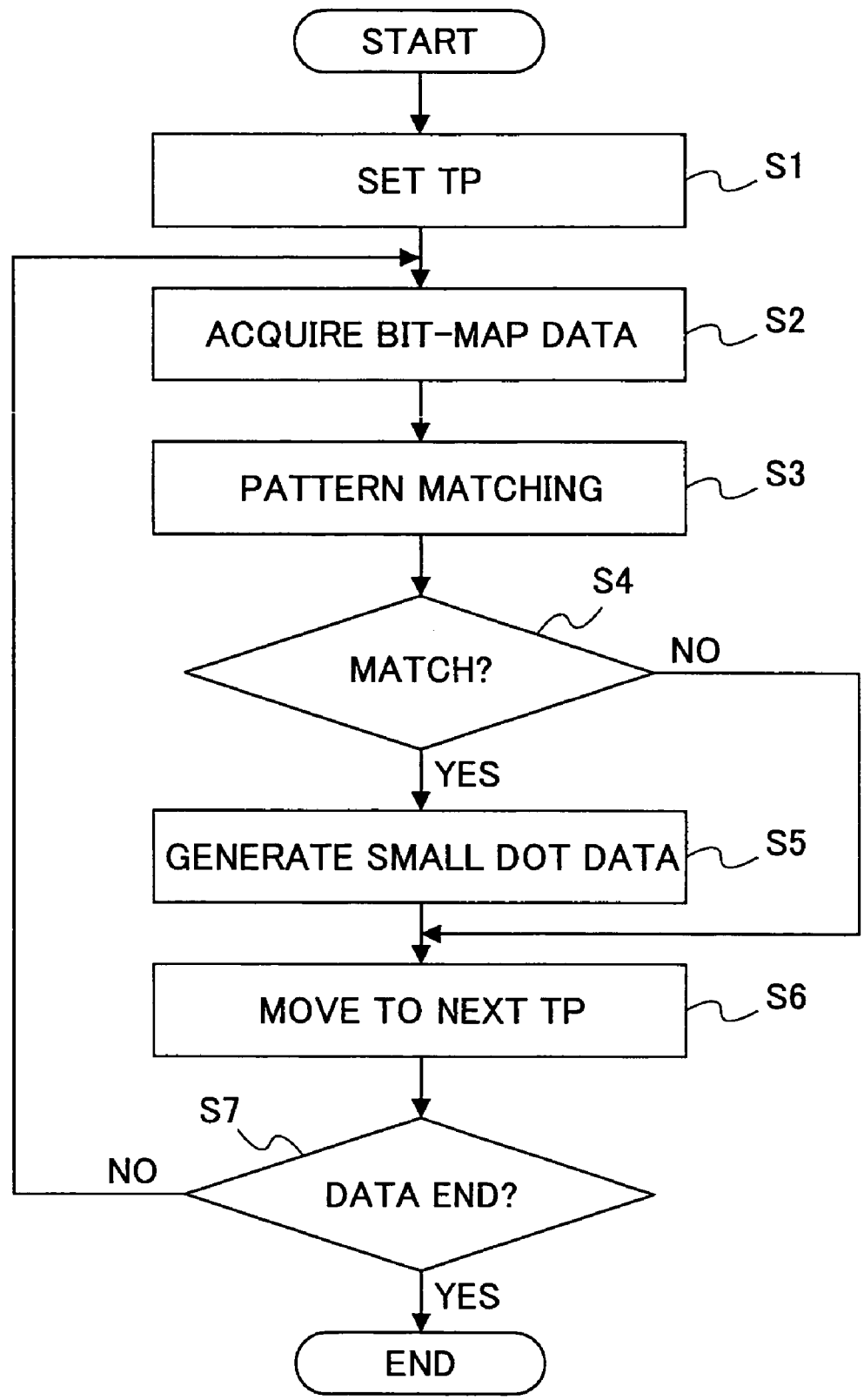
FIG. 22 is a flow chart for explaining a pattern matching process.

A description will be given of a pattern matching process (dot data conversion process) carried out by the printer driver 101A, by referring to FIG. 22. FIG. 22 is a flow chart for explaining the pattern matching process (dot data conversion process). It is assumed for the sake of convenience that the small dot is formed by a small ink drop.

First, a step S1 sets a target pixel TP to a start of the font data. A step S2 acquires the bit-map data of the font data corresponding to the window, by using the target pixel TP as the center of the window. Hence, the acquired bit-map data corresponds to the data amounting to 5×5=25 dots.

Thereafter, a step S3 carries out a pattern matching by comparing the acquired bit-map data (pattern of the acquired data) and a predetermined reference data (reference pattern) which is used to add the small dot or to replace the dot by the small dot. A step S4 decides whether or not the compared patterns match. The process advances to a step S5 if the decision result in the step S4 is YES, and the process advances to a step S6 if the decision result in the step S4 is NO.

The step S5 generates the small dot data for the target pixel TP, so as to replace the dot of the target pixel TP into the small dot (small ink drop in this particular case). The process advances to the step S6 after the step S5.

The step S6 moves to a next target pixel TP. In addition, a step S7 decides whether or not the target pixel TP is the end of data. The process returns to the step S2 if the decision result in the step S7 is NO, so as to repeat the pattern matching until the end of data. On the other hand, the process ends if the decision result in the step S7 is YES.

The process shown in FIG. 22 may treat one pixel as a 1-byte data or, a 1-bit data. When treating one pixel as a 1-byte data, 25 bytes are required to represent data amounting to 25 dots. On the other hand, when treating one pixel as a 1-bit data, only 4 bytes are required to represent data amounting to 25 dots, and only 3 bytes are required if the target pixel TP is to be excluded from the representation. Hence, the amount of data to be processed is small when one pixel is treated as a 1-bit data, and the required memory capacity can be reduced and the processing speed can be improved in this case.

The original font data may he represented by 0 (blank) or 255 (print data) as in the case of the bit-map data or represented by 0 (blank) or 1 (print data) as in the case of bi-level data. In such cases, if the data indicating the small dot is once converted into 0 (blank) or 255 (print data) when generating the data of the small dot, the data itself forming the blank data or font may be replaced by the data (for example, 85) representing the small dot. When processing the original font data "0" and "1" as they are, a separate memory (memory for the small dot data) having the same size as the font data may be provided, and the data "1" representing the print data may be generated at the position where the small dot is to be added.

Therefore, it is possible to form an oblique line with the improved jaggy by printing the small dots and the large dots, in the former case where the font data is formed by the data indicating the small dots and the large dots generated by the pattern matching, and in the latter case where the font data is formed by the bi-level data (0 and 1) for the small dots and the original bi-level data (0 and 1) for the original data.

In addition, by using the 5×5 window and the reference pattern, it is possible to judge whether or not to replace the blank and the image dot into the small dot in a range within two dots about the transition point.

For example, when the reference pattern shown in FIG. 23A is used, it is possible to replace the dot (data) at the pixel position (dot position) D45 into the small dot as shown in FIG. 24. When the reference pattern shown in FIG. 23B is used, it is possible to replace the dot (data) at the pixel position (dot position) D47 into the small dot as shown in FIG. 24. When the reference pattern shown in FIG. 23C is used, it is possible to replace the dot (data) at the pixel position (dot position) D48 into the small dot as shown in FIG. 24. FIGS. 23A through 23C are diagrams showing different reference patterns used by the pattern matching process, and FIG. 24 is a diagram for explaining a dot data conversion of the pattern matching process.

For example, if the target pixel TP is located at a dot position De in the pattern shown in FIG. 24, the transition point is outside the window and the transition point cannot be detected. For this reason, the dot conversion process can be carried out in the range amounting to two dots in the vicinity of (that is, adjacent to) the transition point. When adding the small dot also at the dot position De, the size of the window and the size of the reference pattern should be set to 7×7 pixels. In other words, by enlarging the sizes of the window and the reference pattern, it becomes possible to detect the transition point of the oblique line which is close to horizontal or vertical, and to add the small dots depending on the inclination of the oblique line, so as to optimize the picture quality of the oblique line.

Of course, the sizes of the window and the reference pattern are not limited to those described above, and may be determined depending on the extent to which the replacement to the small dots is to be made and whether or not the processing time is quick enough to cope with the printing speed. Because the amount of data to be compared by the pattern matching process increases as the sizes of the window and the reference pattern increase, the time require to carry out the pattern matching process increases as the sizes of the window and the reference pattern increase. Hence, from the point of view of reducing the processing time, it is desirable for the sizes of the window and the reference pattern are small. On the other hand, the number of dots in the vicinity of the transition point and to be converted into the small dots is determined by the picture quality of the character obtained by the jaggy correction. Therefore, it is necessary to determine the optimum sizes of the window and the reference pattern based on the processing speed and the picture quality of the character.

According to experiments conducted by the present inventor, it was found that a sufficient improvement of the picture quality of the character can be obtained even by adding 7 or less small dots, because in the case if the above described ink used in this embodiment, the jaggy between the adjacent dots is reduced by the spreading of the ink. Furthermore, it was also found that a sufficient improvement of the processing speed can be obtained, and that a throughput of 10 PPM or greater is obtainable. Thus, the window size is preferably set to $m \leqq 7$ or $n \leqq 7$.

When the processing speeds for the first through fifth cases described above in conjunction with FIGS. 15A through 17B are compared, the processing speed is the fastest for the first case shown in FIG. 15A, and the processing speed decreases for the second case shown in FIG. 15B, the third case shown in FIG. 16, the fourth case shown in FIG. 17A and the fifth case shown in FIG. 17B in this order.

The processing speeds become as described above, because the first and second cases only need to carry out the pattern matching process when the target pixel TP is blank, and the third case only needs to carry out the pattern matching process when the target pixel TP is an image dot. On the other hand, the fourth and fifth cases need to carry out the pattern matching process when the target pixel TP is the blank and also when the target pixel TP is the image dot. In other words, the fourth and fifth cases need to carry out the pattern matching process for all font data. For this reason, it is possible to create the font data (print data) having the improved jaggy at a high speed by adding the small dot only at the blank. Moreover, it is also possible to create the font data (print data) having the improved jaggy at a high speed by adding the small dot only at the image dot.

Another reason for the above described processing speeds is because the number of required reference patterns increases from the first case towards the fifth case via the second, third and third cases in this order, where the number of required reference patterns is the same for the second and third cases. In other words, the second case requires a reference pattern for judging the second blank in addition to a reference pattern required in the first case, the fourth case further requires a reference pattern for judging a first dot, and the fifth case further requires a reference pattern for judging the second dot.

Figure 25:
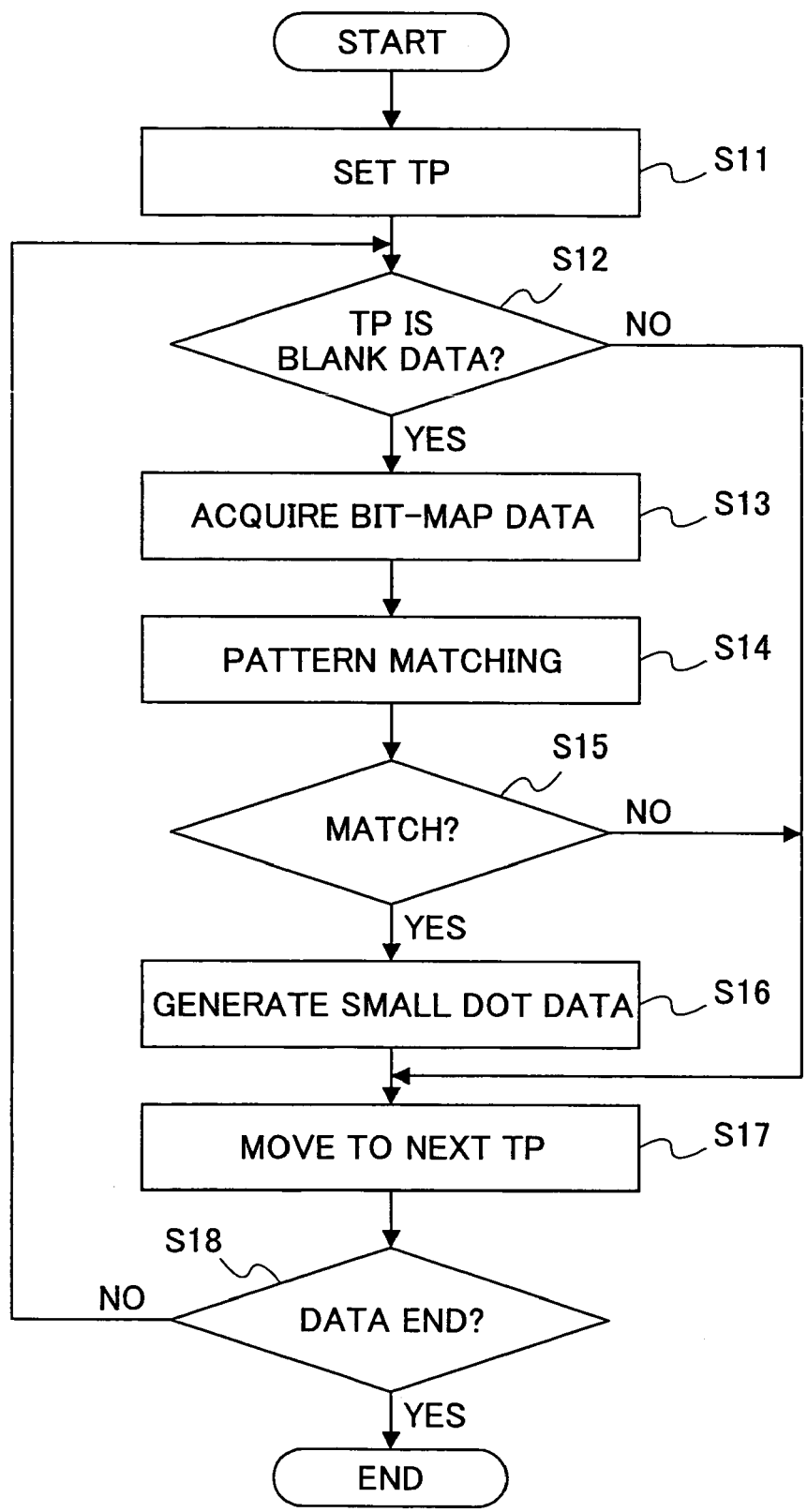
FIG. 25 is a flow chart for explaining a pattern matching process which adds a small dot only at a blank portion.

Next, a description will be given of a pattern matching process which adds the small dot only at the blank portion as in the first and second cases, by referring to FIG. 25. FIG. 25 is a flow chart for explaining the pattern matching process (dot conversion process) which adds the small dot only at the blank portion. It is assumed for the sake of convenience that the small dot is formed by a small ink drop.

First, a step S11 sets a target pixel TP to a start of the font data. A step S12 decides whether or not the image data with respect to the target pixel TP is a blank data. If the image data with respect to the target pixel TP is the font data (print data), the decision result in the step S12 is NO, and the process advances to a step S17 which will be described later. On the other hand, if the decision result in the step S12 is YES, the process advances to a step S13.

The step S13 acquires the bit-map data of the font data corresponding to the window, by using the target pixel TP as the center of the window. Hence, the acquired bit-map data corresponds to the data amounting to 5×5=25 dots. A step S14 carries out a pattern matching by comparing the acquired bit-map data (pattern of the acquired data) and a predetermined reference data (reference pattern) which is used to add the small dot or to replace the dot by the small dot. A step S15 decides whether or not the compared patterns match. The process advances to a step S16 if the decision result in the step S15 is YES, and the process advances to the step S17 if the decision result in the step S15 is NO.

The step S16 generates the small dot data for the target pixel TP, so as to replace the dot of the target pixel TP into the small dot (small ink drop in this particular case). The process advances to the step S17 after the step S16.

The step S17 moves to a next target pixel TP. In addition, a step S18 decides whether or not the target pixel TP is the end of data. The process returns to the step S12 if the decision result in the step S18 is NO, so as to repeat the pattern matching until the end of data. On the other hand, the process ends if the decision result in the step S18 is YES.

Therefore, the pattern matching is carried out only when the target pixel TP is the blank data, and the transition point is not detected by the pattern matching if the target pixel TP is the print data forming the font. As a result, the processing speed is improved because no pattern matching is carried out with respect to the print data forming the font.

The process shown in FIG. 25 may treat one pixel as a 1-byte data or, a 1-bit data. When treating one pixel as a 1-byte data, 25 bytes are required to represent data amounting to 25 dots. On the other hand, when treating one pixel as a 1-bit data, only 4 bytes are required to represent data amounting to 25 dots, and only 3 bytes are required if the target pixel TP is to be excluded from the representation. Hence, the amount of data to be processed is small when one pixel is treated as a 1-bit data, and the required memory capacity can be reduced and the processing speed can be improved in this case.

Figure 26A:
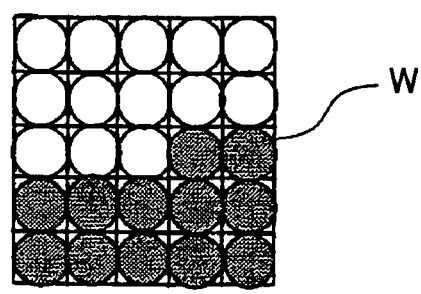
FIGS. 26A through 26C are diagrams for explaining the pattern matching process shown in FIG. 25.
Figure 26B:
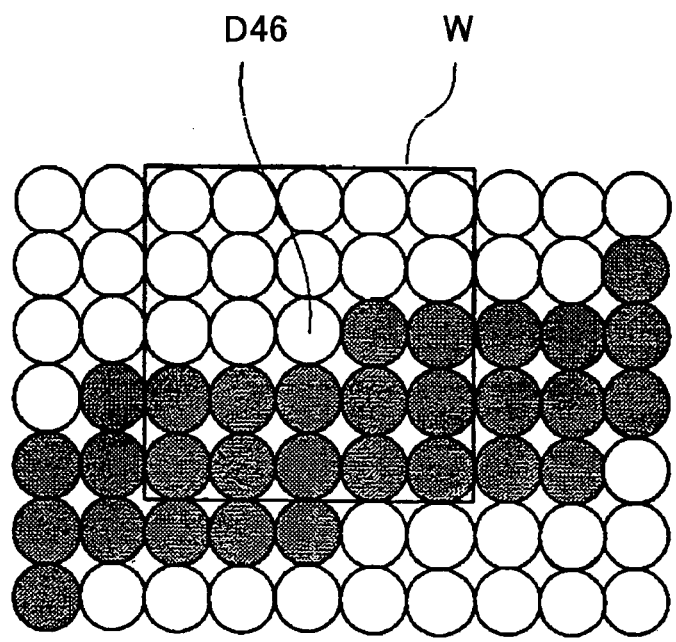
Figure 26C:
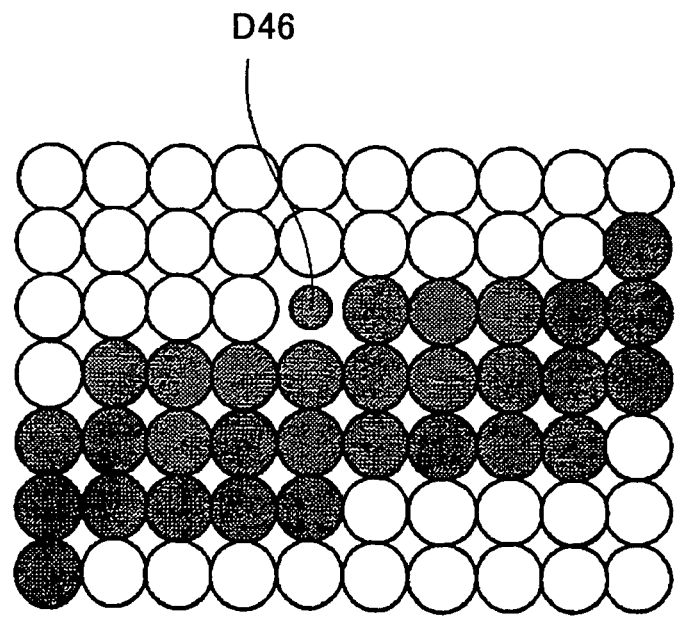

For example, when a reference pattern W shown in FIG. 26A is used, and the font data at the pixel position D46 shown in FIG. 26B is regarded as the target pixel TP, it is possible to replace the blank data at the pixel position D46 into the small dot as shown in FIG. 26C because the dot patterns of the reference pattern W and the window match. FIGS. 26A through 26C are diagrams for explaining the pattern matching process shown in FIG. 25. Hence, by using the window and the reference pattern W respectively having the size of 5×5 pixels, it is possible to judge whether or not to add the small dots in a range amounting to two blanks in the vicinity of (that is, adjacent to) the transition point.

Figure 27:
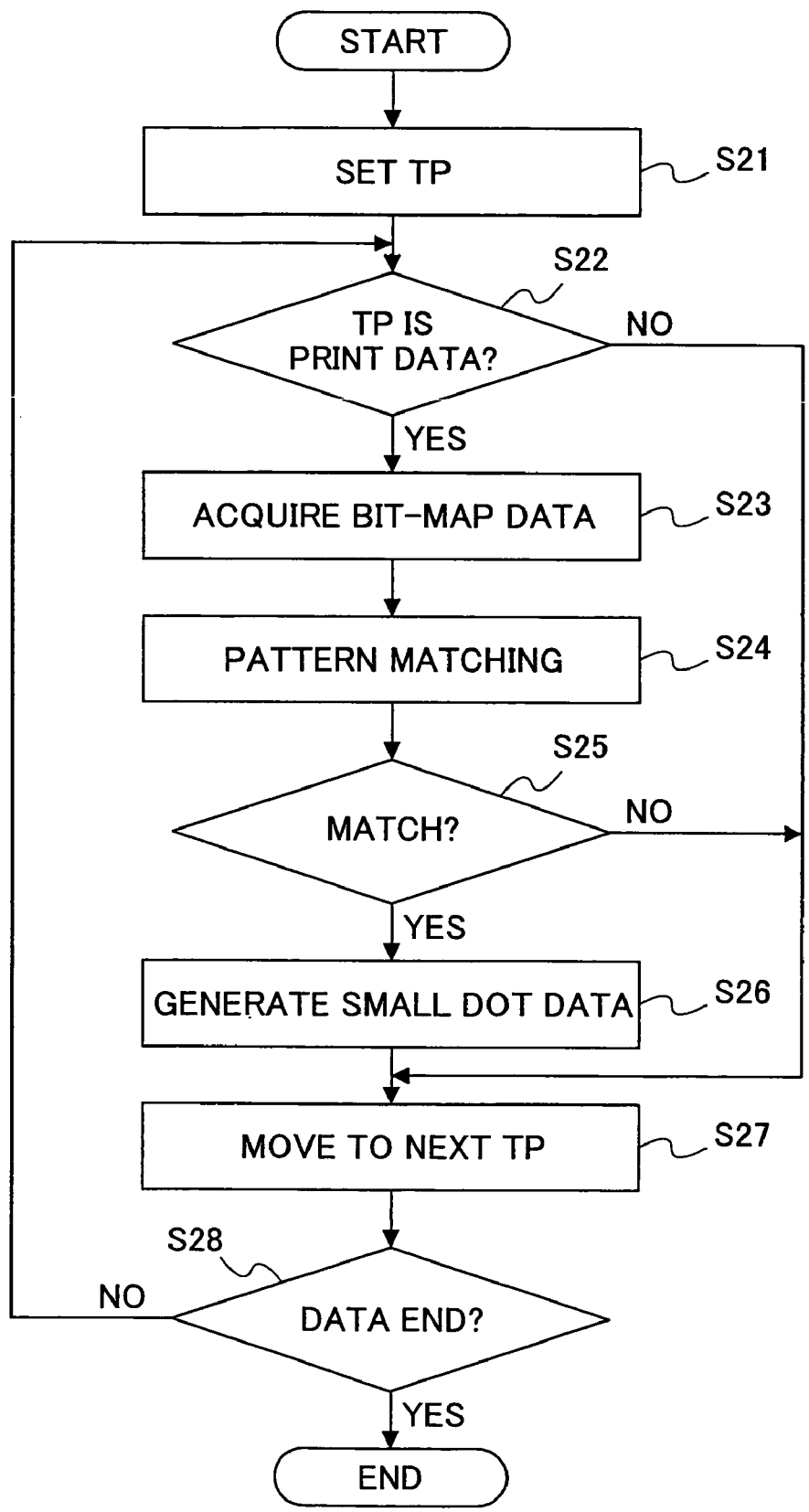
FIG. 27 is a flow chart for explaining a pattern matching process which replaces only a font data into a small dot.

Next, a description will be given of a pattern matching process which adds the small dot only at the font data (print data) as in the third case, by referring to FIG. 27. FIG. 27 is a flow chart for explaining a pattern matching process (dot conversion process) which replaces only the font data into the small dot. It is assumed for the sake of convenience that the small dot is formed by a small ink drop.

First, a step S21 sets a target pixel TP to a start of the font data. A step S22 decides whether or not the image data with respect to the target pixel TP is a font data (print data). If the image data with respect to the target pixel TP is a blank data, the decision result in the step S22 is NO, and the process advances to a step S27 which will be described later. On the other hand, if the decision result in the step S22 is YES, the process advances to a step S23.

The step S23 acquires the bit-map data of the font data corresponding to the window, by using the target pixel TP as the center of the window. Hence, the acquired bit-map data corresponds to the data amounting to 5×5=25 dots. A step S24 carries out a pattern matching by comparing the acquired bit-map data (pattern of the acquired data) and a predetermined reference data (reference pattern) which is used to add the small dot or to replace the dot by the small dot. A step S25 decides whether or not the compared patterns match. The process advances to a step S26 if the decision result in the step S25 is YES, and the process advances to the step S27 if the decision result in the step S25 is NO.

The step S26 generates the small dot data for the target pixel TP, so as to replace the dot of the target pixel TP into the small dot (small ink drop in this particular case). The process advances to the step S27 after the step S26.

The step S27 moves to a next target pixel TP. In addition, a step S28 decides whether or not the target pixel TP is the end of data. The process returns to the step S22 if the decision result in the step S28 is NO, so as to repeat the pattern matching until the end of data. On the other hand, the process ends if the decision result in the step S28 is YES.

Therefore, the pattern matching is carried out only when the target pixel TP is the font data, and the transition point is not detected by the pattern matching if the target pixel TP is the blank data. As a result, the processing speed is improved because no pattern matching is carried out with respect to the blank data.

The process shown in FIG. 27 may treat one pixel as a 1-byte data or, a 1-bit data. When treating one pixel as a 1-byte data, 25 bytes are required to represent data amounting to 25 dots. On the other hand, when treating one pixel as a 1-bit data, only 4 bytes are required to represent data amounting to 25 dots, and only 3 bytes are required if the target pixel TP is to be excluded from the representation. Hence, the amount of data to be processed is small when one pixel is treated as a 1-bit data, and the required memory capacity can be reduced and the processing speed can be improved in this case.

Figure 28A:
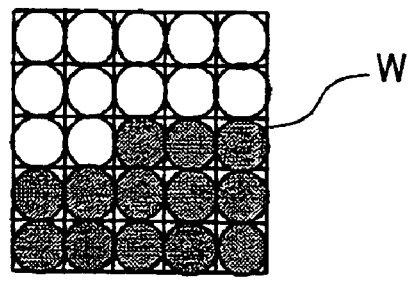
FIGS. 28A through 28C are diagrams for explaining the pattern matching process shown in FIG. 27.
Figure 28B:
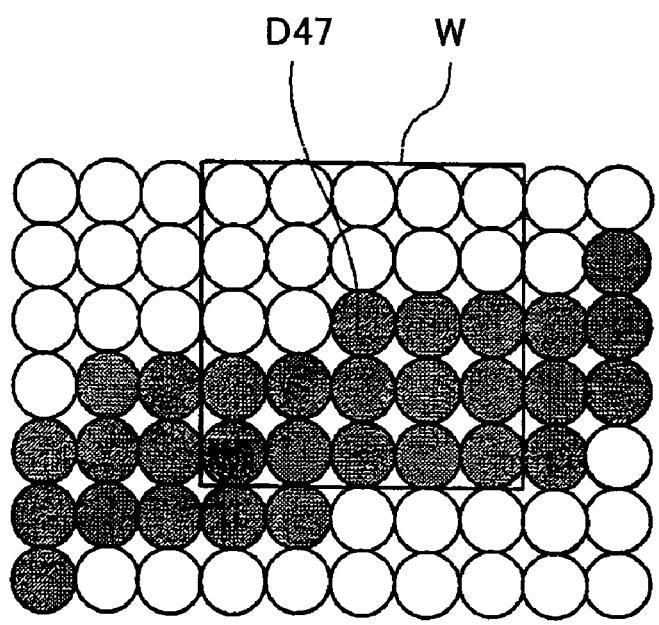
Figure 28C:
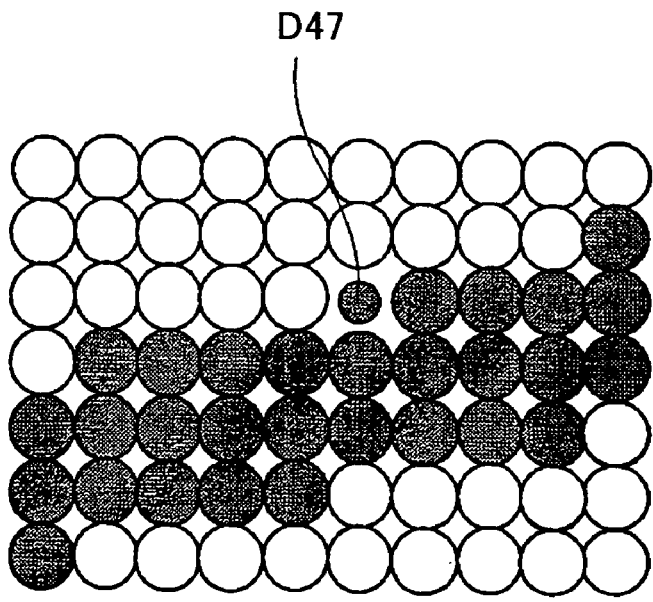

For example, when a reference pattern W shown in FIG. 28A is used, and the font data at the pixel position D46 shown in FIG. 28B is regarded as the target pixel TP, it is possible to replace the large dot at the pixel position D46 into the small dot as shown in FIG. 28C because the dot patterns of the reference pattern W and the window match. FIGS. 28A through 28C are diagrams for explaining the pattern matching process shown in FIG. 27. Hence, by using the window and the reference pattern W respectively having the size of 5×5 pixels, it is possible to judge whether or not to replace by the small dots in a range amounting to two dots in the vicinity of (that is, adjacent to) the transition point.

Figure 29:
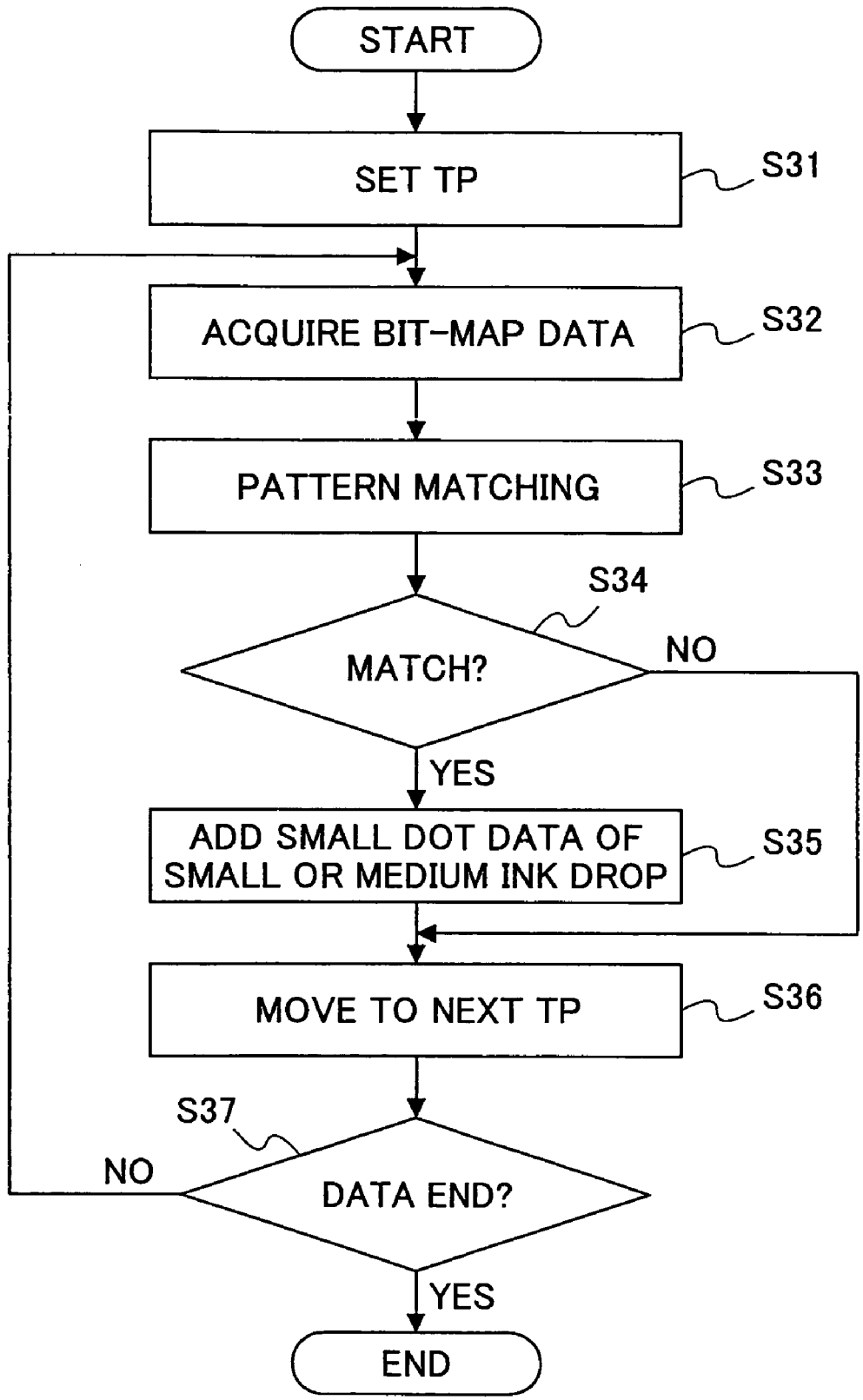
FIG. 29 is a flow chart for explaining a pattern matching process of a second embodiment of the jaggy correction.

Next, a description will be given of a second embodiment of the jaggy correction, by referring to FIG. 29. FIG. 29 is a flow chart for explaining a pattern matching process (dot conversion process) of this second embodiment of the jaggy correction.

In the jaggy correction described heretofore, the dots are formed by two kinds of ink drops, namely, the large ink drop and the small ink drop. But according to this jaggy correction, the dots are formed by three kinds of ink drops, namely, a small ink drop and a medium ink drop forming the small dots, and a large ink drop forming the large dot.

In FIG. 29, it is assumed for the sake of convenience that the bit-map data, indicating the font data, is subjected to the pattern matching in units of the window described above, for each bit.

First, a step S31 sets a target pixel TP to a start of the font data. A step S32 acquires the bit-map data of the font data corresponding to the window, by using the target pixel TP as the center of the window. Hence, the acquired bit-map data corresponds to the data amounting to 5×5=25 dots.

Thereafter, a step S33 carries out a pattern matching by comparing the acquired bit-map data (pattern of the acquired data) and a predetermined reference data (reference pattern) which is used to add the small dot formed by the small or medium ink drop or, to replace the dot by the small dot formed by the small or medium ink drop. A step S34 decides whether or not the compared patterns match. The process advances to a step S35 if the decision result in the step S34 is YES, and the process advances to a step S36 if the decision result in the step S34 is NO.

The step S35 generates the small dot data for the target pixel TP, so as to replace the dot of the target pixel TP into the small dot which is formed by the small or medium ink drop. The process advances to the step S36 after the step S35.

The step S36 moves to a next target pixel TP. In addition, a step S37 decides whether or not the target pixel TP is the end of data. The process returns to the step S32 if the decision result in the step S37 is NO, so as to repeat the pattern matching until the end of data. On the other hand, the process ends if the decision result in the step S37 is YES.

The process shown in FIG. 29 may treat one pixel as a 1-byte data or, a 1-bit data. When treating one pixel as a 1-byte data, 25 bytes are required to represent data amounting to 25 dots. On the other hand, when treating one pixel as a 1-bit data, only 4 bytes are required to represent data amounting to 25 dots, and only 3 bytes are required if the target pixel TP is to be excluded from the representation. Hence, the amount of data to be processed is small when one pixel is treated as a 1-bit data, and the required memory capacity can be reduced and the processing speed can be improved in this case.

The original font data may be represented by 0 (blank) or 255 (print data) as in the case of the bit-map data or represented by 0 (blank) or 1 (print data) as in the case of bi-level data. In such cases, if the data indicating the small ink drop and the medium ink drop are once converted into 0 (blank) or 255 (print data) when generating the data of the small ink drop and the medium ink drop, the data itself forming the blank data or font may be replaced by the data (for example, 85 and 170, respectively) representing the small ink drop and the medium ink drop. When processing the original font data "0" and "1" as they are, a separate memory (memory for the small dot data) having the same size as the font data may be provided, and the data "1" representing the print data may be generated at the position where the small ink drop and the medium ink drop are to be added.

Therefore, it is possible to form an oblique line with the improved jaggy by printing the dots with the small ink drops, the medium ink drops and the large ink drops, in the former case where the font data is formed by the data indicating the small ink drops, the medium ink drops and the large ink drops generated by the pattern-matching, and in the latter case where the font data is formed by the bi-level data (0 and 1) for the small ink drops, the bi-level data (0 and 1) for the medium ink drops and the original bi-level data (0 and 1) for the original data.

Figure 30A:
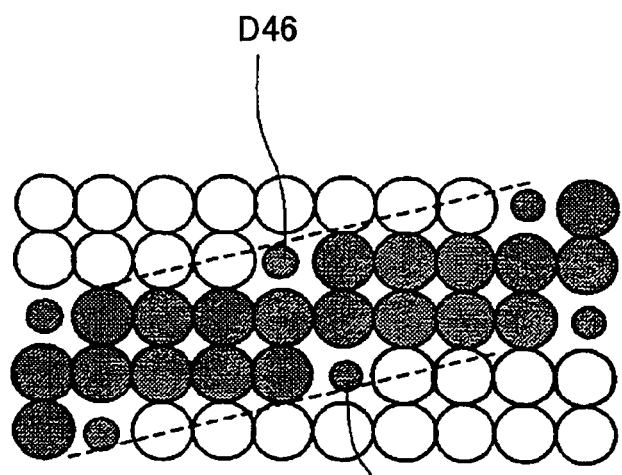
FIGS. 30A and 30B are diagrams for explaining the second embodiment of the jaggy correction of an oblique line having an inclination of ¼ for first and second cases.
Figure 30B:
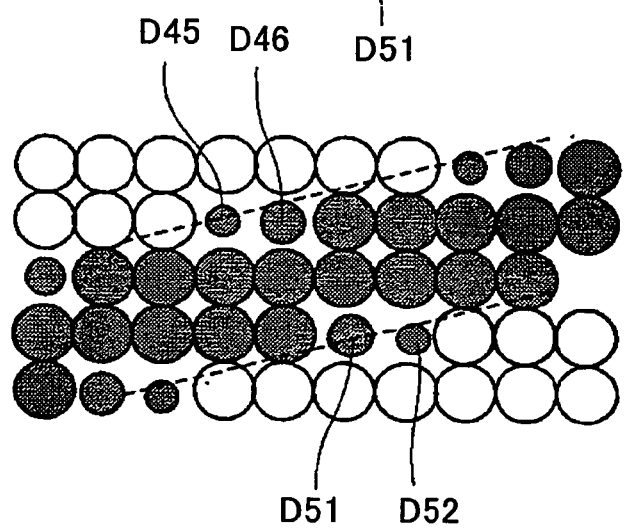
Figure 31:
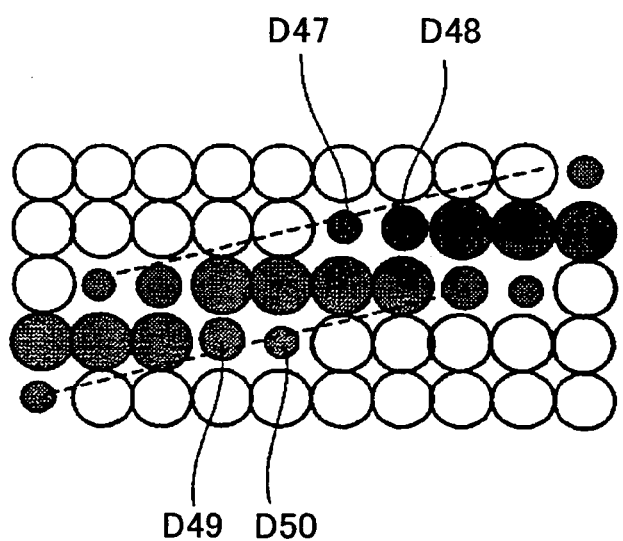
FIG. 31 is a diagram for explaining the second embodiment of the jaggy correction of the oblique line having the inclination of ¼ for a third case.
Figure 32A:
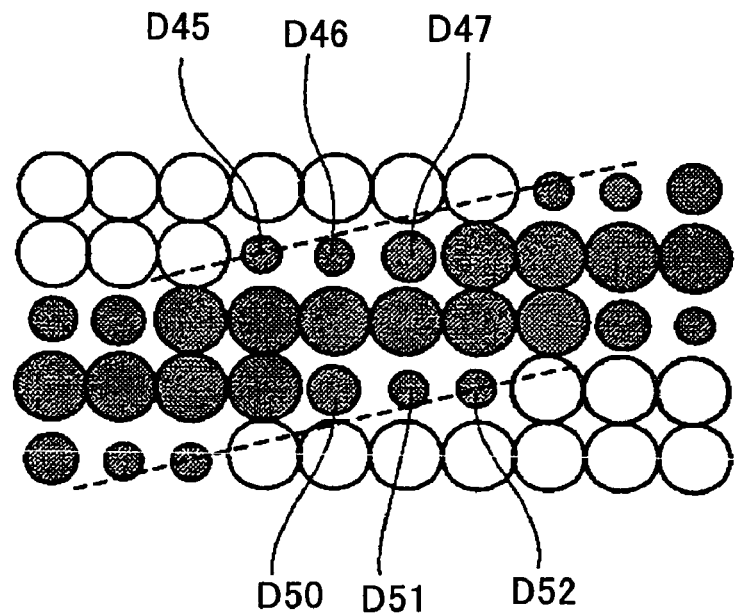
FIGS. 32A and 32B are diagrams for explaining the second embodiment of the jaggy correction of the oblique line having the inclination of ¼ for fourth and fifth cases.
Figure 32B:
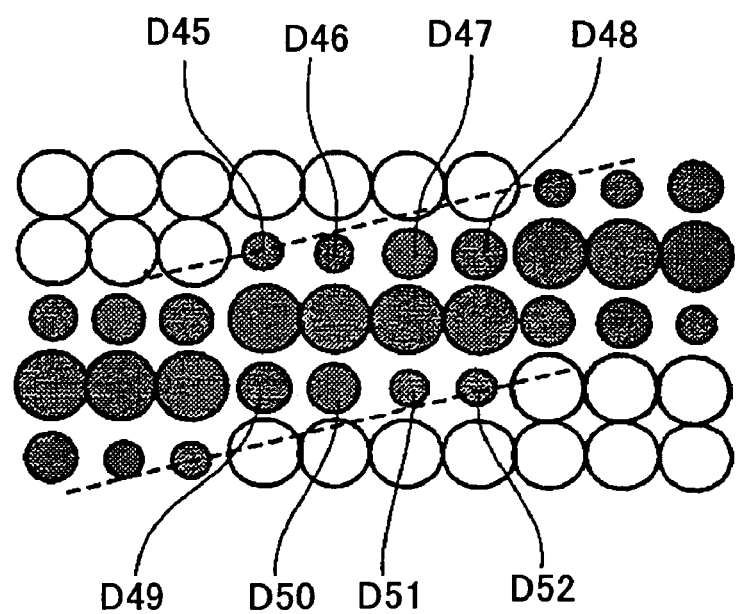

FIGS. 30A and 30B are diagrams for explaining the second embodiment of the jaggy correction of an oblique line having an inclination of ¼ for first and second cases. FIG. 31 is a diagram for explaining the second embodiment of the jaggy correction of the oblique line having the inclination of ¼ for a third case. FIGS. 32A and 32B are diagrams for explaining the second embodiment of the jaggy correction of the oblique line having the inclination of ¼ for fourth and fifth cases.

FIGS. 30A through 32B show cases where the number of dots forming the straight line between the two stepped transition portions is four, that is, the inclination is ¼, and respectively correspond to the first through fifth cases shown in FIGS. 15A through 17B. FIGS. 30A through 32B show the dot arrangement at the oblique line portion so as to explain the different jaggy corrections.

In other words, in the first case shown in FIG. 30A, the originally blank dot positions D46 and D51 at the periphery of the transition point (stepped transition portion) are added with a small dot having a smaller size that the large dots forming the portions other than the periphery of the stepped transition portion. Hence, the blank dot data at the dot positions D46 and D52 are converted into small dot data. As a result, the small dots (small ink drops) are recorded at the originally blank dot positions D46 and D51 at the periphery of the stepped transition portion.

In the second case shown in FIG. 30B, the small dots are recorded at the originally blank dot positions D45, D46, D51 and D52 at the periphery of the stepped transition portion. But in this case, the small dots at the dot positions D45 and D52 are recorded by the small ink drops, and the small dots at the dot positions D46 and D51 are recorded by the medium ink drops. For this reason, the change at the transition point shown in FIG. 30B is smoother than that shown in FIG. 30A.

In the third case shown in FIG. 31, the image dots D47, D48, D49 and D50 at the periphery of the stepped transition portion are converted into small dots which are smaller than the large dots forming the portions other than the stepped transition portion. But in this case, the small dots at the image dots D47 and D50 are recorded by the small ink drops, and the small dots at the image dots D48 and D49 are recorded by the medium ink drops. As a result, the change at the transition point shown in FIG. 31 is smoother than that shown in FIG. 16 described above.

In the fourth case shown in FIG. 32A, the originally blank dot positions D45, D46, D51 and D52 at the periphery of the stepped transition portion are added with a small dot having a smaller size that the large dots forming the portions other than the periphery of the stepped transition portion, and further, the image dots D47 and D50 at the periphery of the stepped transition portion are converted into small dots which are smaller than the large dots forming the portions other than the stepped transition portion. But in this case, the dot positions D45, D46, D51 and D52 are recorded by the small ink drops, and the dot positions D47 and D50 are recorded by the medium ink drops. Thus, the change at the transition point shown in FIG. 32A is smoother than that shown in FIG. 17A described above.

In the fifth case shown in FIG. 32B, the same conversion is made as in the fourth case shown in FIG. 32A, and in addition, up to two dots forming the stepped transition portion are converted into small dots. FIG. 32B shows a case where the two image dots D48 and D49 are converted into small dots. The dot positions D48 and D49 are recorded by the medium ink drops. Hence, the change at the transition point shown in FIG. 32B is smoother than that shown in FIG. 17B described above.

Therefore, according to the first through fifth cases described above in conjunction with FIGS. 30A through 32B, the step difference at the transition point (stepped transition portion) is reduced by recording the small dots, and a relatively smooth oblique line portion can be recorded solely by the dot arrangement itself. In addition, in the case of the ink-jet recording, the ink spreads when the ejected ink hits the recording medium. Moreover, when the ink used has the dye as the main component, even when the jaggy correction is made by the dot arrangement described above, the contour smoothness may deteriorate when the ink-jet recording is made on plain paper due to the feathering. However, the feathering can be suppressed by use of the ink which is described above and used in this embodiment. In other words, the effects of reducing the jaggy portion by the jaggy correction which is made by the dot arrangement described above can be maintained even when the ink-jet recording is made on plain paper, because the ink used in this embodiment effectively suppresses the feathering.

The ink used in this embodiment reduces the feathering, but the bleeding does occur slightly. But this slight bleeding smoothens the contour portion by smoothly connecting the adjacent dots, to make the jaggy portion even less conspicuous. Consequently, owing to the phenomenon peculiar to the ink-jet recording and the phenomenon peculiar to the ink used in this embodiment, it is possible to record a smooth oblique line portion in which the jaggy portion is virtually inconspicuous.

The inclination is $1/4$ for the cases shown in FIGS. 30A through 32B. However, the jaggy correction may be made similarly with respect to other inclinations, including $1/3$, $1/5$ or less, and even with respect to oblique line portions which are mirror images of the above or rotated by 90°, 180°, 270° or the like.

Next, a description will be given of a method of changing the jaggy correction method depending on the inclination of the oblique line portion.

Through pattern matching with the font data, a selection is made as to whether the target pixel is to be converted into the small ink drop or the medium ink drop or no conversion is to be made. Hence, the reference patterns which are referred to when carrying out the pattern matching include patterns for small inclinations to large inclinations. Accordingly, the jaggy correction method can be changed by changing the information which indicates the conversion of the target pixel, between a case where the inclination is larger than $1/1$ and a case where the inclination is less than or equal to $1/1$.

Figure 33A:
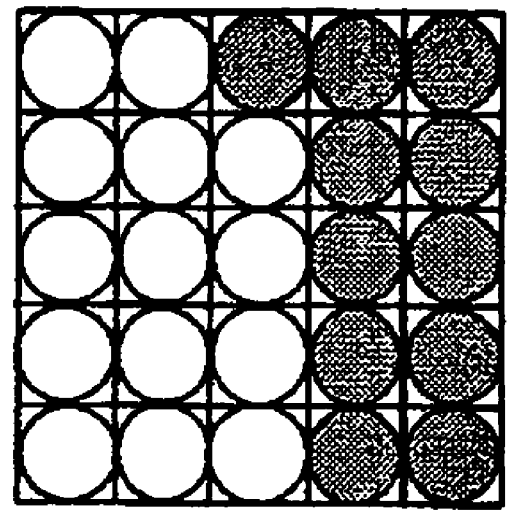
FIGS. 33A and 33B are diagrams for explaining reference patterns for different inclinations.
Figure 33B:
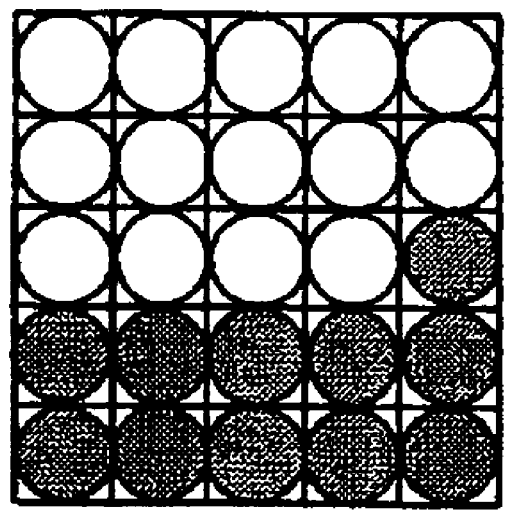

For example, a reference pattern for an inclination $4/1$ shown in FIG. 33A, and a reference pattern for an inclination $1/4$ shown in FIG. 33B are provided.

When subjecting the font data to the pattern matching, the pattern matching is made with respect to a reference pattern for the conversion to the small ink drop, a reference pattern for the conversion to the medium ink drop, and a reference pattern for making no conversion. When the font data matches one of these reference patterns, it is possible to recognize whether the target pixel is to be converted into the small ink drop, converted into the medium ink drop or, not converted.

Hence, when the inclination is $4/1$ and the font data matches the reference pattern shown in FIG. 33A, the target pixel is converted into the medium ink drop. On the other hand, when the inclination is $1/4$ and the font data matches the reference pattern shown in FIG. 33B, the target pixel is converted into the small ink drop.

The font data may be created by the printer driver 101A of the host unit (information processing apparatus) 100 which includes an image processing apparatus, such as a personal computer, for transferring the image data to the ink-jet printer. Hence, a computer program for causing the computer to carry out the jaggy correction (dot data conversion) may be stored in a recording medium such as a CD-ROM and a hard disk of the computer which is connected to a network, and the jaggy correction can be carried out by installing this computer program into the host unit 100.

Figure 34:
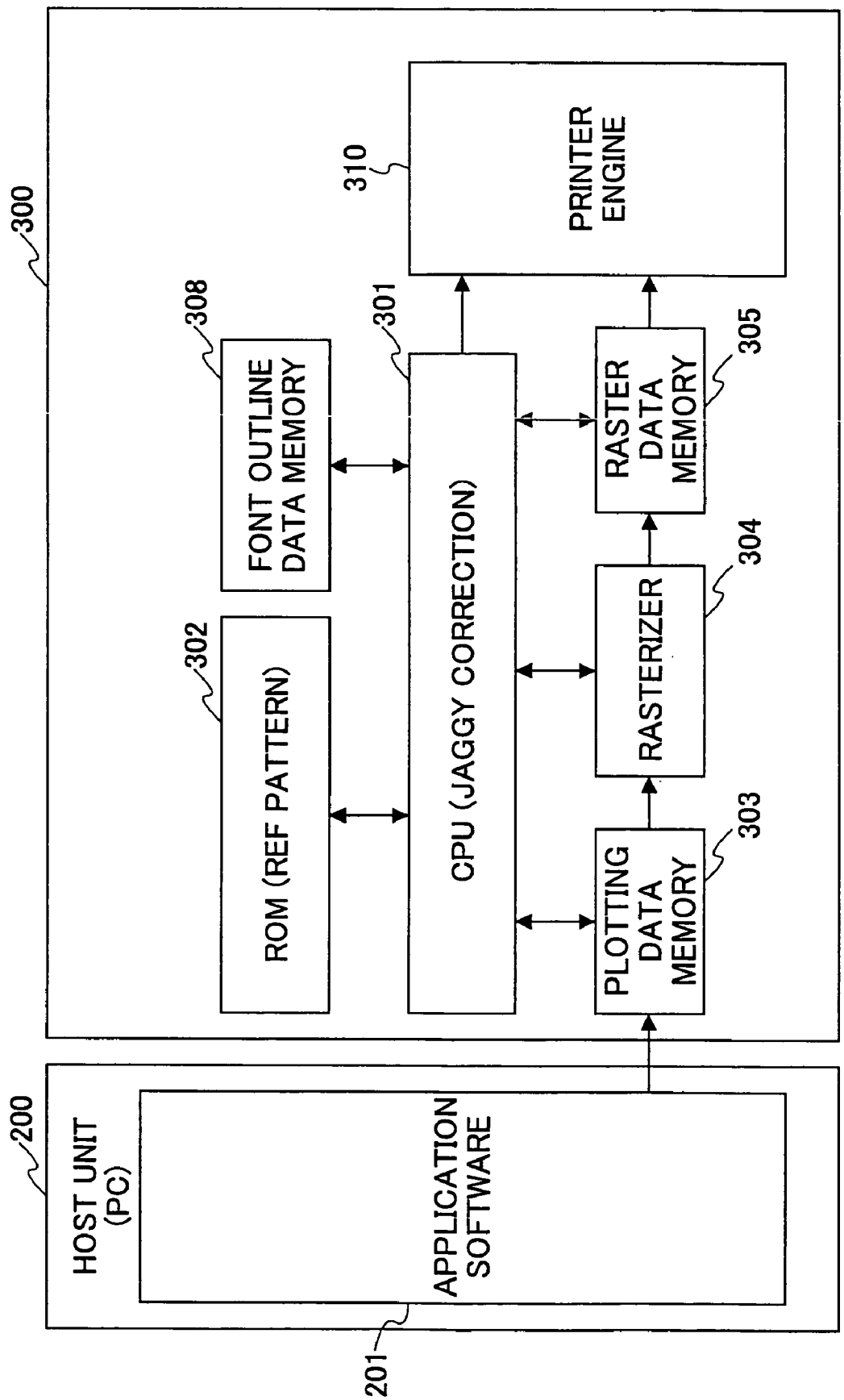
FIG. 34 is a system block diagram showing the structure of another embodiment of the image forming apparatus according to the present invention.

In the embodiments described above, the jaggy correction (dot data conversion) is carried out in the host unit 100. However, it is also possible to carry out the jaggy correction (dot data conversion) in the image forming apparatus (ink-jet printer), as in the case of another embodiment of the image forming apparatus according to the present invention. FIG. 34 is a system block diagram showing the structure of this other embodiment of the image forming apparatus. In this embodiment of the image forming apparatus, the present invention is applied to an ink-jet printer.

In FIG. 34, an ink-jet printer 300 is connected to a host unit 200 such as a personal computer. The host unit 200 includes an application software (program) 201.

The ink-jet printer 300 includes a CPU 301, a ROM 302, a plotting data memory 303, a rasterizer 304, a raster data memory 305, a font outline data memory 308, and a printer engine 310. The CPU 301 forms a main controller which controls the entire ink-jet printer 300, and includes the functions of a dot data conversion means (jaggy correction means) and a detection means. The ROM 302 stores various programs and reference patterns which are used for the pattern matching. The CPU 301 forms a firmware together with the ROM 302. The print data such as character code data obtained from the application software 201 of the host unit 200 are stored in the plotting data memory 304.

A print instruction which instructs recording of image or characters, received from the host unit 200 to be executed by the CPU 301, is temporarily stored in the plotting data memory 303. For example, the print instruction includes information related to the position, thickness, shape and the like of the lines to be recorded, and the font, size and position of the characters to be recorded. The print instruction is written in a predetermined print language.

The print instruction stored in the plotting data memory 303 is interpreted by the rasterizer 304. In the case of the print instruction to record a line, for example, the line is converted into a recording dot pattern depending on the specified position, thickness and the like. In addition, in the case of the print instruction to record characters, corresponding character contour information is read from the font outline data memory 308 and converted into a recording dot pattern depending on the specified position, size and the like. The recording pattern data obtained by the above described conversion is stored in the raster data memory 305.

The CPU 301 detects the stepped transition portion of the contour portion from the bit-map data, and carries out the jaggy correction process (dot data conversion process) described above, so as to convert the periphery of the stepped transition portion using the reference pattern into the dot data having the dot size smaller than the dot size of the dot data forming the portions other than the stepped transition portion, depending on the inclination of the stepped transition portion.

The recording dot pattern (dot data) stored in the raster data memory 305 is output to the printer engine 310, so as to drive the pressure generating means of the ink-jet head and to record the image by making the scans in the main scanning direction and the sub scanning direction.

The detection of the stepped transition portion and the dot data conversion are carried out by software (computer program) using the CPU 301 in FIG. 34, but it is of course possible to detect the stepped transition portion and carry out the dot data conversion by hardware.

By carrying out the bit-map development and the jaggy correction (dot data conversion) process in the ink-jet printer 300, a high-speed data transfer can be made between the host unit 200 and the ink-jet printer 300 because the transferred data is not bit-map data, to thereby improve the throughput.

Next, a description will be given of first and second experiments conducted by the present inventor.

(First Experiment)

The font data added with the small ink drops in the manner described above were printed on plain paper using the ink-jet head under the following conditions, and the picture quality (character quality) was evaluated.

Head: 384 nozzles/color
    Nozzle pitch=84 ìm (corresponding to 300 dpi)
Image Resolution: 300 dpi
Dot Size: Large ink drop=120 ìm, Small ink drop=40 ìm
Character: MS Mincho, Font size=6, 10, 12, 20, 30, 50 and 80 points
Jaggy Correction Method: Change depending on inclination of oblique line portion (see Table 1 below)
Printing Method: Path number (number of scans forming one line)=1, No interlacing
Paper: Plain paper (My Paper TA (product name)) manufactured by Ricoh Company, Ltd.

TABLE 1

| Inclination of Oblique Line | Jaggy Correction Method |
| --- | --- |
| 1/1 | None |
| 1/2, 2/1 | FIG. 18C |
| 1/3, 3/1 | FIG. 17B |

For comparison purposes, a first comparison example in which no jaggy correction is made and the printing is made solely by the large ink drops, and a second comparison example in which the jaggy correction described above in conjunction with FIG. 17B is made regardless of the inclination, were also made. The character qualities of the characters subjected to the jaggy correction shown in Table 1 were compared with those of the first and second comparison examples.

As a result, it was found that the best character quality is obtained when the jaggy correction shown in Table 1 is carried out, and the character quality deteriorates for the second comparison example, and a worst character quality is obtained for the first comparison example. It was also confirmed that the feathering does not occur and a sufficient image tone is obtained by the jaggy correction shown in Table 1.

Although plain paper is used as the recording medium in the description given above, it is also possible to apply the present invention to other recording media such as coated paper, glossy or calendered paper and OHP films, so as to obtain similar effects. It is also possible to selectively carry out the jaggy correction process depending on the kind of recording medium.

Furthermore, although the characters were printed at 300 dpi in the above described case, it is of course possible to print the characters at a lower resolution of 200 dpi or 150 dpi, for example. At such low resolutions, the diameter of the dots forming the characters are large and the stepped transition portion is more conspicuous than at higher resolutions. Accordingly, the effects of the present invention are large when the present invention is applied to such cases where the resolution is low. On the other hand, at higher resolutions of 600 dpi, 1200 dpi and 2400 dpi, for example, the number of dots forming the font is large and the dot size is small, such that the jaggy portion is inconspicuous.

Accordingly, in the case of an ink-jet printer having a plurality of print modes for printing at different resolutions, it is preferable to provide a mode in which the present invention is applied and a mode in which the present invention is not applied-depending on the resolution, and to select the mode depending on the resolution in order to improve the throughput. As described above, the mode may be selected by the printer driver of the host unit or by the ink-jet printer.

In general, a character quality in which the jaggy portion is inconspicuous can be obtained when the resolution is 450 dpi or greater. Accordingly, it is preferable to apply the present invention when the resolution is 360 dpi or less, and not to apply the present invention when the resolution is 450 dpi or greater. In other words, the processing time can be reduced by detecting the stepped transition point only when the resolution is 360 dpi or less.

(Second Experiment)

The font data added with the small ink drops in the manner described above were printed on plain paper using the ink-jet head under the following conditions, and the picture quality (character quality) was evaluated.

Head: 384 nozzles/color
    Nozzle pitch=84 ìm (corresponding to 300 dpi)
Image Resolution: 300 dpi
Dot Size: Large ink drop=120 ìm, Medium ink drop=70 ìm, Small ink drop=40 ìm
Character: MS Mincho, Font size=6, 10, 12, 20, 30, 50 and 80 points
Jaggy Correction Method: Change depending on inclination of oblique line portion (see Table 2 below)
Printing Method: Path number (number of scans forming one line)=1, No interlacing
Paper: Plain paper (My Paper TA (product name)) manufactured by Ricoh Company, Ltd.

TABLE 2

| Inclination of Oblique Line | Jaggy Correction Method |
| --- | --- |
| 1/1 | None |
| 1/2, 2/1 | FIG. 18C |
| 1/3, 3/1 | FIG. 32B |

For comparison purposes, a first comparison example in which no jaggy correction is made and the printing is made solely by the large ink drops, and a second comparison example in which the jaggy correction described above in conjunction with FIG. 17B is made regardless of the inclination, were also made. The character qualities of the characters subjected to the jaggy correction shown in Table 2 were compared with those of the first and second comparison examples.

As a result, it was found that the best character quality is obtained when the jaggy correction shown in Table 2 is carried out, and the character quality deteriorates for the second comparison example, and a worst character quality is obtained for the first comparison example. It was also confirmed that the feathering does not occur and a sufficient image tone is obtained by the jaggy correction shown in Table 2.

Although plain paper is used as the recording medium in the description given above, it is also possible to apply the present invention to other recording media such as coated paper, glossy or calendered paper and OHP films, so as to obtain similar effects. It is also possible to selectively carry out the jaggy correction process depending on the kind of recording medium.

Furthermore, although the characters were printed at 300 dpi in the above described case, it is of course possible to print the characters at a lower resolution of 200 dpi or 150 dpi, for example. At such low resolutions, the diameter of the dots forming the characters are large and the stepped transition portion is more conspicuous than at higher resolutions. Accordingly, the effects of the present invention are large when the present invention is applied to such cases where the resolution is low. On the other hand, at higher resolutions of 600 dpi, 1200 dpi and 2400 dpi, for example, the number of dots forming the font is large and the dot size is small, such that the jaggy portion is inconspicuous.

Accordingly, in the case of an ink-jet printer having a plurality of print modes for printing at different resolutions, it is preferable to provide a mode in which the present invention is applied and a mode in which the present invention is not applied depending on the resolution, and to select the mode depending on the resolution in order to improve the throughput. As described above, the mode may be selected by the printer driver of the host unit or by the ink-jet printer.

In general, a character quality in which the jaggy portion is inconspicuous can be obtained when the resolution is 450 dpi or greater. Accordingly, it is preferable to apply the present invention when the resolution is 360 dpi or less, and not to apply the present invention when the resolution is 450 dpi or greater. In other words, the processing time can be reduced by detecting the stepped transition point only when the resolution is 360 dpi or less.

Next, a description will be given of a third embodiment of the jaggy correction which corrects an error in the ink drop hitting position on the recording medium caused by the use of the small dots.

As described above, when the ink drops having different sizes are ejected by the ink-jet printer onto the recording medium to form different dot sizes, a timing error is introduced between the ink drops of different sizes ejected from the head due to the different dot forming times for the different ink drop sizes. In other words, the time required for the ink drop to be ejected from the head from the time when the driving pulse is input is shorter for the small ink drop having a short driving time and lower for the large ink drop having a long driving time. Accordingly, the time it takes for the ink drop to reach the recording medium (recording medium surface) from the time when the driving pulse is input is quicker for the small ink drop and slower for the large ink drop. As a result, the large ink drop adheres on the recording medium at a position on a downstream side along the carriage moving direction than the small ink drop.

Figure 35:
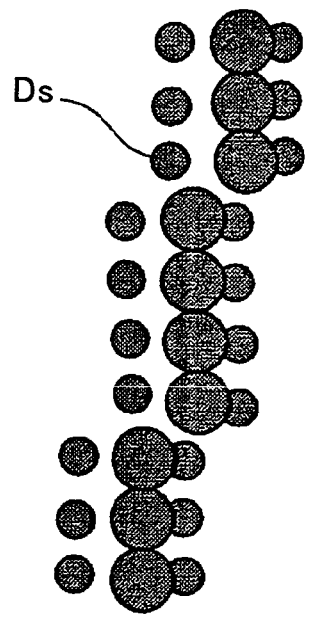
FIG. 35 is a diagram for explaining a separation of a small ink dot from other dots in the case of an oblique line portion having a large inclination.

Therefore, when making the jaggy correction by varying the dot size, a small ink drop which is recorded for the jaggy correction hits the recording medium at a position separated from the other dots as shown in FIG. 35 in the case of an oblique line portion having a large inclination. FIG. 35 is a diagram for explaining the separation of the small ink dot from the other dots in the case of the oblique line portion having the large inclination. Normally, the ink ejection speed (Vj) of the ink-jet printer is 5 m/sec or greater, and preferably 7 m/sec or greater. Hence, the ink ejection speed (Vj) is sufficiently high so that a large positional error of the ink dots will not occur, but an error on the order of approximately 10 im to 20 im is inevitably introduced.

The isolated small ink drop Ds becomes conspicuous when the inclination of the oblique line portion is greater than $\frac{1}{1}$. On the other hand, the small ink drops are recorded along the large ink drops forming the character in the case of the oblique line portion having the inclination of $\frac{1}{1}$ or less, and the small ink drops are inconspicuous as isolated ink drops.

Hence, an optimum jaggy correction can be realized in which it is possible to simultaneously reduce the undesirable effects of the positional error of the dots and make the jaggy correction, by changing the jaggy correction method depending on the inclination of the oblique line portion.

Figure 36A:
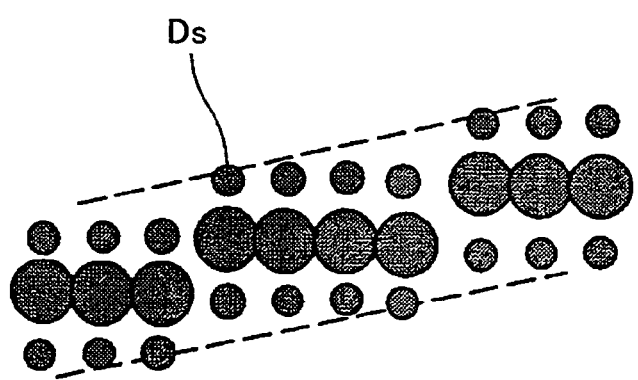
FIGS. 36A and 36B are diagrams for explaining a selection of a jaggy correction method (dot data conversion method) depending on the inclination of the oblique line portion.
Figure 36B:
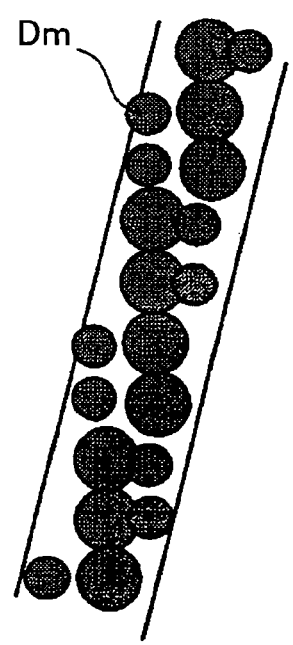

FIGS. 36A and 36B are diagrams for explaining a selection of the jaggy correction method (dot data conversion method) depending on the inclination of the oblique line portion. For example, the jaggy correction is made using the small ink drops Ds as shown in FIG. 36A when the inclination is $\frac{1}{1}$ or less, and the jaggy correction is made using the medium ink drops Dm in place of the small ink drops as shown in FIG. 36B when the inclination is greater than $\frac{1}{1}$. By taking these measures, the positional error of the dots is effectively reduced to a negligible extent.

In addition, the jaggy correction may be made using only the small ink drops as shown in, FIG. 17B when the inclination is $\frac{1}{1}$ or less, and the jaggy correction may be made using the small ink drops and the medium ink drops as shown in FIG. 32B when the inclination is greater than $\frac{1}{1}$.

Moreover, it is possible to correct two dots before and after the transition points (that is, the number of corrected dots is four) when the inclination is $\frac{1}{1}$ or less, and to correct one dot above and below the transition point when the inclination is greater than $\frac{1}{1}$, as shown in FIG. 17B.

By changing the jaggy correction method depending on the inclination of the oblique line portion, it is possible to select an optimum number of small ink drops having different positions, and obtain a high picture quality regardless of the inclination of the oblique line portion.

As described above, the dot data conversion method or the dot forming method (jaggy correction method) is selected depending on the inclination of the oblique line portion. Hence, it is possible to prevent a situation where the character becomes fat or the jaggy portion becomes more conspicuous by the jaggy correction which is carried out using the small dots, as was the case when the inclination of the oblique line portion is $\frac{1}{1}$, $\frac{1}{2}$ or $\frac{2}{1}$, for example. Hence, it is always possible to carry out an optimum jaggy correction.

The ink used for the recording may at least include a pigment of 6 wt. % or greater, a wetting agent, a soluble organic solvent, anion or nonion based surface active agent, polyole or glycol ether with carbon number 8 or greater, and pure water, as described above. In addition, the ink viscosity of this ink may be 8 cp (25° C.) or greater. In this case, it is possible to obtain the following advantageous effects (E1)-(E6) when the recording is made using this ink, even when the recording is made on plain paper.

(E1) Good color tone (sufficient color generation and color reproducibility);

(E2) High image tone;

(E3) Sharp picture quality free of feathering phenomenon and color bleeding phenomenon in the characters and image;

(E4) Image having little ink penetrating phenomenon to the other side of the recording medium and applicable to duplex recording;

(E5) High ink drying characteristic (fixing characteristic) suited for high-speed recording; and (E6) High ruggedized characteristic such as light resistance and water resistance of the image.

Therefore, it is possible to greatly improve the image tone, color generation, color reproducibility, feathering, color bleeding, duplex recording characteristic, fixing characteristic and the like, to thereby realize a high picture quality. Furthermore, by correcting the periphery of the stepped transition portion of the dots forming the contour portion of the character or graphics by forming the periphery of the stepped transition portion by the smaller dots, it is possible to obtain an image having a fine character quality and a fine oblique line quality.

In addition, since it is possible to record a high quality character even at a low resolution, it is possible to form the image by a one-path non-interlacing, to thereby improve the recording speed (printing speed). As a method of adding the small dots, it is possible to detect the stepped transition portion of the bi-level image, and to generate the dot data of the small dot size depending on the detection result. Consequently, it is possible to positively add an optimum small ink drop and improve the character quality.

Furthermore, the positional error of the dots caused by the different dot forming times for the different ink drop sizes will not become conspicuous by the jaggy correction even when the oblique line portion has a large inclination greater than $1/1$. As a result, the character quality will not be deteriorated by the jaggy correction even when the inclination is large. In other words, an optimum jaggy correction can be made with respect to oblique line portion having any inclination, to positively improve the character quality.

In the embodiments described heretofore, the image forming apparatus (image recording apparatus) of the present I Invention is applied to the ink-jet printer. However, the image processing apparatus, the printer driver or the image processing method according to the present invention is not limited to the application to the creation of the image data to be transferred to the ink-jet printer, and the present invention may be similarly be applied to the creation of the image data to be transferred to an electrophotography type image forming apparatus (image recording apparatus) such as laser printers and LED printers. In addition, the present invention may be similarly applied to the creation of the image data to be output by an image display apparatus capable of changing the dot size.

Figure 37:
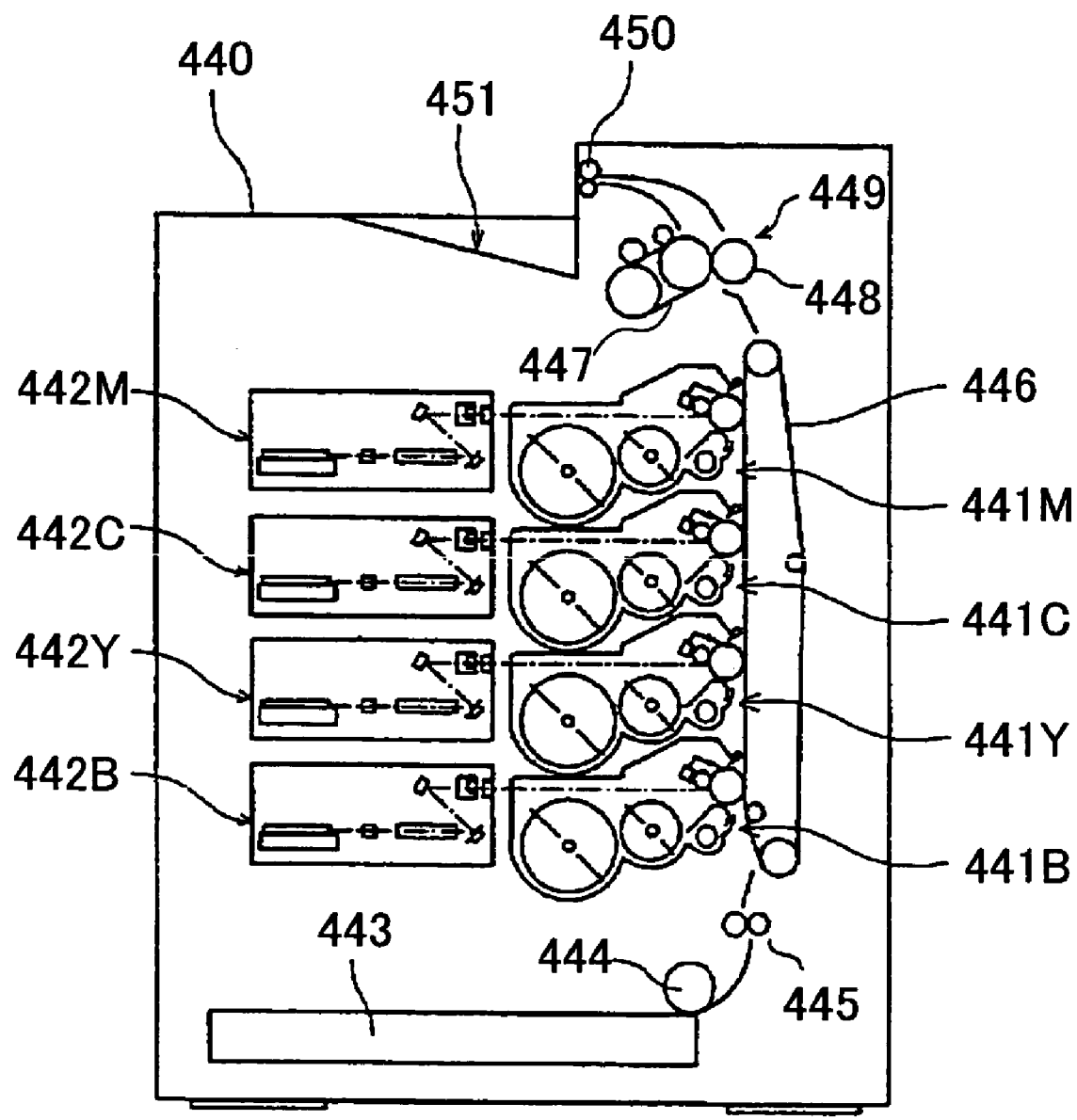
FIG. 37 is a diagram generally showing an electrophotography type image forming apparatus.
Figure 38:
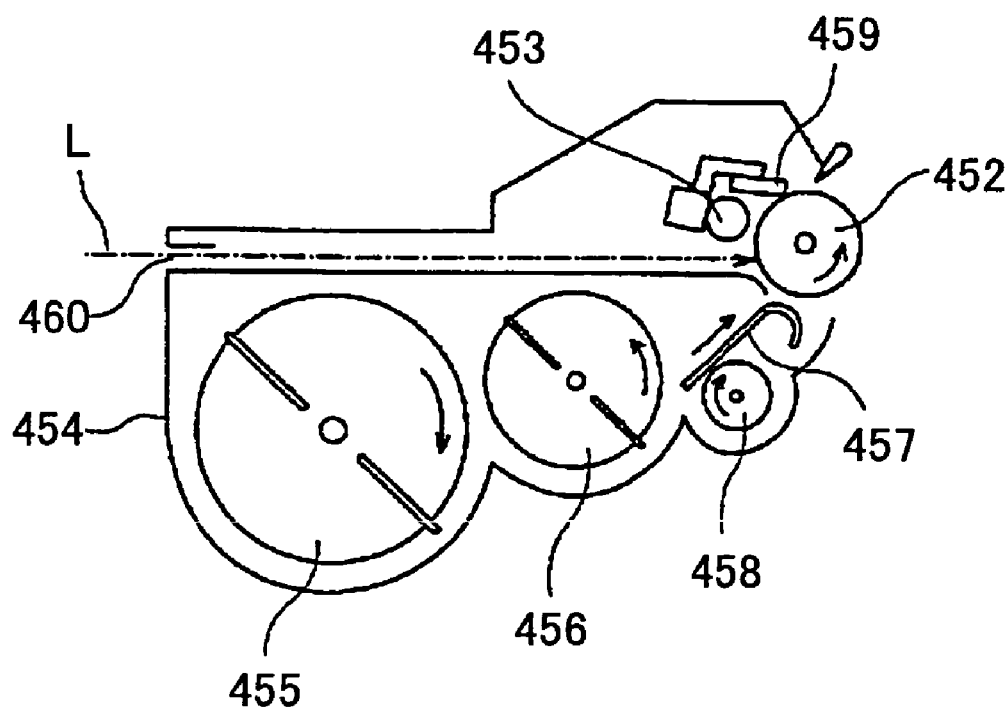
FIG. 38 is a diagram generally showing a process cartridge of the electrophotography type image forming apparatus.

FIG. 37 is a diagram generally showing an electrophotography type image forming apparatus. FIG. 38 is a diagram generally showing a process cartridge of the electrophotography type image forming apparatus.

An image forming apparatus 440 shown in FIG. 37 is a kind of laser printer which forms a full color image using four basic colors of magenta (M), cyan (C), yellow (Y) and black (Bk). The image forming apparatus 440 generally includes four optical write (recording) units 442M, 442C, 442Y and 442Bk for emitting laser beams depending on image signals of the corresponding colors M, C, Y and Bk, four process cartridges 441M, 441C, 441Y and 441Bk for forming images in colors M, C, Y and Bk, and a paper supply cassette 443 which accommodates recording paper on which the images are to be transferred. A paper supply roller 444 supplies the recording paper from the paper supply cassette 443, and a resist roller 445 transports the recording paper at a predetermined timing. A transfer belt 446 transports the recording paper to a transfer portion of each of the process cartridges 441M, 441C, 441Y and 441Bk. A fixing unit 449 fixes the image transferred onto the recording paper. A paper eject roller 450 ejects the recording paper after the fixing onto a paper eject tray 451.

The four process cartridges 441M, 441C, 441Y and 441Bk have the same structure shown in FIG. 38. As shown in FIG. 38, the process cartridge integrally includes within a casing a drum-shaped photoconductive body 452 which is provided as an image bearing member, a charging roller 453, a developing unit 454, and a cleaning blade 459.

A toner supply roller, a charging roller, an electrostatic transport plate 457 and a toner return roller 458 are provided within the developing unit 454, and toner of a corresponding color is accommodated within the developing unit 454. In addition, a slit 460 through which the laser beam from the corresponding optical write unit enters is provided in a rear surface of the process cartridge 441.

Each of the optical write units 442M, 442C, 442Y and 442Bk includes a semiconductor laser, a collimator lens, an optical deflector such as a polygonal mirror, and a scanning and imaging optical system, and emits a laser beam which is modulated depending on the image data of the corresponding color input from the host unit (image processing apparatus) such as a personal computer provided externally to the image forming apparatus. The laser beams from the optical write units 442M, 442C, 442Y and 442Bk scan the photoconductive bodies 452 of the corresponding process cartridges 441M, 441C, 441Y and 441Bk, so as to write electrostatic latent images on the photoconductive bodies 452.

When the image formation starts, the photoconductive body 452 of each of the process cartridges 441M, 441C, 441Y and 441Bk is uniformly charged by the charging roller 453, and the laser beam from each of the optical write units 442M, 442C, 442Y and 442Bk scans the photoconductive body 452 of the corresponding one of the process cartridges 441M, 441C, 441Y and 441Bk, so as to write electrostatic latent image on the photoconductive body 452. The electrostatic latent image formed on the photoconductive body 452 is developed and visualized into a toner image by the toner of the corresponding color electrostatically transported by the electrostatic transport plate 457 of the developing unit 454. A pulse-shaped developing bias is applied between confronting portions of the photoconductive body 452 and the electrostatic transport plate 457 for the developing and visualization of the electrostatic latent image into the toner image. The toner not used for the developing is transported by the electrostatic transport plate 457 and returned by the toner return roller 458.

The recording paper within the paper supply cassette 443 is supplied by the paper supply roller 444 in synchronism with each color image formation at the process cartridges 441M, 441C, 441Y and 441Bk, and is transported towards the transfer belt 446 by the resist roller 445 at a predetermined timing. The recording paper is carried by the transfer belt 446 and successively transported to pass by the photoconductive body 452 of each of the process cartridges 441M, 441C, 441Y and 441Bk. Hence, the toner images of each of the colors Bk, Y, C and M are successively transferred onto the recording paper in an overlapping manner. The recording paper having the toner images of the four colors transferred thereon in the overlapping manner is transported to the fixing unit 449 which includes a fixing belt 447 and a pressure roller 448, and a full color toner image is fixed on the recording paper. The recording paper is then ejected onto the paper eject tray 451 by the paper eject roller 450.

Figure 39:
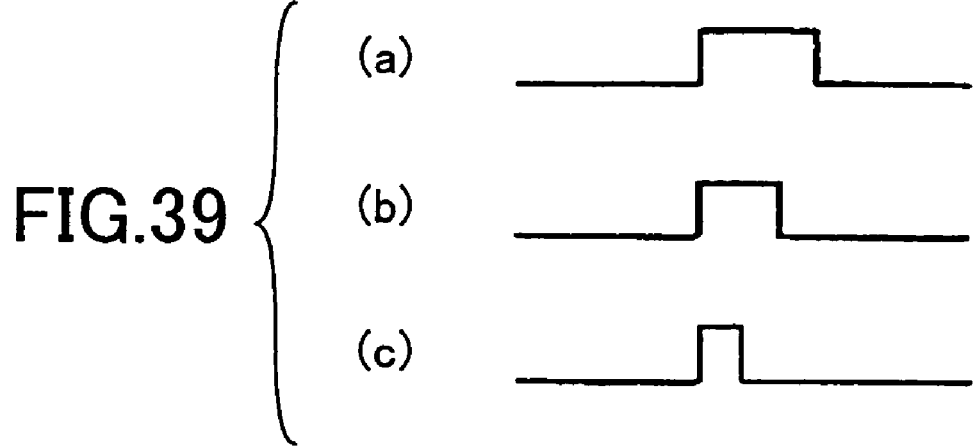
FIG. 39 is a timing diagram for explaining a dot size change in the electrophotography type image forming apparatus.

FIG. 39 is a timing diagram for explaining a dot size change in this electrophotography type image forming apparatus. FIG. 39(*a*), FIG. 39(*b*) and FIG. 39(*c*) show various ON and OFF times of the laser beam which is emitted from each of the optical write units 442M, 442C, 442Y and 442Bk. It is possible to change the dot size formed on the photoconductive body 452 by changing the ON and OFF times of the laser beam as shown.

Therefore, the picture quality can be improved particularly at a low resolution, by correcting the periphery of the stepped transition portion of the dots forming the contour portion of the character and/or graphics by forming the periphery of the stepped transition portion by the smaller dots or by converting the dots into the smaller dots, and changing the method of forming the small dots or the method of converting the dots into the small dots depending on the inclination of the contour portion.

Of course, the structure of the recording head of the ink-jet printer described above is not limited to that of the described embodiment, and various other structures may be used, such as a thermal type ink-jet head which uses a heating resistor and an electrostatic type ink-jet head which uses a vibration plate and an electrode. In addition, although the present invention is applied to the image forming apparatus in the described embodiments, it is also possible to similarly apply the present invention for the image processing and gradation representation when outputting image data to an image display apparatus.

A computer-readable storage medium according to the present invention formed by a recording medium which stores a computer program for causing a computer to carry out the image processing of the present invention described above. The recording medium forming the computer-readable storage medium may be formed by any kind of recording medium capable of storing the computer program, such as semiconductor memory devices, storage units, and magnetic, optical and magneto-optical recording media. The computer program may of course be obtained via a network from a first computer and installed in the recording medium such as a storage unit of a second computer.

Further, the present invention is not limited to these embodiments, but various variations and modifications may be made without departing from the scope of the present invention.

The invention claimed is:

1. An image processing apparatus for forming an image data which is used to form a corresponding image by a plurality of dots, comprising:
   converting means for converting a periphery of a stepped transition portion of a contour portion of at least a character and/or graphics of the image into smaller circular dots having a smaller size than dots forming portions other than the stepped transition portion, each pixel in the converted periphery being represented by a corresponding one of said smaller circular dots; and
   determining means for determining a method of converting said periphery into the smaller circular dots, depending on an inclination of the contour portion,
   wherein said determining means varies the size of the dots depending on the inclination of the contour portion so that a size of first dots that are formed when the inclination of the contour portion is greater than 45 degrees is larger than a size of second dots that are formed when the inclination of the contour portion is 45 degrees or less.

2. The image processing apparatus as claimed in claim 1, wherein said determining means determines a size of each dot in the stepped transition portion depending on the inclination of the contour line portion.

3. The image processing apparatus as claimed in claim 1 or 2, wherein said determining means varies a number of dots in the stepped transition portion having a size smaller than dots forming portions other than the stepped transition portion depending on the inclination of the contour portion.

4. The image processing apparatus as claimed in claim 1, wherein said convening means converts the dots at the periphery of the stepped transition portion into reduced-size dots having a size smaller than the dots forming the portions other than the stepped transition portion, when a low-resolution recording is selected.

5. A printer driver for creating an image data to be supplied to an image forming apparatus which forms a corresponding image by a plurality of dots, comprising:
   a converting part configured to convert a periphery of a stepped transition portion of a contour portion of at least a character and/or graphics of the image into smaller circular dots having a smaller size than dots forming portions other than the stepped transition portion, each pixel in the converted periphery being represented by a corresponding one of said smaller circular dots; and
   a determining part configured to determine a method of converting said periphery into the smaller circular dots, depending on an inclination of the contour portion,
   wherein said determining part varies the size of the dots depending on the inclination of the contour portion so that a size of first dots that are formed when the inclination of the contour portion is greater than 45 degrees is larger than a size of second dots that are formed when the inclination of the contour portion is 45 degrees or less.

6. The printer driver as claimed in claim 5, wherein said determining means determines a size of each dot in the stepped transition portion depending on the inclination of the contour line portion.

7. The printer driver as claimed in claim 5 or 6, wherein said determining means varies a number of dots in the stepped transition portion having a size smaller than dots forming portions other than the stepped transition portion depending on the inclination or the contour portion.

8. The printer driver as claimed in claim 5, wherein said converting means converts the dots at the periphery of the stepped transition portion into reduced-size dots having a size smaller than the dots forming the portions other than the stepped transition portion, when a low-resolution recording is selected.

9. The printer driver as claimed in claim 5, wherein the image forming apparatus includes a head which ejects an ink onto a recording medium and forms the dots by drops of the ink to form the image on the recording medium, and said ink includes a pigment, a soluble organic solvent, anion or nonion based surface active agent, polyole or glycol ether with carbon number 8 or greater, and pure water.

10. An image processing method for forming an image data which is used to form a corresponding image by a plurality of dots, comprising:
    converting a periphery of a stepped transition portion of a contour portion of at least a character and/or graphics of the image into smaller circular dots having a smaller size than dots forming portions other than the stepped transition portion, each pixel in the converted periphery being represented by a corresponding one of said smaller circular dots; and determining a method of converting said periphery into the smaller circular dots, depending on an inclination of the contour portion, wherein a size of first dots tat are formed when the inclination of the contour portion is greater than 45 degrees is larger than a size of second dots that are formed when the inclination of the contour portion is 45 degrees or less.

11. The image processing method as claimed in claim 10, wherein a size of each dot in the stepped transition portion is determined depending on the inclination of the contour line portion.

12. The image processing method as claimed in claim 10 or 11, wherein a number of dots in the stepped transition portion having a size smaller than dots forming portions other than the stepped transition portion is varied depending on the inclination of the contour portion.

13. The image processing method as claimed in claim 10, wherein the dots at the periphery of the stepped transition portion are convened into reduced-size dots having a size smaller than the dots forming the portions other than the stepped transition portion, when a low-resolution recording is selected.

14. A computer-readable storage medium which stores a program for causing a computer to form an image data which is used to form a corresponding image by a plurality of dots, said program comprising:

a converting procedure which causes the computer to convert a periphery of a stepped transition portion of a contour portion of at least a character and/or graphics of the image into smaller circular dots having a smaller size than dots forming portions other than the stepped transition portion, each pixel in the converted periphery being represented by a corresponding one of said smaller circular dots; and a determining procedure which causes the computer to determine a method of converting said periphery into the smaller circular dots, depending on an inclination of the contour portion, wherein said determining procedure varies the size of the dots depending on the inclination of the contour portion so that a size of first dots that are formed when the inclination of the contour portion is greater than 45 degrees is larger than a size of second dots that are formed when the inclination of the contour portion is 45 degrees or less.

15. The computer-readable storage medium as claimed in claim 14, wherein said determining procedure causes the computer to determine a size of each dot in the stepped transition portion depending on the inclination of the contour line portion depending on the inclination of the contour line portion.

16. The computer-readable storage medium as claimed in claim 14 or 15, wherein said determining procedure causes the computer to vary a number of dots in the stepped transition portion having a size smaller than dots forming portions other than the stepped transition portion depending on the inclination of the contour portion.

17. The computer-readable storage medium as claimed in claim 14, wherein said converting procedure causes the computer to convert the dots at the periphery of the stepped transition portion into reduced-size dots having a size smaller than the dots forming the portions other than the stepped transition portion, when a low-resolution recording is selected.

* * * * *